(12) United States Patent
Murata et al.

(10) Patent No.: US 9,813,566 B2
(45) Date of Patent: Nov. 7, 2017

(54) INFORMATION PROCESSING DEVICE, INFORMATION PROCESSING METHOD, AND PROGRAM FOR GENERATING A LAYOUT

(71) Applicant: Sony Corporation, Tokyo (JP)

(72) Inventors: Makoto Murata, Tokyo (JP); Koji Sato, Tokyo (JP); Naoki Shibuya, Tokyo (JP); Yuki Okamura, Saitama (JP)

(73) Assignee: Sony Corporation, Tokyo (JP)

( * ) Notice: Subject to any disclaimer, the term of this patent is extended or adjusted under 35 U.S.C. 154(b) by 57 days.

(21) Appl. No.: 14/408,677

(22) PCT Filed: Jul. 4, 2013

(86) PCT No.: PCT/JP2013/068426
§ 371 (c)(1),
(2) Date: Dec. 17, 2014

(87) PCT Pub. No.: WO2014/034266
PCT Pub. Date: Mar. 6, 2014

(65) Prior Publication Data
US 2015/0189107 A1    Jul. 2, 2015

(30) Foreign Application Priority Data
Sep. 3, 2012 (JP) .................. 2012-193229

(51) Int. Cl.
*G06T 11/60* (2006.01)
*H04N 1/387* (2006.01)
*H04N 1/00* (2006.01)

(52) U.S. Cl.
CPC ......... *H04N 1/00196* (2013.01); *G06T 11/60* (2013.01); *H04N 1/387* (2013.01); *H04N 1/3872* (2013.01)

(58) Field of Classification Search
CPC ... G06T 11/60; H04N 1/00196; H04N 1/3872
See application file for complete search history.

(56) References Cited

U.S. PATENT DOCUMENTS

| 6,222,947 B1 * | 4/2001 | Koba ..................... G06T 11/60 358/302 |
| 2002/0040375 A1 | 4/2002 | Simon et al. |

(Continued)

FOREIGN PATENT DOCUMENTS

| JP | 08-255160 | 10/1996 |
| JP | 2003-030673 | 1/2003 |

(Continued)

OTHER PUBLICATIONS

Apr. 1, 2016, European Search Report for related EP Application No. 13832450.4.

*Primary Examiner* — Kee M Tung
*Assistant Examiner* — Yanna Wu
(74) *Attorney, Agent, or Firm* — Paratus Law Group, PLLC

(57) ABSTRACT

There is provided an information processing device including an evaluation value calculation unit configured to calculate an evaluation value of each of candidate images which are candidates for an image to be selected based on information regarding an image corresponding to each of the candidate images, a page allocation unit configured to determine the number of pages based on a parameter regarding a layout and determine the number of images disposed in each page based on the parameter regarding the layout and the calculated evaluation value, an image selection unit configured to select the image among the candidate images based on the parameter regarding the layout and the calculated evaluation value, and a layout generation unit configured to generate the layout in which the selected image is disposed (Continued)

for each page based on the parameter regarding the layout and the evaluation value corresponding to the selected image.

19 Claims, 52 Drawing Sheets

(56) References Cited

U.S. PATENT DOCUMENTS

| | | | |
|---|---|---|---|
| 2008/0005700 A1* | 1/2008 | Morikawa | G06F 3/0482 715/841 |
| 2008/0094420 A1* | 4/2008 | Geigel | G06F 17/30265 345/660 |
| 2009/0040552 A1* | 2/2009 | Tanaka | G06K 15/02 358/1.15 |
| 2009/0064057 A1* | 3/2009 | Bull | G06F 3/048 715/864 |
| 2010/0215279 A1 | 8/2010 | Gao et al. | |

FOREIGN PATENT DOCUMENTS

| | | |
|---|---|---|
| JP | 2003-274139 | 9/2003 |
| JP | 2004-280597 | 10/2004 |
| JP | 2007-133832 | 5/2007 |
| JP | 2007-172573 | 7/2007 |
| JP | 2007-312058 | 11/2007 |
| JP | 2007-324639 | 12/2007 |
| JP | 2010-191934 | 9/2010 |
| WO | WO2010/047843 A1 | 4/2010 |

\* cited by examiner

FIG. 3
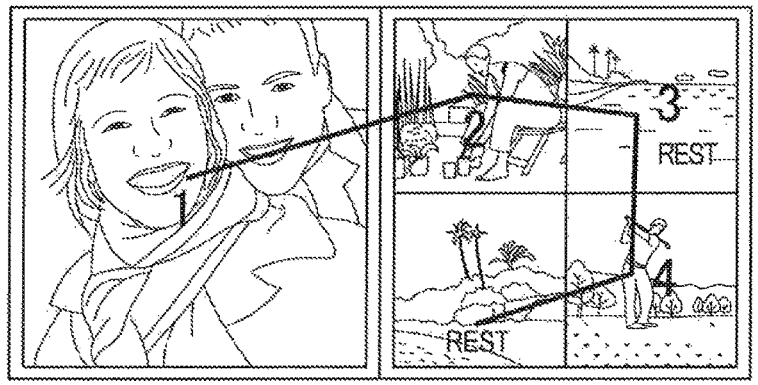
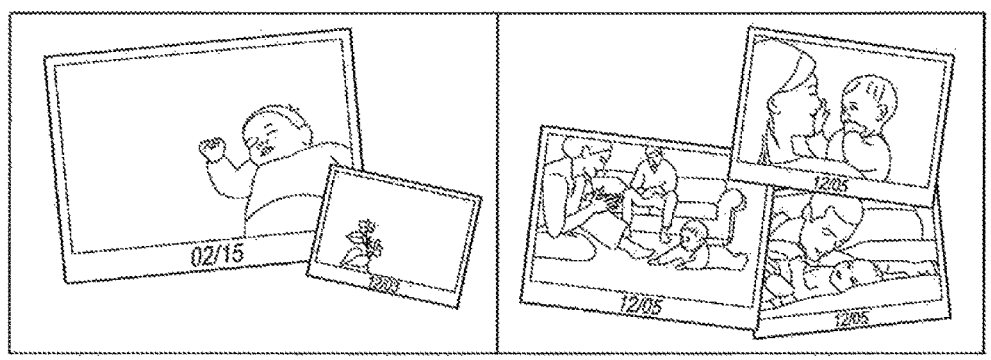

FIG. 8
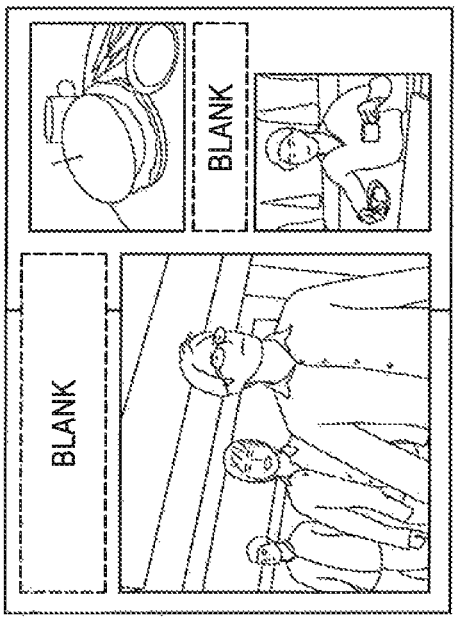
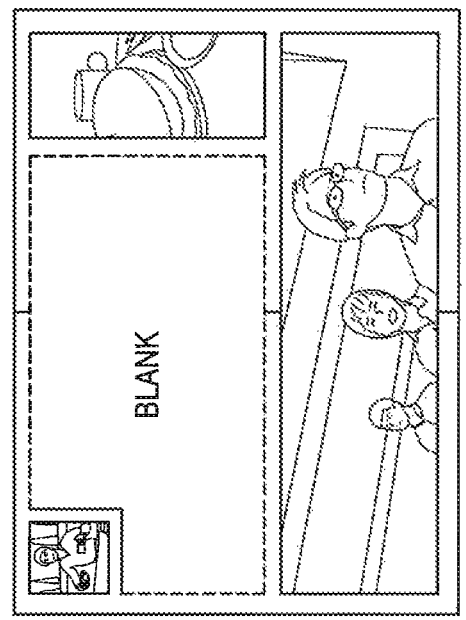

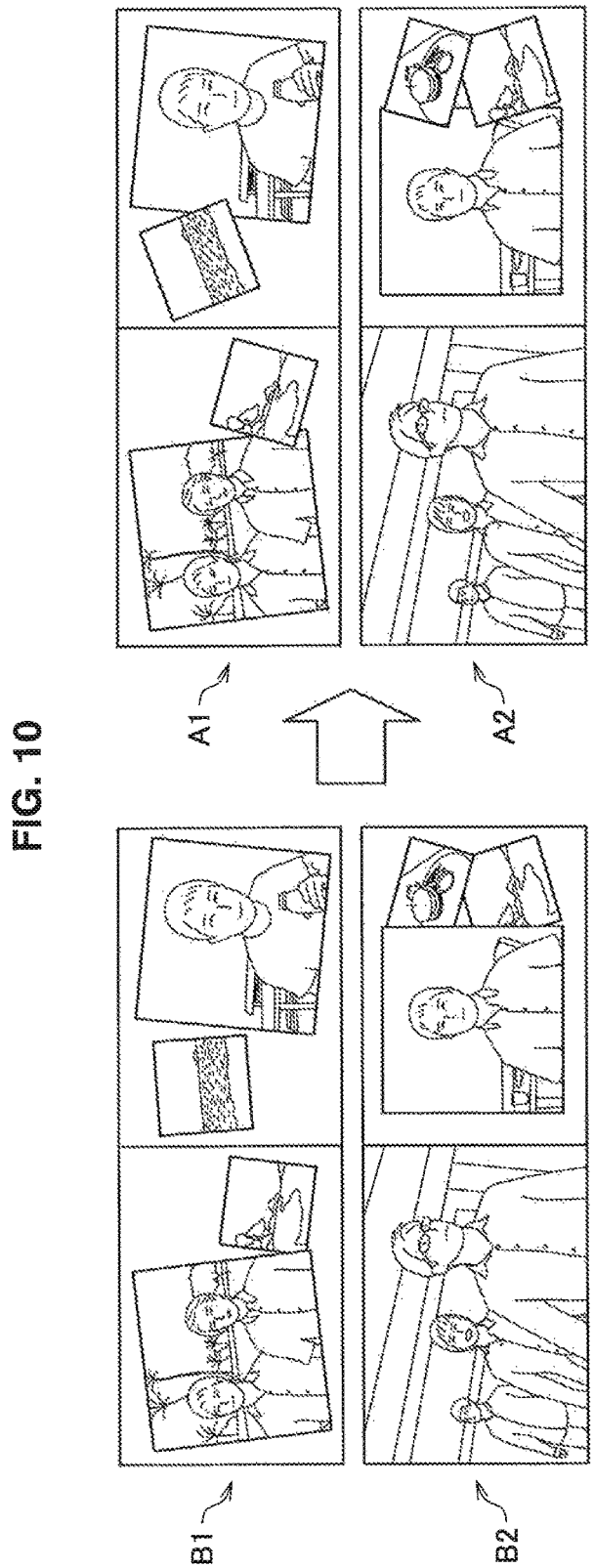

```
<!--spread-->
    <spread num_max       = "10"/>
    <spread aspect        = "1.8"/>
    <spread margin_top    = "0.05"/>
    <spread margin_bottom = "0.05"/>
    <spread margin_outside = "0.025"/>
    <spread margin_inside = "0.025"/>

<!--photo-->
    <photo gap_horizontal = "0.0025"/>
    <photo gap_vertical   = "0.05"/>
    <photo num_average    = "3"/>
    <photo num_max        = "4"/>
```

B

```
<!--spread-->
    <spread num_max       = "10"/>
    <spread aspect        = "1.8"/>
    <spread margin_top    = "0.1"/>
    <spread margin_bottom = "0.1"/>
    <spread margin_outside = "0.025"/>
    <spread margin_inside = "0.025"/>

<!--photo-->
    <photo gap_horizontal = "0.025"/>
    <photo gap_vertical   = "0.05"/>
    <photo num_average    = "5"/>
    <photo num_max        = "10"/>
```

C

```
<!--spread-->
    <spread num_max       = "10"/>
    <spread aspect        = "2.0"/>
    <spread margin_top    = "0.05"/>
    <spread margin_bottom = "0.05"/>
    <spread margin_outside = "0.025"/>
    <spread margin_inside = "0.025"/>

<!--photo-->
    <photo gap_horizontal = "0.001"/>
    <photo gap_vertical   = "0.002"/>
    <photo num_average    = "3"/>
    <photo num_max        = "4"/>
```

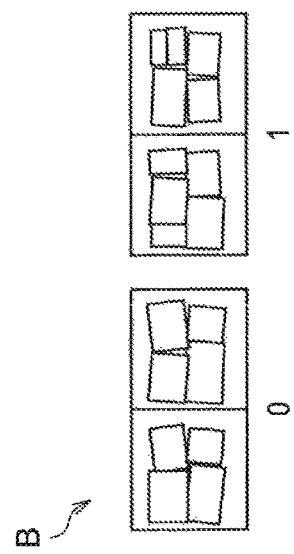
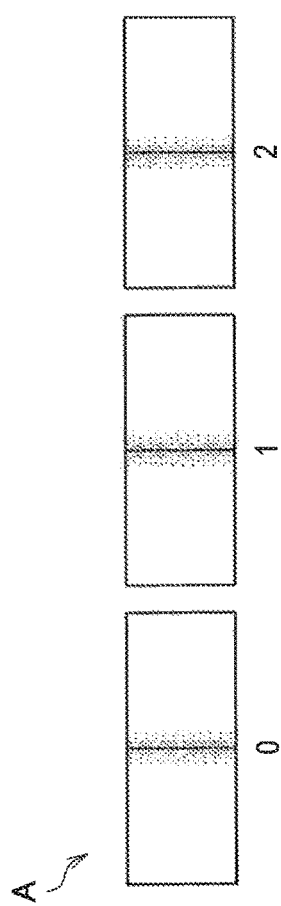
FIG. 12

FIG. 23
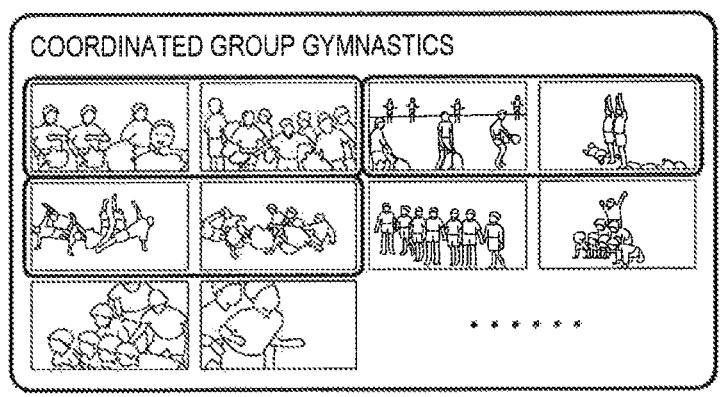
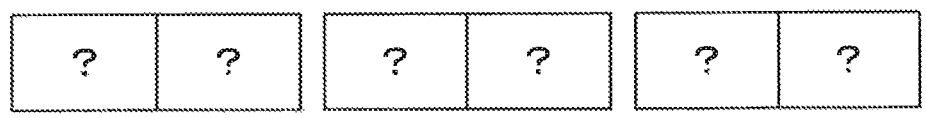

FIG. 26

RECIPROCAL OF SUM OF SQUARES OF
EVALUATION VALUES (NORMALIZATION)
200/120=1.67

9 * 1.67/15 =
1 IMAGE

RECIPROCAL OF SUM OF SQUARES OF
EVALUATION VALUES (NORMALIZATION)
200/20=10

9 * 10/15 =
6 IMAGES

RECIPROCAL OF SUM OF SQUARES OF
EVALUATION VALUES (NORMALIZATION)
200/60=3.33

9 * 3.33/15 =
2 IMAGES

FIG. 37
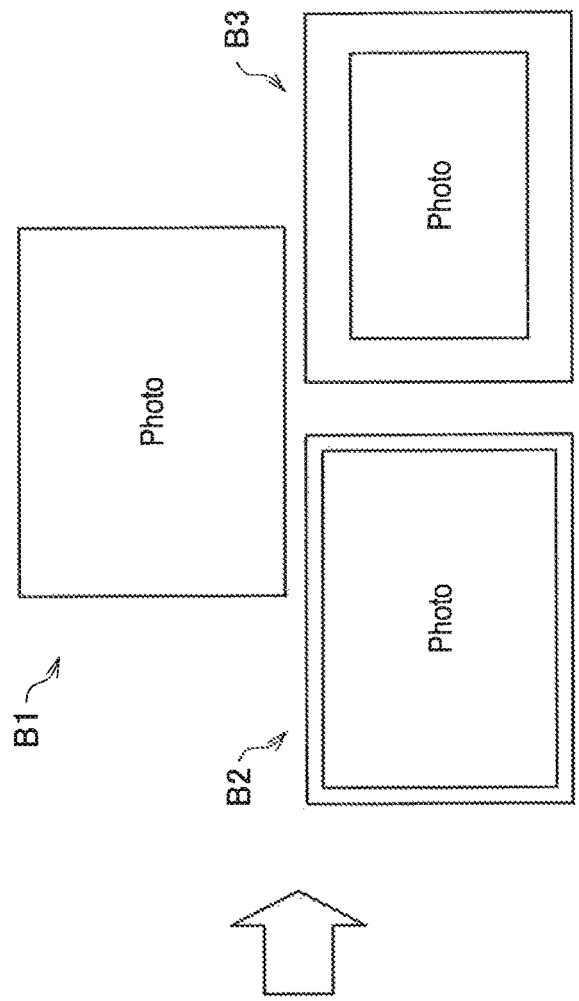
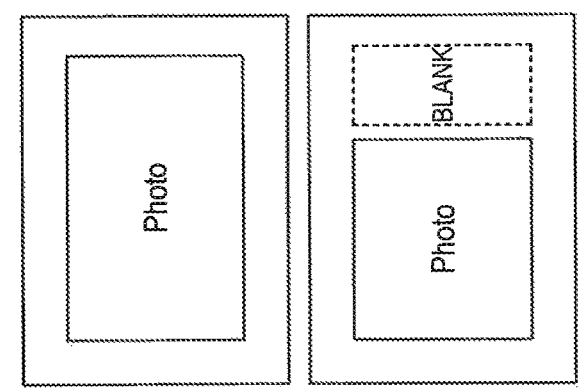

FRAME 1 : AREA 0.5 → Depth = 3
FRAME 2 : AREA 0.2 → Depth = 2
FRAME 3 : AREA 0.15 → Depth = 1

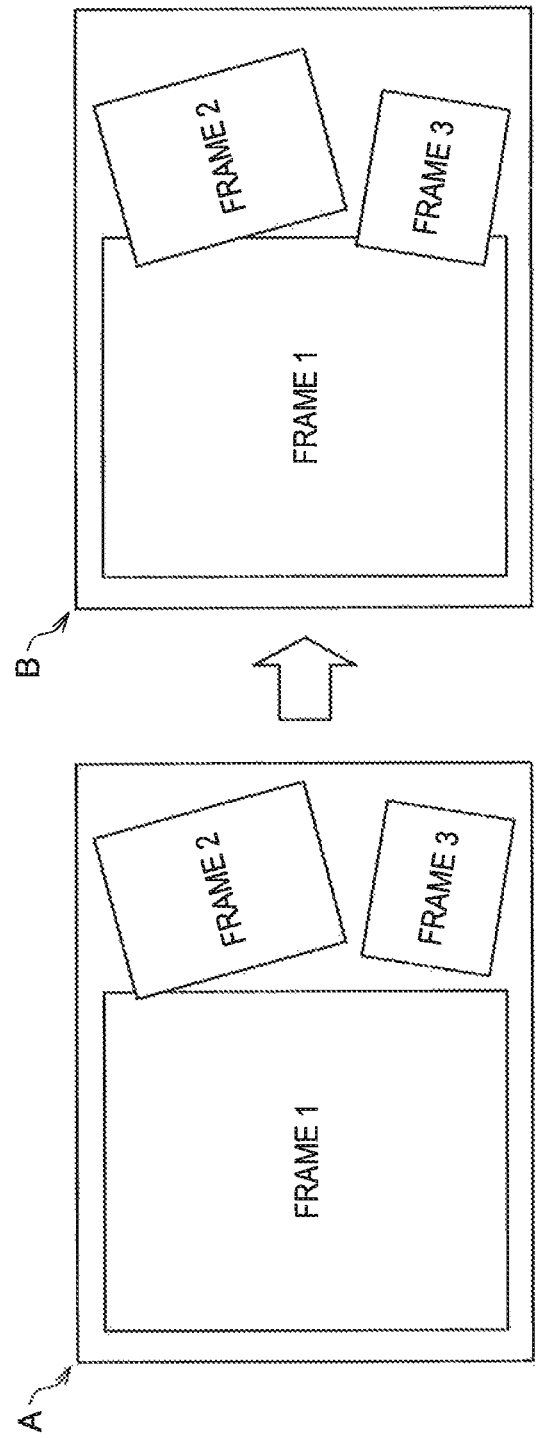

FIG. 46

| | [DETERMINATION] | | | [CORRESPONDENCE] |
|---|---|---|---|---|
| | DETERMINATION OF OVERLAPPING OF FRAMES | DETERMINATION OF OVERLAPPING AFTER FURTHER EXPANSION/CONTRACTION | DEGREE OF OVERLAPPING | OVERLAP BY PARALLEL TRANSLATION |
| CASE 1 | YES | FRAME 1 AND FRAME 2' CONTRACTED BY 5% YES | 3 | NO |
| CASE 2 | YES | FRAME 1 AND FRAME 2' CONTRACTED BY 5% NO | 1 | PARALLEL TRANSLATION TOWARD CENTER BY 5% OF LENGTH OF DIAGONAL LINE |
| CASE 3 | NO | FRAME 1 AND FRAME 2' EXPANDED BY 5% YES | -1 | PARALLEL TRANSLATION TOWARD CENTER BY 7.5% OF LENGTH OF DIAGONAL LINE |
| CASE 4 | NO | FRAME 1 AND FRAME 2' EXPANDED BY 5% NO | -3 | NO |

FIG. 50

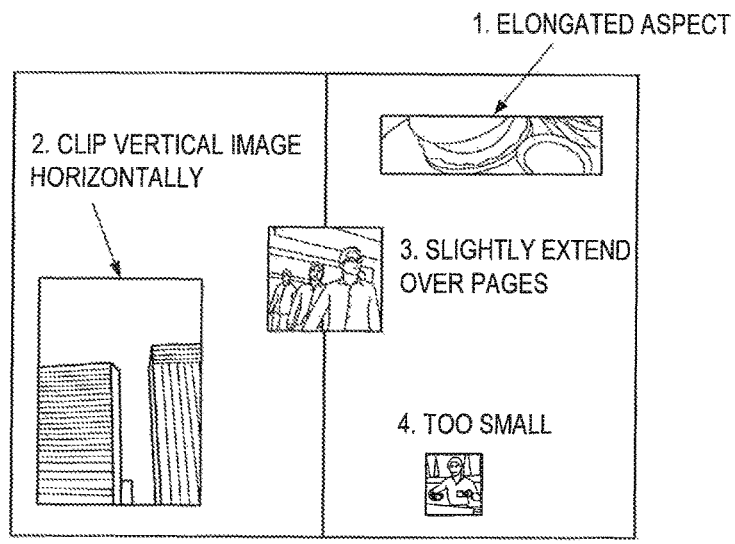

| | SUBTRACTION CAUSES | SUBTRACTION EXAMPLES |
|---|---|---|
| 1 | THERE IS CONSIDERABLY ELONGATED ASPECT | 10.0 x NUMBER OF FRAMES |
| 2 | VERTICAL IMAGE IS HORIZONTALLY FRAMED HORIZONTAL IMAGE IS VERTICALLY FRAMED | 3.0 x NUMBER OF FRAMES |
| 3 | SMALL FRAME EXTENDS OVER PAGES | 5.0 x NUMBER OF FRAMES |
| 4 | THERE IS TOO SMALL FRAME | 3.0 x NUMBER OF FRAMES |
| 5 | NUMBERS OF RIGHT AND LEFT PAGES AND LAYOUTS ARE THE SAME | 5.0 |
| 6 | NUMBERS OF FRONT AND REAR PAGES AND LAYOUTS ARE THE SAME | 3.0 |

# INFORMATION PROCESSING DEVICE, INFORMATION PROCESSING METHOD, AND PROGRAM FOR GENERATING A LAYOUT

CROSS REFERENCE TO PRIOR APPLICATION

This application is a National Stage Patent Application of PCT International Patent Application No. PCT/JP2013/068426 (filed on Jul. 4, 2013) under 35 U.S.C. §371, which claims priority to Japanese Patent Application No. 2012-193229 (filed on Sep. 3, 2012), which are all hereby incorporated by reference in their entirety.

TECHNICAL FIELD

The present disclosure relates to an information processing device, an information processing method, and a program.

BACKGROUND ART

There are applications which generate photo books (or albums: the same applies below) from a plurality of images (still images or moving images: the same applies below). Examples of the applications include applications disposing images in templates of which layouts are defined in advance and applications automatically generating rectangular grid-based layouts and disposing images according to the generated layouts.

Technologies for disposing images with cartoon layouts based on moving images have been developed. The technologies for disposing an image with a cartoon layout based on a moving image include, for example, a technology disclosed in Patent Literature 1 below.

CITATION LIST

Patent Literature

Patent Literature 1: JP 2010-191934A

SUMMARY OF INVENTION

Technical Problem

For example, photo books can be generated by using applications of the related art which generate the photo books, as described above.

Here, for example, when photo books are generated based on templates, as in the applications which dispose images in templates, there is a probability of the photo books with high quality being generated depending on the makeup of the templates. However, when the photo books are generated based on the templates, layout patterns (or design patterns) are fixed and the layout patterns are finite. Thus, users may easily become tired. Further, when the photo books are generated based on the templates, it is necessary to include makeup of designers in order to increase the number of layout patterns.

For example, when layouts are dynamically generated as in the applications automatically generating rectangular grid-based layouts and disposing images according to the generated layouts, the problem that the layout patterns are fixed rarely occurs and the problem that it is necessary to include makeup of designers does not occur as in the case in which photo books are generated based on the templates.

However, since the applications of the related art which dynamically generate layouts generate the rectangular grid-based layouts, the layouts may easily become monotonous. For this reason, when the applications of the related art which dynamically generate layouts are used, it is necessary for users to manually edit the layouts in some cases.

Accordingly, for example, even when the applications of the related art which generate photo books are used, as described above, it is difficult to expect photo books with high quality to be automatically generated.

For example, in the technology of Patent Literature 1, effective images are extracted from a moving image and cartoon layouts are disposed to easily comprehend content of a moving image. Therefore, for example, when the technology of Patent Literature 1 is used, the problem that the layout patterns are fixed rarely occurs and the problem that it is necessary to include makeup of designers does not occur as in the case in which photo books are generated based on the templates. However, for example, since the technology of Patent Literature 1 is a technology for facilitating understanding of content of a moving image, it has not been considered for generating a photo book with high quality. Accordingly, for example, even when the technology of Patent Literature 1 is used, a photo book with high quality may not be said to be automatically generated.

It is desirable to provide a novel and improved information processing device, a novel and improved information processing method, and a novel and improved program capable of automatically generating a layout to generate a photo book with high quality.

Solution to Problem

According to the present disclosure, there is provided an information processing device including an evaluation value calculation unit configured to calculate an evaluation value of each of candidate images which are candidates for an image to be selected based on information regarding an image corresponding to each of the candidate images, a page allocation unit configured to determine the number of pages based on a parameter regarding a layout and determine the number of images disposed in each page based on the parameter regarding the layout and the calculated evaluation value, an image selection unit configured to select the image among the candidate images based on the parameter regarding the layout and the calculated evaluation value, and a layout generation unit configured to generate the layout in which the selected image is disposed for each page based on the parameter regarding the layout and the evaluation value corresponding to the selected image.

According to the present disclosure, there is provided an information processing method including a step of calculating an evaluation value of each of candidate images which are candidates for an image to be selected based on information regarding an image corresponding to each of the candidate images, a step of determining the number of pages based on a parameter regarding a layout and determining the number of images disposed in each page based on the parameter regarding the layout and the calculated evaluation value, a step of selecting the image among the candidate images based on the parameter regarding the layout and the calculated evaluation value, and a step of generating the layout in which the selected image is disposed for each page based on the parameter regarding the layout and the evaluation value corresponding to the selected image.

According to the present disclosure, there is provided a program causing a computer to execute a step of calculating an evaluation value of each of candidate images which are candidates for an image to be selected based on information regarding an image corresponding to each of the candidate images, a step of determining the number of pages based on a parameter regarding a layout and determining the number of images disposed in each page based on the parameter regarding the layout and the calculated evaluation value, a step of selecting the image among the candidate images based on the parameter regarding the layout and the calculated evaluation value, and a step of generating the layout in which the selected image is disposed for each page based on the parameter regarding the layout and the evaluation value corresponding to the selected image.

Advantageous Effects of Invention

According to an embodiment of the present disclosure, it is possible to automatically generate a layout to generate a photo book with high quality.

BRIEF DESCRIPTION OF DRAWINGS

FIG. 3 is an explanatory diagram illustrating a third example of a photo book with high quality according to an embodiment.

FIG. 8 is an explanatory diagram illustrating an eighth example of a photo book with high quality according to an embodiment.

FIG. 10 is an explanatory diagram illustrating a tenth example of a photo book with high quality according to an embodiment.

FIG. 11 is an explanatory diagram illustrating examples of parameters related to layouts according to the embodiment.

FIG. 12 is an explanatory diagram illustrating a first example of a layout generated as a result obtained by performing a process related to an information processing method according to the embodiment using the parameters related to the layout according to the embodiment.

FIG. 23 is an explanatory diagram illustrating an example of a process related to the information processing method according to the embodiment.

FIG. 26 is an explanatory diagram illustrating an example of a process related to the information processing method according to the embodiment.

FIG. 37 is an explanatory diagram illustrating an example of a process related to the information processing method according to the embodiment.

FIG. 45 is an explanatory diagram illustrating an example of a process related to the information processing method according to the embodiment.

FIG. 46 is an explanatory diagram illustrating an example of a process related to the information processing method according to the embodiment.

FIG. 50 is an explanatory diagram illustrating an example of a process related to the information processing method according to the embodiment.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Hereinafter, the description will be made in the following order.

1. Information processing method according to embodiment

2. Information processing apparatus according to embodiment

3. Program according to embodiment (Information Processing Method According to Embodiment)

Before the configuration of an information processing device according to an embodiment is described, an information processing method according to the embodiment will be first described. Hereinafter, the information processing method according to the embodiment will be described exemplifying a case in which the information processing device according the embodiment performs a process related to the information processing method according to the embodiment.

[1] Example of Photo Book with High Quality According to Embodiment

Before the process related to the information processing method according to the embodiment in the information processing device according to the embodiment is described, an example of a photo book with high quality according to the embodiment will be first described.

[A] First Example of Photo Book with High Quality: Margin

Figure 1:
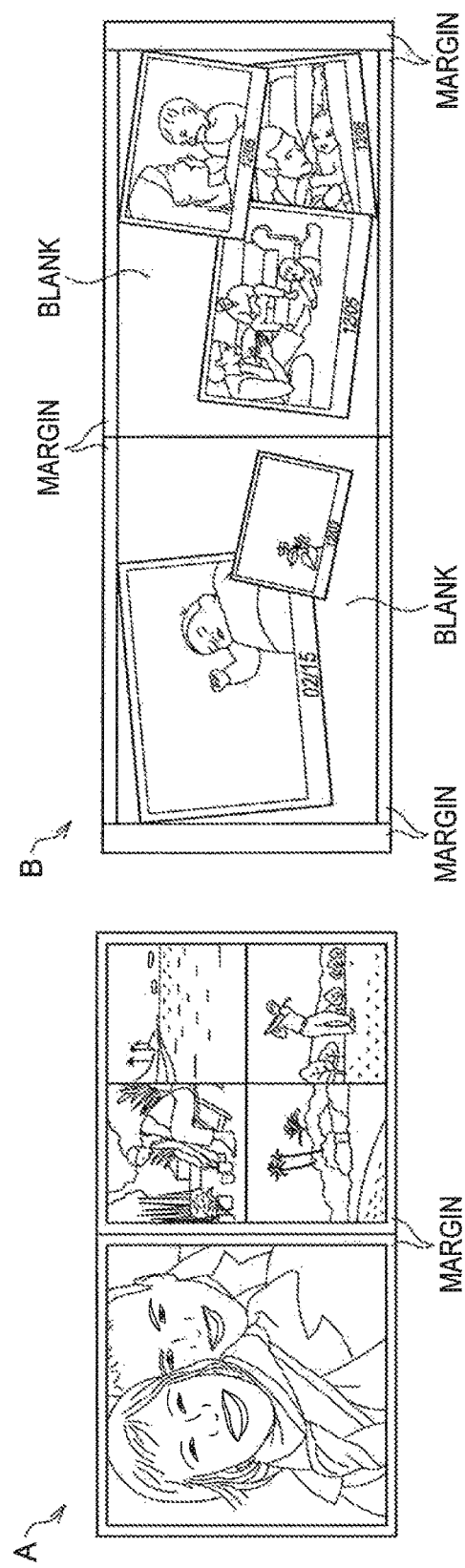
FIG. 1 is an explanatory diagram illustrating a first example of a photo book with high quality according to an embodiment.

FIG. 1 is an explanatory diagram illustrating a first example of a photo book with high quality according to the embodiment and is an explanatory diagram illustrating quality in regard to a margin. Each of A illustrated in FIG. 1 and B illustrated in FIG. 1 is an example of a photo book with high quality according to the embodiment.

Here, the margin according to the embodiment is, for example, a region of a peripheral portion in which an image is not disposed in a page in which an image of a generated layout is disposed. Hereinafter, for example, as shown in B of FIG. 1, a region of a portion in which an image is not disposed other than the margin (a peripheral portion in which an image is not disposed) in the page in which an image of a generated layout is disposed is referred to as a "blank."

Examples of the photo book with high quality according to the embodiment include, for example, as shown in A of FIG. 1 and B of FIG. 1, a photo book in which the upper and lower margins are the same (or substantially the same; the same applies below), a photo book in which the right and left margins are the same, and a photo book in which margins in a gap in a double-page spread are the same (for example, margins between the images in A of FIG. 1). For example, when the upper and lower margins, the right and left margins, and the margins in the gap of the double-page spread are disposed to be the same, a user can have an orderly impression, and thus the quality of the photo book can be improved.

[B] Second Example of Photo Book with High Quality: Sparseness and Denseness

Figure 2:
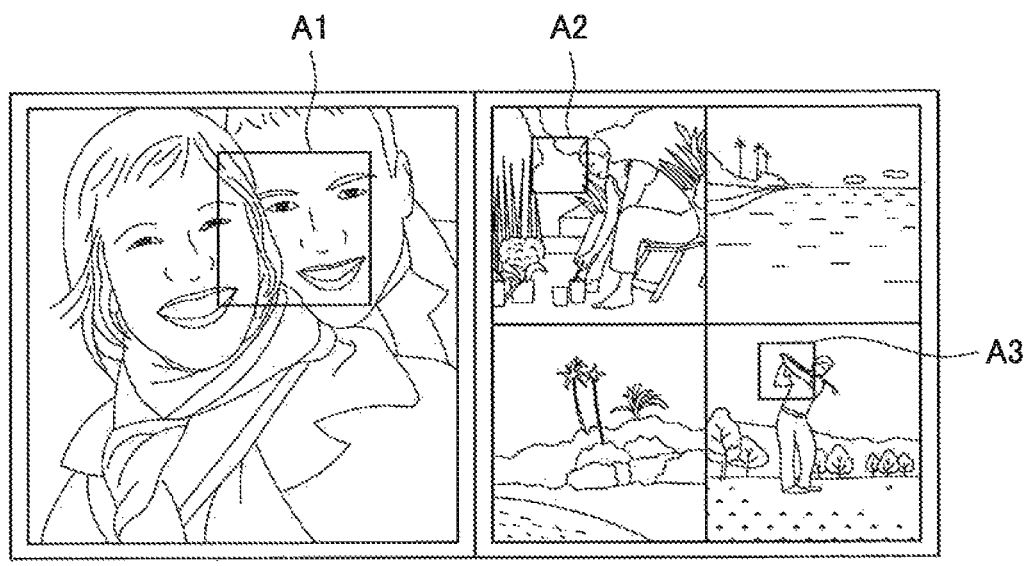
FIG. 2 is an explanatory diagram illustrating a second example of a photo book with high quality according to an embodiment.

FIG. 2 is an explanatory diagram illustrating a second example of a photo book with high quality according to the embodiment and is an explanatory diagram illustrating quality in regard to sparseness and denseness. A1 to A3 illustrated in FIG. 2 show regions of interest that are considered to be of interest to a user in disposed images. Here, examples of the regions of interest according to the embodiment include a region in which a density is high in an image, a region in which a change in luminance is large in an image, a region in which a change in a color is large in an image, and a region in which a change in an edge direction is large in an image.

Examples of the photo book with high quality according to the embodiment include, for example, as shown in A1 to A3 of FIG. 2, a photo book in which regions of interest are not disposed at the center of double-page spread pages and a photo book in which regions of interest are disposed in various spots in the double-page spread pages so that the regions of interest are not monotonous. By not disposing the regions of interest at the center of the double-page spread pages, it is possible to avoid a so-called rising-sun-flag composition. Further, by disposing the regions of interest in the double-page spread pages in various spots, it is possible to disperse the regions of interest. Accordingly, for example, by generating a layout as in FIG. 2, it is possible to improve the quality of the photo book.

[C] Third Example of Photo Book with High Quality: Rest

FIG. 3 is an explanatory diagram illustrating a third example of a photo book with high quality according to the embodiment and is an explanatory diagram illustrating quality in regard to a rest. Each of A illustrated in FIG. 3 and B illustrated in FIG. 3 shows an example of a photo book with high quality according to the embodiment.

Here, examples of rest images according to the embodiment include an image in which there is no strength in a focusing way, an image in which there is no thickness of color, an image which has no spot in which a surface is fine, and an image in which a subject is dispersed.

Examples of the photo book with high quality according to the embodiment include, for example, as shown in A of FIG. 3, a photo book in which rest images (images indicated as a "rest" in A of FIG. 3) in the double-page spread pages and images (images not of rests: images denoted by "1," "2," and "4" in A of FIG. 3) intended to interest a user are mixed and disposed. For example, as shown in A of FIG. 3, an image intended to interest a user in the double-page spread pages may be displayed larger and the rest images may be disposed to be smaller. Further, for example, as shown in A of FIG. 3, the rest images may be disposed in the double-page spread pages so that the images are not mutually adjacent.

For example, as shown in A of FIG. 3, by disposing the rest images and the images intended to interest a user in the double-page spread so that the images are mixed, it is possible to reduce a burden imposed on the user viewing the images disposed in the double-page spread pages, compared to a case in which only images intended to interest the user in the double-page spread pages are disposed. For example, as shown in A of FIG. 3, even when the rest images and the images intended to interest the user are disposed to be mixed in the double-page spread pages, it is possible to show the user the images intended to interest him or her. Accordingly, for example, as shown in A of FIG. 3, by generating a layout, it is possible to improve the quality of the photo book.

The method of realizing the quality in regard to the rest according to the embodiment is not limited to the disposing of the rest images as shown in A of FIG. 3. For example, as shown in B of FIG. 3, blanks may be formed instead of disposing the rest images.

[D] Fourth Example of Photo Book with High Quality: Directivity of Image

Figure 4:
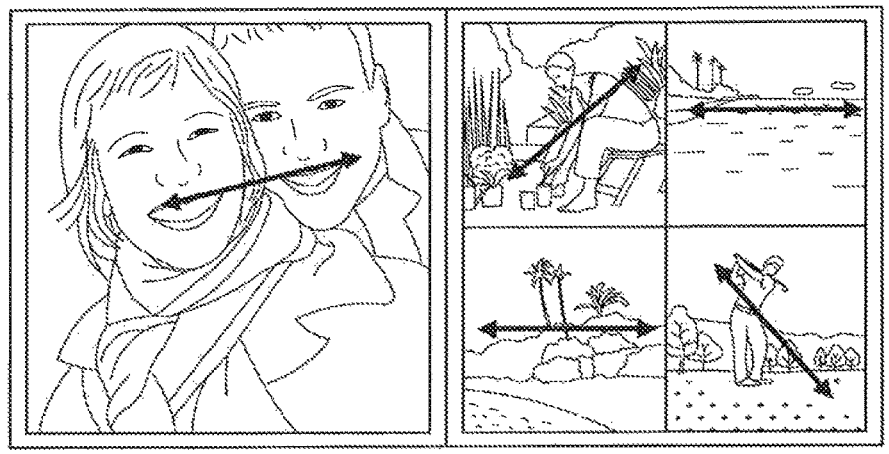
FIG. 4 is an explanatory diagram illustrating a fourth example of a photo book with high quality according to an embodiment.

FIG. 4 is an explanatory diagram illustrating a fourth example of a photo book with high quality according to the embodiment and is an explanatory diagram illustrating quality in regard to directivity of an image. Arrows illustrated in FIG. 4 indicate directivity of each of the disposed images.

Here, the directivity of an image according to the embodiment is a direction in which the line of sight of a user viewing the image easily moves. Examples of the directivity of an image according to the embodiment include a direction in which a person (an example of a subject) included in the image faces, a direction in which people or points of interest are arranged in the image, a direction which is oriented from a region with a high density to a region with a low density in the image, and a direction of a horizontal line or a boundary line included in the image.

Examples of the photo book with high quality according to the embodiment include, for example, as illustrated in FIG. 4, a photo book in which the directivity of each of the images disposed in the double-page spread pages is dispersed. For example, as illustrated in FIG. 4, a probability of a user getting tired of, for example, viewing the images is further reduced since the images with the same directivity do not continue in the double-page spread pages. Further, when the line of sight of the user viewing an image is identical to the directivity of the images disposed in the double-page spread pages, further comfort can be provided to the user. Accordingly, for example, by generating the layout as in FIG. 4, it is possible to improve the quality of the photo book.

Figure 5:
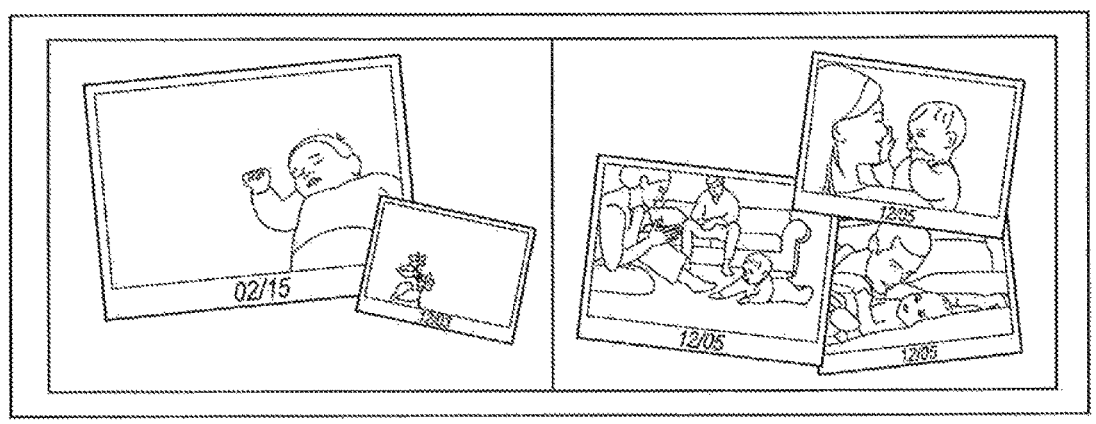
FIG. 5 is an explanatory diagram illustrating a fifth example of a photo book with high quality according to an embodiment.

[E] Fifth Example of Photo Book with High Quality: Balance of Areas Occupied by Images FIG. 5 is an explanatory diagram illustrating a fifth example of a photo book with high quality according to the embodiment and is an explanatory diagram illustrating quality in regard to balance of areas occupied by images. Here, for example, FIG. 5 illustrates an example in which areas occupied by images disposed in each page of the double-page spread are 70 [%] of the entire page.

Examples of the photo book with high quality according to the embodiment include, for example, as illustrated in FIG. 5, a photo book in which the areas occupied by the images disposed in each page of the double-page spread are the same (or substantially the same; the same applies below). For example, as illustrated in FIG. 5, by causing the areas occupied by the images disposed in each page of the double-page spread to be the same, the balance of the entire double-page spread pages is improved. Accordingly, for example, by generating the layout as M. FIG. 5, it is possible to improve the quality of the photo book.

[F] Sixth Example of Photo Book with High Quality: Layout

Figure 6:
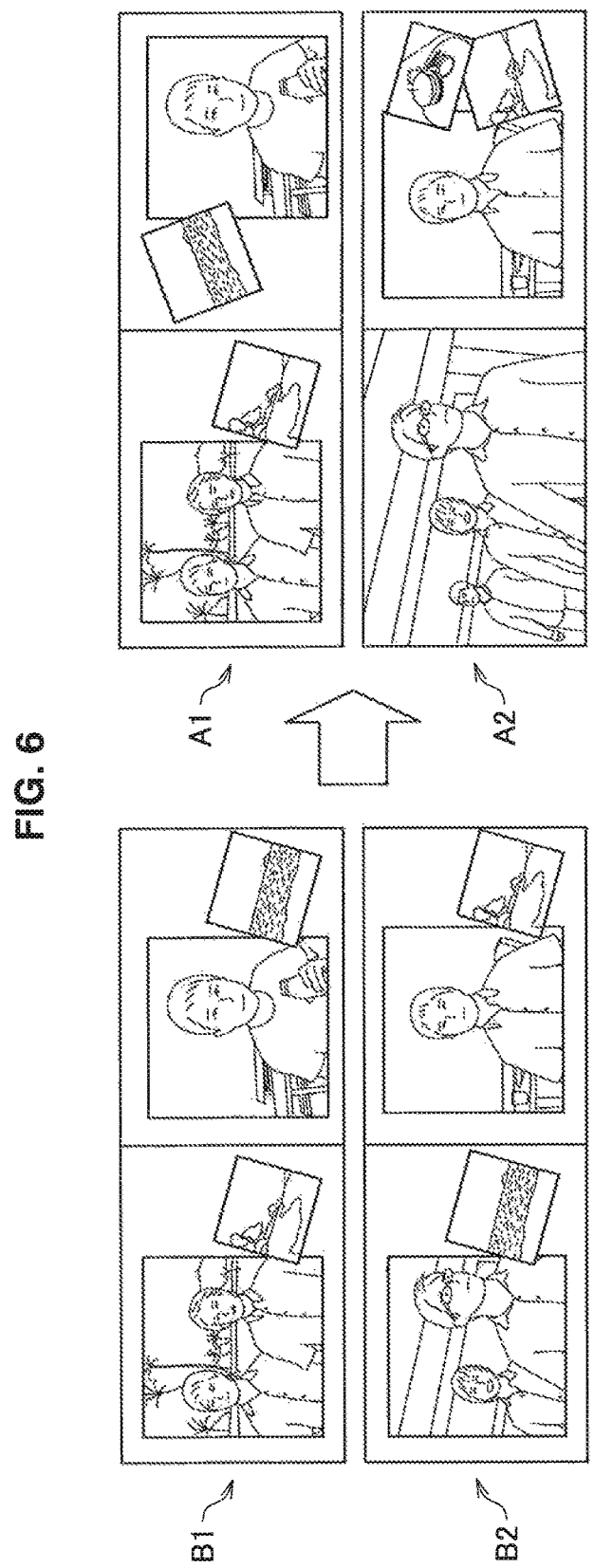
FIG. 6 is an explanatory diagram illustrating a sixth example of a photo book with high quality according to an embodiment.

FIG. 6 is an explanatory diagram illustrating a sixth example of a photo book with high quality according to the embodiment and is an explanatory diagram illustrating quality in regard to a layout. Each of A1 illustrated in FIG. 6 and A2 illustrated in FIG. 6 shows an example of a photo book with high quality according to the embodiment and shows for example, first to fourth pages of the photo book. B1 illustrated in FIG. 6 shows a comparative example to A1 of FIG. 6 to describe quality in regard to the layout according to the embodiment and B2 illustrated in FIG. 6 shows a comparative example to A2 of FIG. 6 to describe quality in regard to the layout according to the embodiment.

Examples of the photo book with high quality according to the embodiment include, for example, as shown in A1 and A2 of FIG. 6, a photo book in which the layouts of the images or the numbers of images disposed in continuous pages are not the same. Here, for example, as shown in B1 and B2 of FIG. 6, when the layouts of the images or the numbers of images disposed in continuous pages are the same, the layouts become monotonous. In contrast, for example, as shown in A1 and A2 of FIG. 6, when the layouts of the image disposed in the continuous pages are different or the number of images disposed in the continuous pages are different, the layouts are prevented from becoming monotonous, and thus the layouts with rich variation are realized. Accordingly, for example, by generating the layouts as in FIG. 6, it is possible to improve the quality of the photo book. Even when a page in which layouts are different or a page in which the number of images is different is sometimes generated in a plurality of pages included in a photo book, it is effective to realize the layouts with rich variation.

[G] Seventh Example of Photo Book with High Quality: Image Processing

Figure 7:
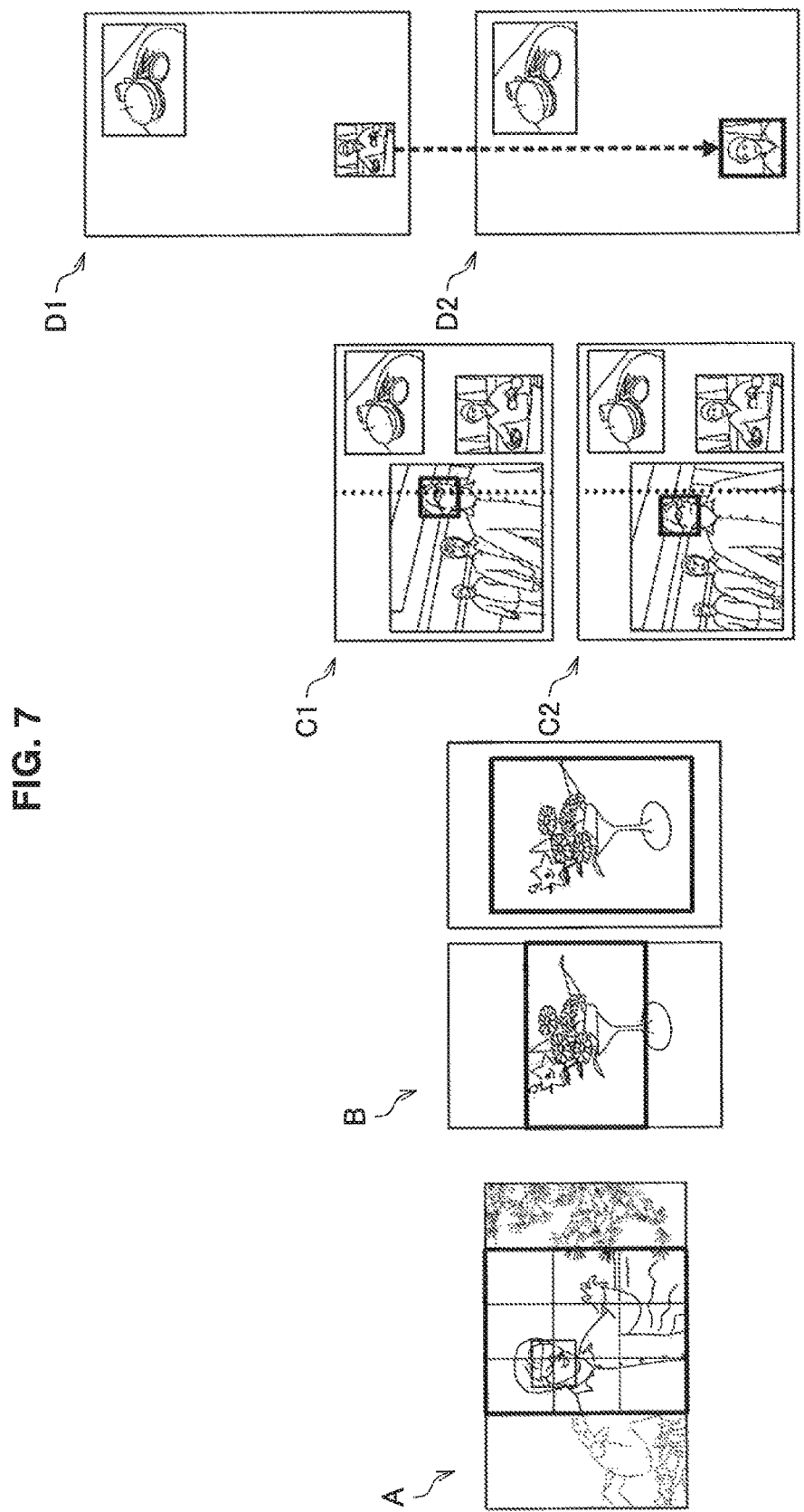
FIG. 7 is an explanatory diagram illustrating a seventh example of a photo book with high quality according to an embodiment.

FIG. 7 is an explanatory diagram illustrating a seventh example of a photo book with high quality according to the embodiment and is an explanatory diagram illustrating quality in regard to image processing. Each of A, B, C2, and D2 illustrated in FIG. 7 shows an example of a photo book with high quality according to the embodiment. C1 illustrated in FIG. 7 shows a comparative example to C2 of FIG. 7 to describe quality by the image processing according to the embodiment and D1 illustrated in FIG. 7 shows a comparative example to D2 of FIG. 7 to describe quality by the image processing according to the embodiment.

Here, examples of the image processing according to the embodiment include framing and a process of expanding a framed image. The framing according to the embodiment refers to extracting a region to be disposed from a disposing target image, for example, by cutting out the region to be disposed from the disposing target image.

Examples of the photo book with high quality according to the embodiment include, for example, as shown in A of FIG. 7, a photo book in which the framing is performed so that an image has a 3-division composition using a subject detected from an image (an example in which the face of a person is detected is shown in A of FIG. 7) as a criterion. Examples of the photo book with high quality according to the embodiment include, for example, as shown in B of FIG. 7, a photo book in which a subject detected from an image (an example in which a flower or the like is detected is shown in B of FIG. 7) is framed horizontally or vertically. Examples of the photo book with high quality according to the embodiment include, for example, as shown in C2 of FIG. 7, a photo book in which a subject detected from an image (an example in which the face of a person is detected is shown in C2 of FIG. 7) is framed so that the subject is not disposed in a boundary line of a page. Examples of the photo book with high quality according to the embodiment include, for example, as shown in D2 of FIG. 7, a photo book in which a subject detected from an image (an example in which the face of a person is detected is shown in A of FIG. 7) is framed and an image obtained by expanding the framed image in conformity with a region in which the image is disposed is disposed.

For example, as shown in A, B, C2, and D2 of FIG. 7, by disposing the images subjected to the image processing in the pages included in the photo book, for example, it is possible to dispose the images which have a better composition or the images which can be easily viewed. Accordingly, for example, by generating the layouts as in A, B, C2, and D2 of FIG. 7, it is possible to improve the quality of the photo book.

[H] Eighth Example of Photo Book with High Quality: Frame Division

FIG. 8 is an explanatory diagram illustrating an eighth example of a photo book with high quality according to the embodiment and is an explanatory diagram illustrating quality in regard to frame division. A illustrated in FIG. 8 shows an example of a photo book with high quality according to the embodiment. B illustrated in FIG. 8 shows a comparative example to A of FIG. 8 to describe the quality in regard to the frame division according to the embodiment.

Here, the frame division according to the embodiment refers to, for example, disposing regions in which images are disposed in each page included in a photo book. Hereinafter, a region in which an image is disposed in each page included in a photo book is referred to as a "frame" or an "image frame" in some cases. FIG. 8 illustrates an example in which images are disposed in regions in which the images are disposed according to the embodiment.

Examples of the photo book with high quality according to the embodiment include, for example, as shown in A of FIG. 8, a photo book in which unnatural frames such as frames that are considerably long horizontally or vertically or considerably small frames are not present and a photo book in which blanks are disposed in good balance so that the blanks are not considerably large. Here, for example, as shown in B of FIG. 8, when frames that are considerably long horizontally or vertically are present, considerably small frames are present, or considerably large blanks are present (when blanks are hardened), there is a high probability of balance of each page included in a photo book or the entire double-page spread pages collapsing. Accordingly, for example, by generating the layout as in A of FIG. 8, it is possible to improve the quality of the photo book.

[I] Ninth Example of Photo Book with High Quality: Rotation of Frames

Figure 9:
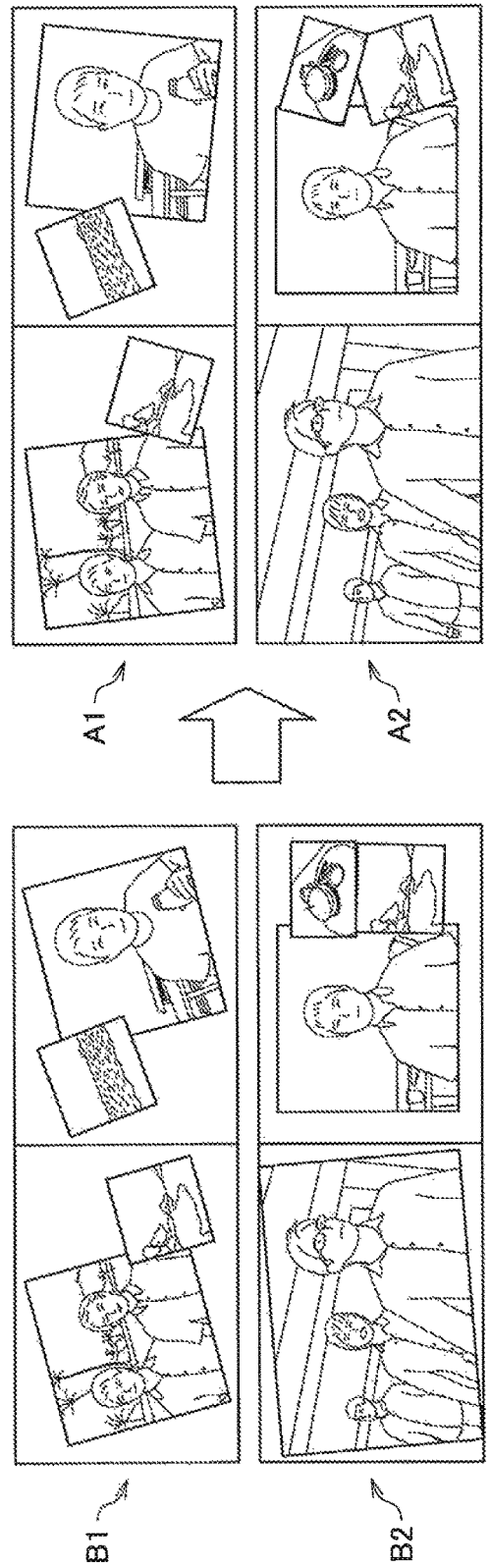
FIG. 9 is an explanatory diagram illustrating a ninth example of a photo book with high quality according to an embodiment.

FIG. 9 is an explanatory diagram illustrating a ninth example of a photo book with high quality according to the embodiment and is an explanatory diagram illustrating quality in regard to rotation of frames. Each of A1 illustrated in FIG. 9 and A2 illustrated in FIG. 9 shows an example of a photo book with high quality according to the embodiment and shows for example, first to fourth pages of the photo book. B1 illustrated in FIG. 9 shows a comparative example to A1 of FIG. 9 to describe quality in regard to the rotation of frames according to the embodiment and B2 illustrated in FIG. 9 shows a comparative example to A2 of FIG. 9 to describe quality in regard to the layout according to the embodiment.

Examples of the photo book with high quality according to the embodiment include, for example, as shown in A1 and A2 of FIG. 9, a photo book in which the rotation amounts and the rotation directions of the frames are set to be well-balanced and a photo book in which unnatural rotation of the frames (for example, rotation of a large frame or rotation at a considerably small rotation angle) is not performed. Here, for example, as shown in B1 of FIG. 9, when the rotation directions or the rotation amounts of the frames are the same (or substantially the same) in the entire double-page spread pages or, for example, as shown in B2 of FIG. 9, when a large frame is rotated or rotation of a frame is slight, there is a high probability of balance of the entire double-page spread pages collapsing. Accordingly, for example, by generating the layout illustrated in A1 and A2 of FIG. 9, it is possible to improve the quality of the photo book.

[F] Tenth Example of Photo Book with High Quality: Overlapping of Frames

FIG. 10 is an explanatory diagram illustrating a ninth example of a photo book with high quality according to the embodiment and is an explanatory diagram illustrating quality in regard to overlapping of frames. Each of A1 illustrated in FIG. 10 and A2 illustrated in FIG. 10 shows an example of a photo book with high quality according to the embodiment and shows for example, first to fourth pages of the photo book. B1 illustrated in FIG. 10 shows a comparative example to A1 of FIG. 10 to describe quality in regard to the overlapping of frames according to the embodiment and B2 illustrated in FIG. 10 shows a comparative example to A2 of FIG. 10 to describe quality in regard to the layout according to the embodiment.

Examples of the photo book with high quality according to the embodiment include, for example, as shown in A1 and A2 of FIG. 10, a photo book in which a subtle overlap state or contact state of mutual frames (for example, when frames subtly overlap one another or frames very slightly overlap one another) is avoided. Here, for example, as shown in B1 of FIG. 10, when the frames subtly overlap each other or the frames very slightly overlap each other, there is a concern of a user perceiving it as unnatural. Accordingly, for example, by generating the layout as in A1 and A2 of FIG. 9, it is possible to improve the quality of the photo book.

In the embodiment, for example, as shown in B1 of FIG. 10, a large frame may not overlap a small frame so that the large frame is located above the small frame, but the small frame may overlap the large frame so that the small frame is located above the large frame, for example, as shown in A1 and A2 of FIG. 10. For example, as shown in A1 and A2 of FIG. 10, by causing the small frames to overlap the large frames, it is possible to realize more natural overlapping between the frames.

Examples of the photo books with high quality according to the embodiment include the photo books described in the foregoing first to tenth examples. It is needless to say that examples of the photo books with high quality according to the embodiment are not limited to the first to tenth examples.

[2] Overview of Information Processing Method According to Embodiment

Next, a process related to an information processing method according to the embodiment in which one example or two or more examples of the photo books with high quality according to the above-described embodiment can be realized will be described.

As described above, for example, even when an application of the related art generating the above-described photo book is used, the photo book with high quality may not be desired to be automatically generated. Further, for example, even when the technology disclosed in Patent Literature 1 is used, a photo book with high quality may not be said to be automatically generated.

Accordingly, for example, the information processing device according to the embodiment calculates an evaluation value of each of candidate images based on information regarding an image corresponding to each of the candidate images (evaluation value calculation process). For example, the information processing device according to the embodiment determines the number of pages based on a parameter regarding a layout and determines the number of images disposed in each page based on the evaluation value calculated in the evaluation value calculation process (page allocation process). For example, the information processing device according to the embodiment selects the image among the candidate images based on a parameter regarding the layout and the evaluation value calculated in the evaluation value calculation process (image selection process). For example, the information processing device according to the embodiment generates the layout in which the selected image is disposed for each page based on the parameter regarding the layout and the evaluation value corresponding to the image selected in the image selection process (layout generation process).

Here, the candidate image according to the embodiment is a candidate for an image to be selected in the foregoing image selection process. For example, the information processing device according to the embodiment sets, as the candidate images, images stored in a storage unit (to be described below) included in the information processing device according to the embodiment, an external recording medium connected to the information processing device according to the embodiment, a recording medium included in an external device such as a server connected via a network (or directly) to the information processing device according to the embodiment, and the like. Examples of the network according to the embodiment include a wired network such as a local area network (LAN) or a wide area network (WAN), a wireless network such as a wireless local area network (WLAN) or a wireless wide area network (WWAN) via a base station, and the Internet using a communication protocol such as Transmission Control Protocol/Internet Protocol (TCP/IP).

The information regarding the image according to the embodiment is data which can be obtained by analyzing the image. Examples of the information regarding the image according to the embodiment include data indicating the area of a region including a predetermined subject detected from an image, data indicating an expression of a person (which is an example of a predetermined subject), data indicating the area of a region of interest detected from an image, data indicating the degree of blurring of an image, and data indicating a kind of color included in an image.

Here, for example, the information processing device according to the embodiment acquires the information regarding the image corresponding to each of the candidate images according to the embodiment by analyzing the candidate images. Examples of a process related to the analysis of the candidate images according to the embodiment include a detection process such as a face detection process or an object detection process, a detection process of detecting a change in luminance or a color in the candidate image, a process of estimating blurring of the candidate image, and a detection process of detecting a color in the candidate image.

The method of acquiring the information regarding the image according to the embodiment is not limited to the foregoing method. For example, the information processing device according to the embodiment may acquire the information regarding the image corresponding to each of the candidate images according to the embodiment by referring to metadata corresponding to the candidate images and indicating the analysis results of the candidate images in an external device. Further, a device (the information processing device according to the embodiment or the external device) analyzing the candidate images analyzes the candidate images according to the embodiment by using any detection process capable of detecting the information regarding the image according to the embodiment.

The parameter related to the layout according to the embodiment refers to, for example, a parameter corresponding to a layout generation condition and indicating directivity of the layout generated by the information processing device according to the embodiment. Examples of parameters related to the layout according to the embodiment include various parameters such as "a parameter regarding the number of pages of a photo book (for example, a parameter indicating the maximum number of double-page spreads)," "a parameter regarding the number of images disposed in each page of a photo book (for example, a parameter indicating a minimum number of images, a maximum number of images, or an average number of images)," "a parameter indicating an aspect or margins of a double-page spread of a photo book," "a parameter indicating a distance between disposed images," "a parameter related to a blank in each page of a photo book," and "a parameter related to ON/OFF of a double-page spread layout." The parameters related to the layout according to the embodiment may include a parameter indicating a background, a frame, or the like. It is needless to say that the parameters related to the layout according to the embodiment are not limited to the foregoing parameters.

FIG. 11 is an explanatory diagram illustrating examples of the parameters related to the layouts according to the embodiment. FIG. 11 illustrates examples of the parameters related to three layouts shown in A to C.

The information processing device according to the embodiment generates, for example, parameters related to a layout based on a user's operation. The information processing device according to the embodiment performs a process related to the information processing method according to the embodiment using the generated parameters related to the layout.

More specifically, the user sets the parameters related to the layout, for example, by "inputting values on a setting screen for setting the parameters related to the layout" (an example of the user's operation), "moving a knob (an example of an operation unit to be described below) for setting the parameters related to the layout" (an example of the user's operation), or "selecting a theme corresponding to the parameters related to the layout" (an example of the user's operation). The information processing device according to the embodiment generates the parameters related to the layout, for example, as shown in A to C of FIG. 11, based on an operation signal according to the foregoing user's operation.

The method of generating the parameters related to the layout according to the embodiment is not limited to the foregoing method. For example, the information processing device according to the embodiment may generate the parameters related to the layout at random.

For example, as illustrated in FIG. 11, the parameters related to the layout according to the embodiment can be generated more simply than when a design template necessary at the time of generation of a template-based photo book is generated. Accordingly, the parameters related to the layout according to the embodiment may be parameters (that is, a template of the parameters related to the layout) generated in advance. When the parameters related to the layout according to the embodiment are the parameters generated in advance, the information processing device according to the embodiment performs a process related to the information processing method according to the embodiment, for example, using the parameters related to the layout and generated in advance and selected based on a user's operation or the parameters related to the layout and generated in advance and selected at random by the information processing device according to the embodiment.

Here, an example of the layout generated as the result obtained by performing the process related to the information processing method according to the embodiment using the parameters related to the layout according to the embodiment will be described.

[a] First Example of Generated Layout

FIG. 12 is an explanatory diagram illustrating a first example of the layout generated as a result of performing the process related to the information processing method according to the embodiment using the parameters related to the layout according to the embodiment. Here, A and B illustrated in FIG. 12 show examples of the layouts generated when "the maximum number of double-page spreads=3" is set as the parameter related to the layout according to the embodiment. Numbers shown below the double-page spreads in A and B of FIG. 12 indicate numbers of the double-page spreads.

When "the maximum number of double-page spreads=3" is set as the parameter related to the layout according to the embodiment, for example, as shown in A of FIG. 12, the number of double-page spreads in the generated layout is 3 (that is, 6 pages).

When "the maximum number of double-page spreads=3" is set as the parameter related to the layout according to the embodiment, the number of double-page spreads generated in the process related to the information processing method according to the embodiment is not limited to 3 (the set maximum number of double-page spreads). For example, when the number of candidate images is small, as shown in B of FIG. 12, the number of double-page spreads less than the set maximum number of double-page spreads can also be generated.

[b] Second Example of Generated Layout

Figure 13:
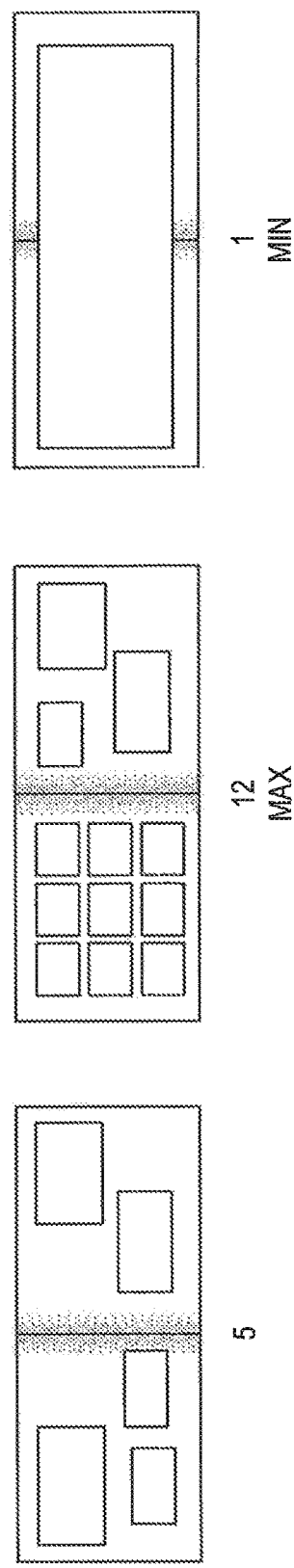
FIG. 13 is an explanatory diagram illustrating a second example of a layout generated as a result obtained by performing a process related to an information processing method according to the embodiment using the parameters related to the layout according to the embodiment.

FIG. 13 is an explanatory diagram illustrating a second example of the layout generated as a result obtained by performing the process related to the information processing method according to the embodiment using the parameters related to the layout according to the embodiment. Here, FIG. 13 illustrates examples of layouts generated when "the average number of images included in a double-page spread=6, the maximum number of images included in the double-page spread=12, and the minimum number of images included in the double-page spread=1" are set as the parameters related to the layout according to the embodiment. A number shown below each double-page spread illustrated in FIG. 13 indicates an example of the number of images included in the double-page spread.

When "the average number of images included in a double-page spread 6, the maximum number of images included in the double-page spread=12, and the minimum number of images included in the double-page spread=1" are set as the parameters related to the layout according to the embodiment, for example, as illustrated in FIG. 13, the layouts are generated so that the set parameters are satisfied.

[c] Third Example of Generated Layout

Figure 14:
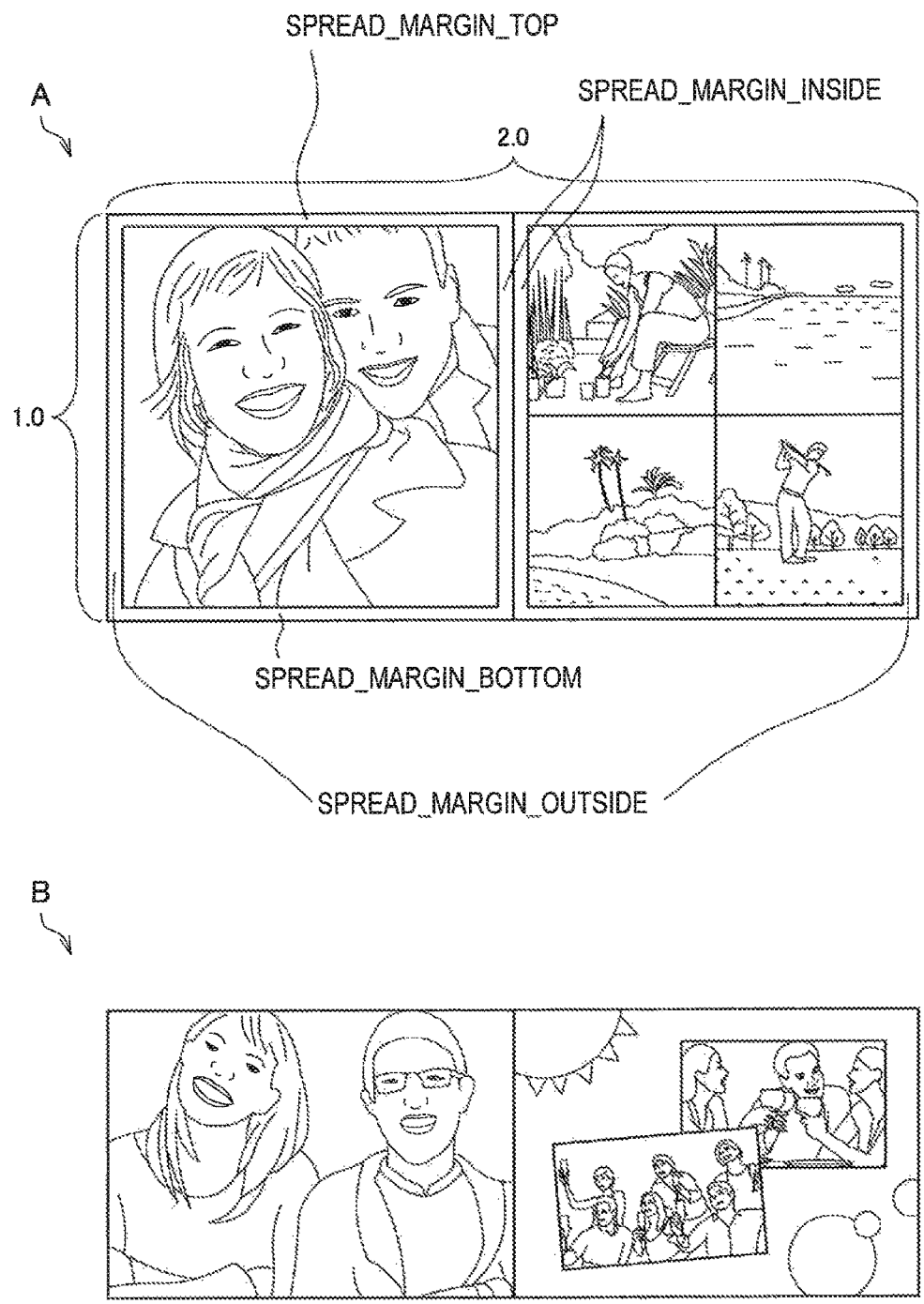
FIG. 14 is an explanatory diagram illustrating a third example of a layout generated as a result obtained by performing a process related to an information processing method according to the embodiment using the parameters related to the layout according to the embodiment.

FIG. 14 is an explanatory diagram illustrating a third example of the layout generated as a result obtained by performing the process related to the information processing method according to the embodiment using the parameters related to the layout according to the embodiment. Here, A and B illustrated in FIG. 14 show examples of the layouts generated when "an aspect ratio of a double-page spread=2.0, a TOP margin=an OUTSIDE margin=a BOTTOM margin=an INSIDE margin=x (where x is a positive real number)" are set as the parameters related to the layout according to the embodiment.

When "the aspect ratio of the double-page spread=2.0, the TOP margin=the OUTSIDE margin=the BOTTOM margin=the INSIDE margin=x (where x is a positive real number)" are set as the parameters related to the layout according to the embodiment, for example, as shown in A of FIG. 14, the layouts are generated so that the set parameters are satisfied.

The parameters related to the margins according to the embodiment are not limited to "the TOP margin=the OUTSIDE margin=the BOTTOM margin=the INSIDE margin=x (where x is a positive real number)." For example, "a parameter that the parameters related to the set margins be ignored when the number of images disposed in one page included in the double-page spread is one" may be included in the parameters related to the margins according to the embodiment. When "the parameter that the parameters related to the set margins be ignored when the number of images disposed in one page included in the double-page spread is one" is included, the layout in which the parameters related to the margins are ignored when the number of images disposed in one page included in the double-page spread is one is generated, as shown in B of FIG. 14.

[d] Fourth Example of Generated Layout

Figure 15:
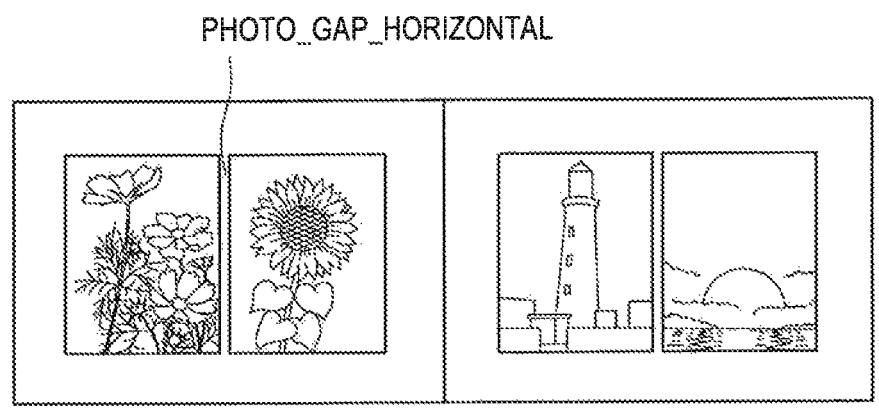
FIG. 15 is an explanatory diagram illustrating a fourth example of a layout generated as a result obtained by performing a process related to an information processing method according to the embodiment using the parameters related to the layout according to the embodiment.

FIG. 15 is an explanatory diagram illustrating a fourth example of the layout generated as a result of performing the process related to the information processing method according to the embodiment using the parameters related to the layout according to the embodiment. Here, FIG. 15 illustrates an example of a layout generated when "a distance between images in the horizontal direction=x" is set as the parameter related to the layout according to the embodiment.

When "the distance between the images in the horizontal direction=x" is set as the parameter related to the layout according to the embodiment, for example, as illustrated in FIG. 15, the layout is generated so that the set parameter is satisfied.

A parameter defining a distance between images according to the embodiment is not limited to the parameter indicating the distance between the images in the horizontal direction. For example, the parameters related to the layout according to the embodiment may include a parameter indicating a distance between images in the vertical direction as the parameter defining a distance between images. When the parameter indicating a distance between images in the vertical direction is included, the distance between the images in the vertical direction is set according to a parameter indicating a distance between images in a set vertical direction.

[e] Fifth Example of Generated Layout

Figure 16:
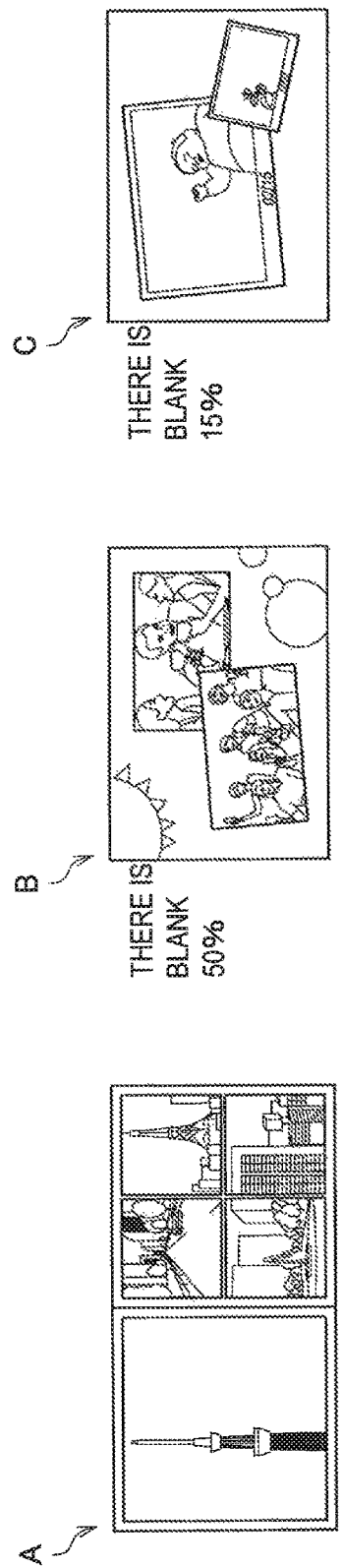
FIG. 16 is an explanatory diagram illustrating a fifth example of a layout generated as a result obtained by performing a process related to an information processing method according to the embodiment using the parameters related to the layout according to the embodiment.

FIG. 16 is an explanatory diagram illustrating a fifth example of the layout generated as a result of performing the process related to the information processing method according to the embodiment using the parameters related to the layout according to the embodiment. Here, A illustrated in FIG. 16 shows an example of a layout generated when "a blank=0 [%]" is set as the parameter related to the layout according to the embodiment. Further, B illustrated in FIG. 16 shows an example of a layout generated when "a blank=50 [%]" is set as the parameter related to the layout according to the embodiment. Furthermore, C illustrated in FIG. 16 shows an example of a layout generated when "a blank=15 [%]" is set as the parameter related to the layout according to the embodiment.

When "the blank=0 [%]" is set as the parameter related to the layout according to the embodiment, for example, as shown in A of FIG. 16, the layout is generated so that the set parameter is satisfied. When "the blank=50 [%]" is set as the parameter related to the layout according to the embodiment, for example, as shown in B of FIG. 16, the layout is generated so that the set parameter is satisfied. When "the blank=15 [%]" is set as the parameter related to the layout according to the embodiment, for example, as shown in C of FIG. 16, the layout is generated so that the set parameter is satisfied.

[f] Sixth Example of Generated Layout

Figure 17:
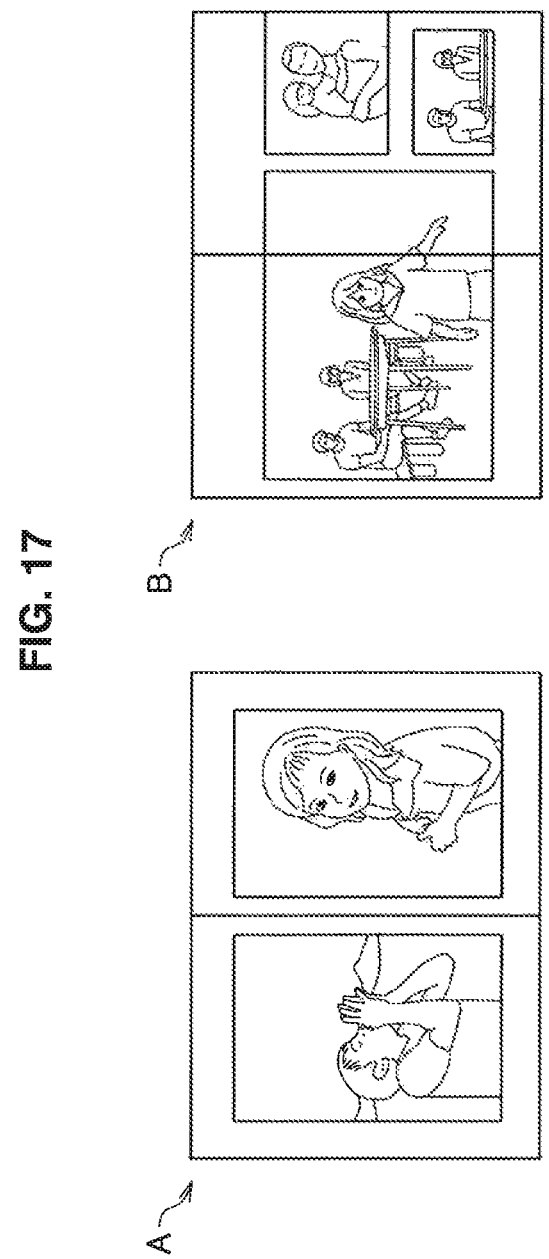
FIG. 17 is an explanatory diagram illustrating a sixth example of a layout generated as a result obtained by performing a process related to an information processing method according to the embodiment using the parameters related to the layout according to the embodiment.

FIG. 17 is an explanatory diagram illustrating a sixth example of the layout generated as a result obtained by performing the process related to the information processing method according to the embodiment using the parameters related to the layout according to the embodiment. Here, A illustrated in FIG. 17 shows an example of a layout generated when a "double-page spread layout=OFF" (which is a parameter for not laying out a double-page spread) is set as the parameter related to the layout according to the embodiment. Further, B illustrated in FIG. 17 shows an example of a layout generated when a "double-page spread layout=ON" (which is a parameter for laying out a double-page spread) is set as the parameter related to the layout according to the embodiment.

When the "double-page spread layout=OFF" is set as the parameter related to the layout according to the embodiment, for example, as shown in A of FIG. 17, the layout is generated so that the set parameter is satisfied. When the "double-page spread layout=ON" is set as the parameter related to the layout according to the embodiment, for example, as shown in B of FIG. 17, the layout is generated so that the set parameter is satisfied.

[g] Seventh Example of Generated Layout

Figure 18:
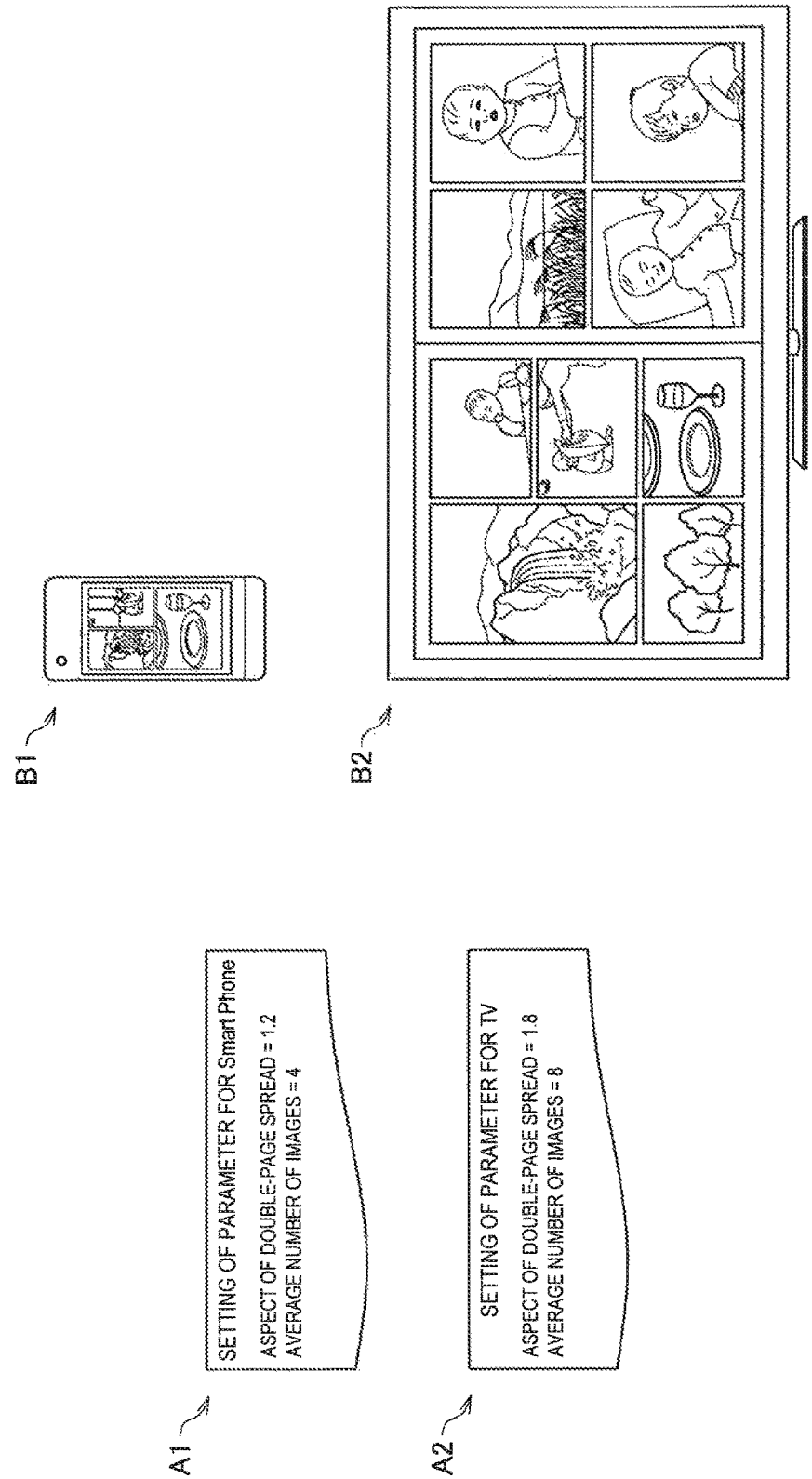
FIG. 18 is an explanatory diagram illustrating a seventh example of a layout generated as a result obtained by performing a process related to an information processing method according to the embodiment using the parameters related to the layout according to the embodiment.

FIG. 18 is an explanatory diagram illustrating a seventh example of the layout generated as a result of performing the process related to the information processing method according to the embodiment using the parameters related to the layout according to the embodiment. A1 illustrated in FIG. 18 shows an example of a parameter related to a layout for a smartphone (which is an example of a display device displaying images disposed in the generated layout). Further, A2 illustrated in FIG. 18 shows an example of a parameter related to a layout for a television receiver (which is an example of a display device displaying images disposed in the generated layout). B1 illustrated in FIG. 18 shows an example of an image displayed on a display screen based on the layout generated according to the parameter related to the layout shown in A1 illustrated in FIG. 18. Further, B2 illustrated in FIG. 18 shows an example of an image displayed on a display screen based on the layout generated according to the parameter related to the layout shown in A2 illustrated in FIG. 18.

For example, as shown in A1 and A2 of FIG. 18, the parameters related to the layout according to the embodiment may include "a parameter corresponding to a kind of display device displaying an image disposed in a generated layout." By including "the parameter corresponding to a kind of display device displaying an image disposed in a generated layout" in the parameters related to the layout according to the embodiment, for example, as shown in B1 and B2 of FIG. 18, it is possible to display a photo hook suitable for the kind of display device displaying the image disposed in the generated layout on the display screen of the display device.

[h] Eighth Example of Generated Layout

In the seventh example which is an example of the generated layout, the case in which "the parameter corresponding to the kind of display device displaying the images disposed in the generated layout" is included in the parameters related to the layout according to the embodiment has been described. However, the parameter included in the parameters related to the layout according to the embodiment is not limited to the parameter corresponding to the kind of display device. For example, the parameters related to the layout according to the embodiment may include "a parameter corresponding to a kind of print setting for printing an image disposed in the generated layout."

By including "the parameter corresponding to the kind of print setting for printing the image disposed in the generated layout" in the parameters related to the layout according to the embodiment, it is possible to print a suitable photo book on a transfer medium such as a sheet according to a printing method.

By performing the process related to the information processing method according to the embodiment using the parameters related to the layout according to the embodiment, for example, the layouts illustrated in the foregoing first to eighth examples are generated. It is needless to say that the examples of the layouts generated as the results obtained by performing the process related to the information processing method according to the embodiment using the parameters related to the layouts according to the embodiment are not limited to the foregoing first to eighth examples.

The information processing device according to the embodiment performs, for example, (1) the evaluation value calculation process, (2) the page allocation process, (3) the image selection process, and (4) the layout generation process, as the process related to the information processing method according to the embodiment.

Here, in the process of the foregoing (2) (the page allocation process), the information processing device according to the embodiment determines the number of pages of a photo book and the number of images to be allocated to each page. In the process of the foregoing (3) (the image selection process), the information processing device according to the embodiment selects the images to be disposed in each page based on the parameters related to the layout according to the embodiment and the evaluation value of each of the candidate images calculated in the process of the foregoing (1) (the evaluation value calculation process). In the process of the foregoing (4) (the layout generation process), the information processing device according to the embodiment generates the layout for each page based on the parameters related to the layout according to the embodiment and the evaluation values corresponding to the images selected in the process of the foregoing (3) (the image selection process).

Accordingly, when the information processing device according to the embodiment performs the process of the foregoing (1) (the evaluation value calculation process) to the process of the foregoing (4) (the layout generation process), for example, one example or two or more examples are realized among the first example (margin), the second example (sparseness and denseness), the third example (rest), the fourth example (directivity of image), the fifth example (balance of areas occupied by images), the sixth example (layout), and the eighth example (frame division) of the above-described photo books with high quality described above. Further, specific examples of the process of the foregoing (1) (the evaluation value calculation process) to the process of the foregoing (4) (the layout generation process) will be described below.

The information processing device according to the embodiment performs the process of the foregoing (3) (the image selection process) and the process of the foregoing (4) (the layout generation process) based on the parameters related to the layout according to the embodiment. Accordingly, the information processing device according to the embodiment can automatically generate the layout of a dynamic photo book by performing a process based on the parameters related to the layout set by a user's operation or the like.

Thus, the information processing device according to the embodiment can automatically generate the layouts to generate a photo book with high quality; for example, by performing the process of the foregoing (1) (the evaluation value calculation process) to the process of the foregoing (4) (the layout generation process).

By automatically generating the layouts to generate the photo book with high quality, the information processing device according to the embodiment can automatically generate the photo book with high quality based on the layouts generated in the process of the foregoing (4) (the layout generation process). Here, a process of generating the photo book based on the layouts generated in the process of the foregoing (4) (the layout generation process) may be performed by, for example, the information processing device according to the embodiment or an external device.

The processes related to the information processing method according to the embodiment are not limited to the process of the foregoing (1) (the evaluation value calculation process) to the process of the foregoing (4) (the layout generation process).

For example, the information processing device according to the embodiment may further perform a process (layout adjustment process) of adjusting the layout generated in the process of the foregoing (4) (the layout generation process) as the process related to the information processing method according to the embodiment.

The information processing device according to the embodiment can realize a photo book with higher quality as in the first example (margin), the ninth example (rotation of frame), or the tenth example (overlapping of frames) of the photo books with high quality described above by performing, for example, (5) the layout adjustment process. Further, a specific example of the process of the foregoing (5) (the layout adjustment process) will be described below.

As the process related to the information processing method according to the embodiment, the information processing device according to the embodiment may also perform a process (image processing) of disposing the images selected in the process of the foregoing (3) (the image selection process) in the layout generated in the process of the foregoing (4) (the layout generation process) or the layout adjusted in the process of the foregoing (5) (the layout adjustment process).

When the information processing device according to the embodiment performs (6) the image processing, a photo book is generated based on the layout generated in the process of the foregoing (4) (the layout generation process) or the layout adjusted in the process of the foregoing (5) (the layout adjustment process). That is, the process of the foregoing (6) (the image processing) corresponds to the process of generating the photo book based on a generated layout or a layout adjusted from the generated layout.

Accordingly, when the information processing device according to the embodiment performs the process of the foregoing (6) (the image processing), it is possible to automatically generate the photo book with high quality in the information processing device according to the embodiment.

In the process of the foregoing (6) (the image processing), for example, the information processing device according to the embodiment may process the images selected in the process of the foregoing (3) (the image selection process) and dispose the processed images in a generated layout or a layout adjusted from the generated layout. By processing the images selected in the process of the foregoing (3) (the image selection process) in the process of the foregoing (6) (the image processing), for example, it is possible to realize a photo book with higher quality such as the seventh example (the image processing) of the photo book with high quality described above.

As the processes related to the information processing method according to the embodiment, the information processing device according to the embodiment performs, for example, "the process of the foregoing (1) (the evaluation value calculation process) to the process of the foregoing (4) (the layout generation process)," "the process of the foregoing (1) (the evaluation value calculation process) to the process of the foregoing (5) (the layout adjustment process)," "the process of the foregoing (1) (the evaluation value calculation process) to the process of the foregoing (4) (the layout generation process) and the process of the foregoing (6) (the image processing)," or "the process of the foregoing (1) (the evaluation value calculation process) to the process of the foregoing (6) (the image processing)." Hereinafter, the processes related to the information processing method according to the embodiment will be described more specifically.

[3] Specific Example of Process Related to Information Processing Method According to Embodiment (1) Evaluation Value Calculation Process The information processing device according to the embodiment calculates an evaluation value of each of the candidate images based on information regarding an image corresponding to each of the candidate images.

Here, the information processing device according to the embodiment calculates the evaluation value of each of the candidate images, for example, by considering all of the candidate images as one group.

The process of the foregoing (1) (the evaluation value calculation process) according to the embodiment is not limited to the foregoing process. For example, the information processing device according to the embodiment may group the candidate images based on the information regarding the image corresponding to each of the candidate images and calculate the evaluation value for each group.

An example of a process related to the grouping of the candidate images according to the embodiment includes a clustering process using information regarding images. Through the clustering process using the information regarding the images, for example, the candidate images are grouped based on events indicated by the images, similarity of the images, or the like. That is, by performing the clustering process using the information regarding the images, the candidate images are grouped from, for example, a perspective of time or a perspective of similar images.

Here, an example of the clustering process by the perspective of time includes the process using the technology disclosed in "Japanese Patent No. 4577173" of which the applicant of the present specification is the patentee. An example of the clustering process by the perspective of similar images includes a process using the technology disclosed in "Japanese Patent No. 4811433" of which the applicant of the present specification is the patentee. The clustering process by the perspective of similar images and the clustering process by the perspective of time according to the embodiment are not limited to the foregoing clustering processes. The information processing device according to the embodiment can perform the grouping using any process capable of performing clustering from the perspective of time or the perspective of similar images.

When the evaluation value is calculated for each group in the process of the foregoing (1) (the evaluation value calculation process), for example, the information processing device according to the embodiment performs the process related to the information processing method according to the embodiment for each group, such as the process of (3) (the image selection process) or the process of (4) (the layout generation process) to be described below. By grouping the candidate images and performing the process related to the information processing method according to the embodiment for each group, for example, a chronological story can be conveyed to the user viewing the images disposed in a photo book. By performing the process related to the information processing method according to the embodiment for each group, for example, it is possible to prevent the same image (similar image) from being disposed in a photo book often.

Hereinafter, the process of (1) (the evaluation value calculation process) will be described mainly exemplifying a case in which the information processing device according to the embodiment groups the candidate images and performs the process.

Figure 19:
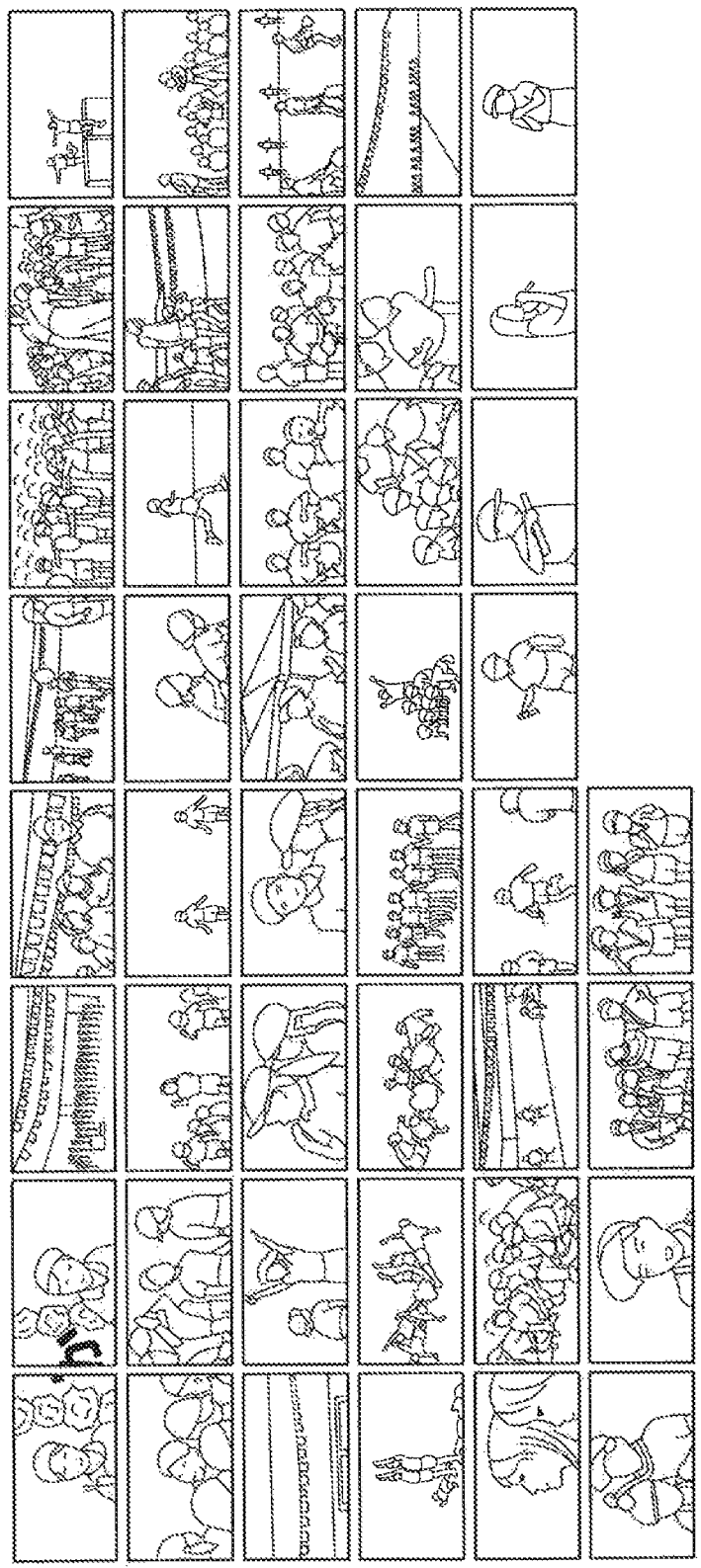
FIG. 19 is an explanatory diagram illustrating an example of a process related to the information processing method according to the embodiment.

FIG. 19 is an explanatory diagram illustrating an example of the process related to the information processing method according to the embodiment and illustrates examples of the candidate images according to the embodiment. FIG. 19 illustrates 44 captured images captured at a sports festival as the candidate images.

The information processing device according to the embodiment first groups the candidate images using the information regarding the image corresponding to each of the candidate images illustrated in FIG. 19.

Figure 20:
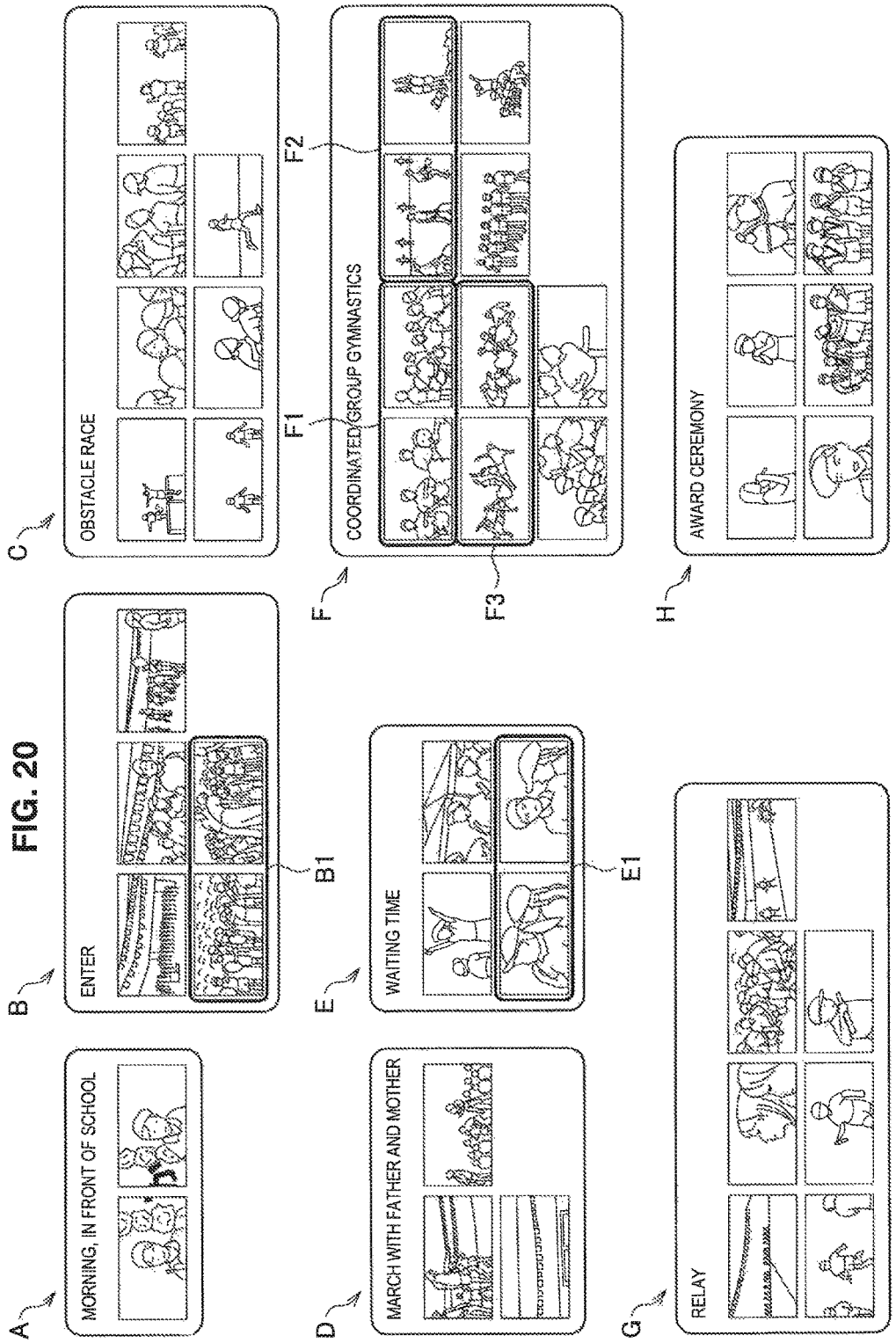
FIG. 20 is an explanatory diagram illustrating an example of a process related to the information processing method according to the embodiment.

FIG. 20 is an explanatory diagram illustrating an example of the process related to the information processing method according to the embodiment. FIG. 20 illustrates an example of a result obtained by grouping the candidate images illustrated in FIG. 19 from the perspective of time and grouping similar images in each group. A to H illustrated in FIG. 20 show groups of the candidate images. B1, E1, and F1 to F3 illustrated in FIG. 20 show the groups of the similar images.

For example, as illustrated in FIG. 20, when the candidate images are grouped, the information processing device according to the embodiment performs the process related to the information processing method according to the embodiment, such as the process of (3) (the image selection process) or the process of (4) (the layout generation process) for each group.

Figure 21:
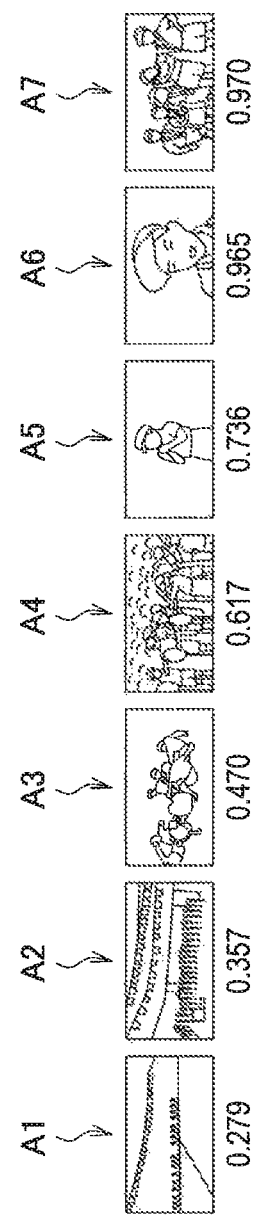
FIG. 21 is an explanatory diagram illustrating an example of a process related to the information processing method according to the embodiment.

FIG. 21 is an explanatory diagram illustrating an example of the process related to the information processing method according to the embodiment and illustrates examples of the evaluation values calculated by the information processing device according to the embodiment. A1 to A7 illustrated in FIG. 21 show examples of the evaluation values calculated for some images included in the candidate images illustrated in FIG. 20.

The information processing device according to the embodiment calculates, for example, the evaluation values which fall within the range of values of 0.0 to 1.0 for the candidate images.

More specifically, for example, the information processing device according to the embodiment detects a predetermined subject such as a face from the candidate images. Here, for example, the information processing device according to the embodiment detects a region including the subject through any face detection process, any object detection process, or the like. Then, the information processing device according to the embodiment determines an evaluation value corresponding to an area of the entire image occupied by a region (for example, a rectangular region) including the detected subject. For example, the information processing device according to the embodiment determines the evaluation value corresponding to the area of the entire image occupied by the region including the detected subject by referring to a table or the like in which the area of the entire image occupied by the region including the detected subject corresponds to the evaluation value.

Further, the information processing device according to the embodiment may analyzes the region including the detected subject and may also add or subtract the evaluation value according to the analysis result. Here, examples of a process related to the analysis of the region including the detected subject include any expression detection process, any face direction determination process, and any blur estimation process.

For example, when the detected subject is the face of a person, the information processing device according to the embodiment adds or subtracts the evaluation value according to an expression or a face direction. More specifically, when the detected face of the person (which is an example of the predetermined subject) is a smiling face, for example, the information processing device according to the embodiment adds a predetermined value according to the expression to the evaluation value. When the detected face of the person (which is an example of the predetermined subject) is an angry face or a crying face, the information processing device according to the embodiment subtracts a predetermined value according to the expression from the evaluation value. When the direction of the detected face of the person (which is an example of the predetermined subject) is forward, the information processing device according to the embodiment adds a predetermined value according to the direction of the face to the evaluation value. When the direction of the detected face of the person (which is an example of the predetermined subject) is sideward, the information processing device according to the embodiment subtracts a predetermined value according to the direction of the face from the evaluation value. When the detected face of the person (which is an example of the predetermined subject) is blurred, the information processing device according to the embodiment subtracts a predetermined value corresponding to the blurring from the evaluation value. Here, the information processing device according to the embodiment specifies addition and subtraction values of the evaluation values corresponding to the analysis results, for example, by referring to a table or the like in which the analysis results correspond to the addition and subtraction values of the evaluation value.

The process of calculating the evaluation value according to the embodiment is not limited to the process of calculating the evaluation value based on a predetermined subject detected from the candidate image.

For example, the information processing device according to the embodiment may detect a change in the luminance or color of the candidate image, detect a region of interest which is a region with the change greater than a set value, and determine the evaluation value. More specifically, for example, the information processing device according to the embodiment determines the evaluation value corresponding to the area of the entire image occupied by the detected region of interest.

Here, the information processing device according to the embodiment determines the evaluation value corresponding to the area of the entire image occupied by the detected region of interest, for example, by referring to a table or the like in which the of the evaluation value corresponds to the area of the entire image occupied by the detected region of interest. For example, the evaluation value corresponding to the area of the entire image occupied by the region of interest is assumed to be a value less than the evaluation value corresponding to the area of the entire image occupied by the region including the above-described subject. The evaluation value corresponding to the area of the entire image occupied by the region of interest may be, for example, the same value as the evaluation value corresponding to the area of the entire image occupied by the region including the above-described subject or a value greater than the evaluation value corresponding to the area of the entire image occupied by the region including the above-described subject.

For example, the information processing device according to the embodiment may detect colors from the candidate images and determine the evaluation value based on the number of detected colors (corresponding to a color variation). More specifically; the information processing device according to the embodiment determines the evaluation value corresponding to the number of detected colors, for example, by referring to a table or the like in which the number of detected colors corresponds to the evaluation value.

For example, the information processing device according to the embodiment may estimate the degree of blurring of the candidate image and adjust the evaluation value based on the estimated degree of blurring. More specifically, the information processing device according to the embodiment determines an adjustment value of the evaluation value corresponding to the estimated degree of blurring, for example, by referring to a table or the like showing the relation between the degree of blurring and the evaluation value. Here, an example of the foregoing adjustment value includes a negative value which is negatively larger as the estimated degree of blurring is larger.

The example of the process of calculating the evaluation value for the candidate image which is a still image has been described above, but the candidate image for which the evaluation value is calculated by the information processing device according to the embodiment is not limited to the still image.

For example, the information processing device according to the embodiment can also calculate an evaluation value for a candidate image which is a moving image, for example, by using the technology for calculating a score from a moving image, as disclosed in "JP 2010-191934A" filed by the applicant of the present specification. Hereinafter, an example of the process related to the information processing method according to the embodiment will be described exemplifying a case in which the candidate image according to the embodiment is a still image.

(2) Page Allocation Process

The information processing device according to the embodiment determines the number of pages based on the parameters related to the layout according to the embodiment and determines the number of images disposed in each page based on the evaluation value calculated in the process of the foregoing (1) (the evaluation value calculation process).

(2-1) Process Related to Determination of Number of Pages

Figure 22:
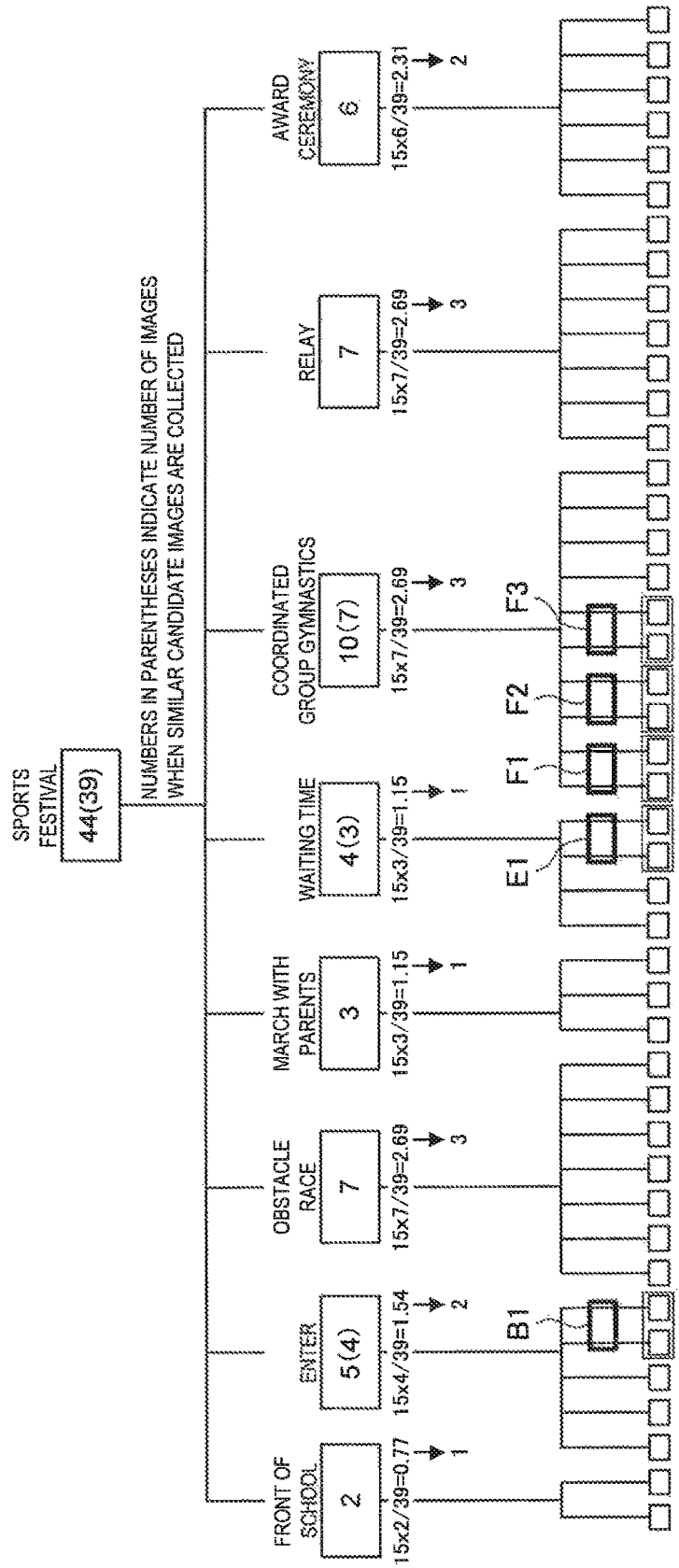
FIG. 22 is an explanatory diagram illustrating an example of a process related to the information processing method according to the embodiment.

FIGS. 22 and 23 are explanatory diagrams illustrating an example of the process related to the information processing method according to the embodiment. FIG. 22 illustrates an example of the process related to the determination of the number of pages performed for each group according to the embodiment. FIG. 23 illustrates images of the pages allocated for each group.

For example, the information processing device according to the embodiment determines the number of pages based on the parameters related to the layouts according to the embodiment.

More specifically, the information processing device according to the embodiment determines the number of pages, for example, by referring to the parameter related to the maximum number of pages, such as "the maximum number of pages=30" (which is an example of the parameter related to the layout according to the embodiment). The information processing device according to the embodiment may determine the number of double-page spreads, for example, by halving the number of pages.

As described with reference to FIG. 12, for example, when the number of candidate images is small, the information processing device according to the embodiment may determine the number of pages less than the maximum number indicated by the parameter related to the layout according to the embodiment. The information processing device according to the embodiment determines the number of pages equal to or less than the maximum number indicated by the parameter related to the layout and corresponding to the number of candidate images, for example, by referring to a table or the like in which the number of pages corresponds to the lower limit of the number of candidate images.

For example, as illustrated in FIG. 20, when the candidate images are grouped, the information processing device according to the embodiment allocates the number of pages or the number of double-page spreads for each group. As illustrated in FIG. 22, an example of the method of allocating the number of pages or the number of double-page spreads for each group includes a method of performing calculation using the parameter related to the maximum number of pages (which is an example of the parameter related to the layout according to the embodiment), the number of candidate images included in the group, and the total number of candidate images and rounding off a calculation result. Here, FIG. 22 illustrates an example of the calculation of determining the number of double-page spreads allocated for each group.

(2-2) Process Related to Determination of Number of Images

Figure 24:
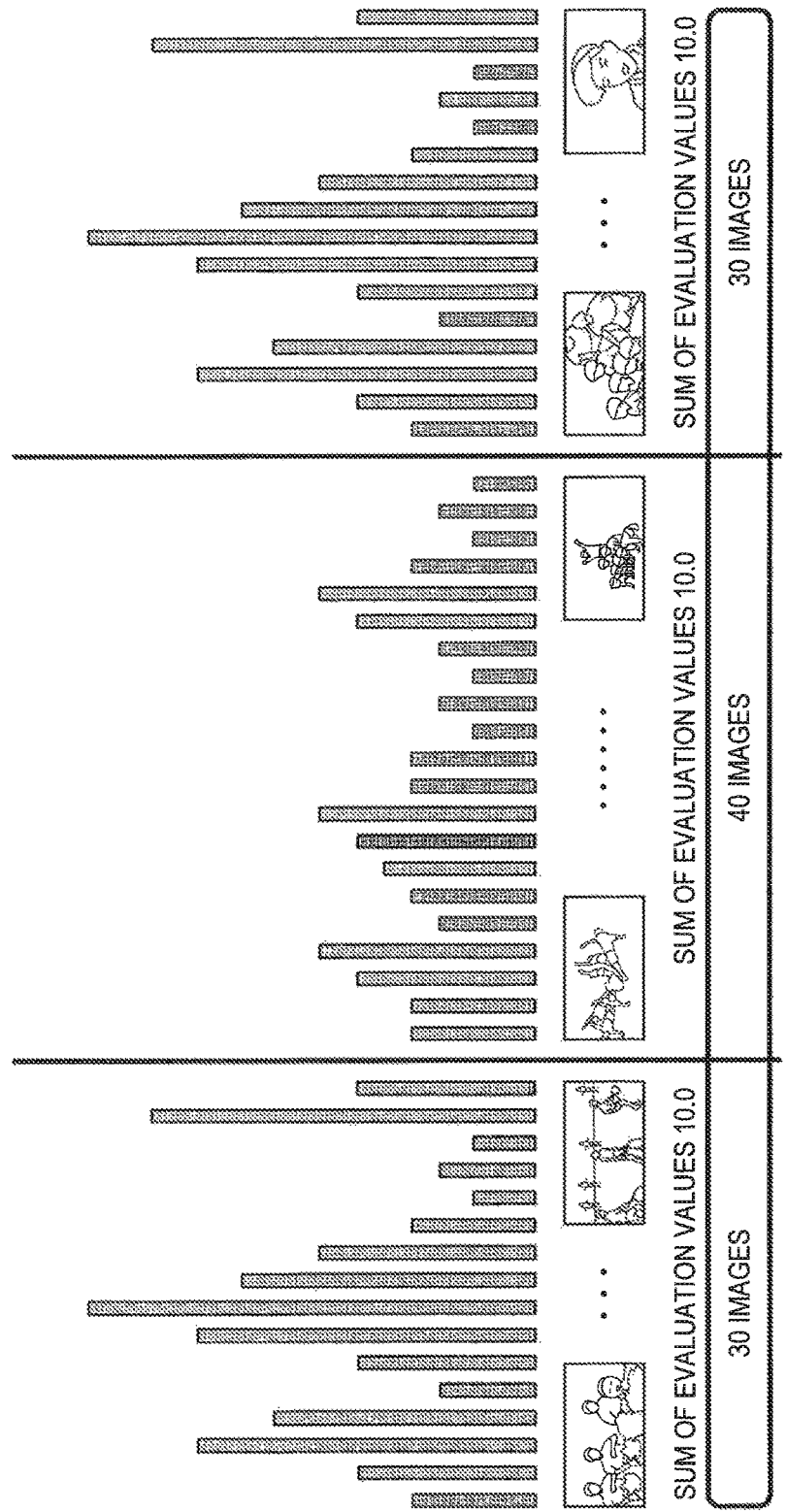
FIG. 24 is an explanatory diagram illustrating an example of a process related to the information processing method according to the embodiment.
Figure 25:
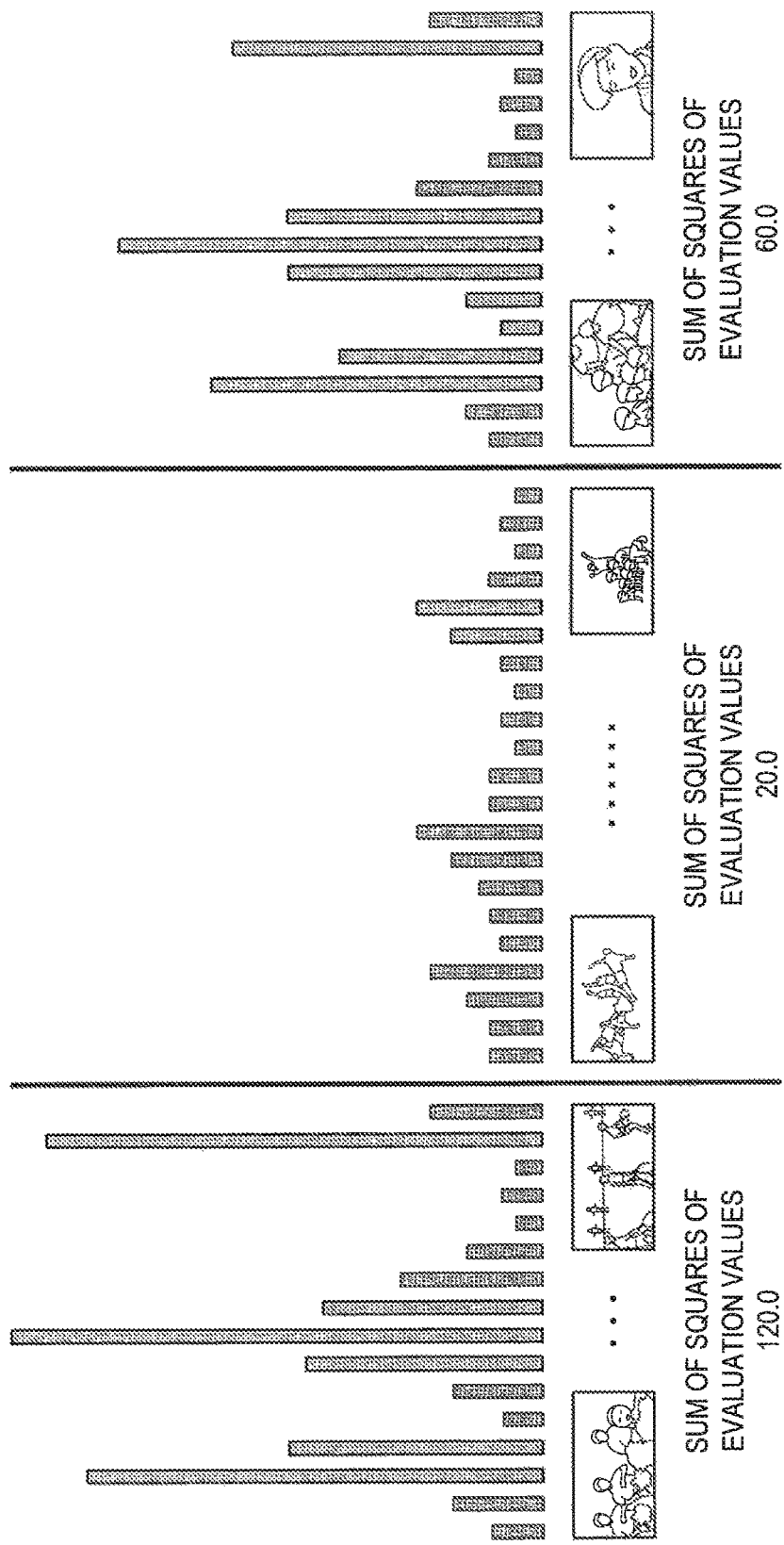
FIG. 25 is an explanatory diagram illustrating an example of a process related to the information processing method according to the embodiment.

FIGS. 24 to 26 are explanatory diagrams illustrating an example of the process related to the information processing method according to the embodiment and illustrate an example of the process related to the determination of the number of images according to the embodiment. Here, FIGS. 24 to 26 illustrate a case in which the candidate images illustrated in FIG. 20 are grouped in the process of the foregoing (1) (the evaluation value calculation process). Even when the candidate images are not grouped in the process of the foregoing (1) (the evaluation value calculation process), the information processing device according to the embodiment can determine the number of images disposed in each page or each double-page spread through the same process.

For example, as illustrated in FIG. 24, the information processing device according to the embodiment determines the number of candidate images for each page or each double-page spread so that a total sum of the evaluation values of the images in each page or each double-page spread is equalized. For example, when the number of candidate images is 100, a total sum of the evaluation values is 30.0 points, and the determined number of pages is 6 (that is, the number of double-page spreads is 3), the information processing device according to the embodiment determines the number of candidate images for each double-page spread so that the total sum of the evaluation values of the images in one double-page spread is "30.0/3=10.0 [points]," as illustrated in FIG. 24.

When the number of candidate images is determined for each page or each double-page spread, the information processing device according to the embodiment calculates a sum of squares of the evaluation values of the images in each page or each double-page spread. FIG. 25 illustrates an example in which the information processing device according to the embodiment calculates a sum of squares of the evaluation values of the images in each double-page spread. Here, the information processing device according to the embodiment calculates the sum of squares of the ID evaluation values of the images in each page or each double-page spread because a difference between the pages or the double-page spreads is enlarged. For example, the information processing device according to the embodiment may calculate a sum of cubes of the evaluation values of the images in each page or each double-page spread or may apply a strong high-pass filter to the evaluation values of the images in each page or each double-page spread.

When the sum of squares of the evaluation values of the images in each page or each double-page spread is calculated, the information processing device according to the embodiment determines the number of images to be allocated to each page or each double-page spread based on the parameters related to the layout according to the embodiment and the calculated sum of squares of the evaluation values of the images in each page or each double-page spread.

More specifically, for example, the information processing device according to the embodiment determines a total number of images to be disposed in a photo book based on "the number of pages or the number of double-page spreads determined through the process related to the foregoing determination of the number of pages," and "the parameter indicating the average number of images of each page (which is an example of the parameter related to the layout according to the embodiment)" or "the parameter indicating the average number of images of each double-page spread (which is an example of the parameter related to the layout according to the embodiment)." For example, when the number of double-page spreads determined through the process related to the determination of the number of pages is 3 and the parameter indicating the average number of images of each double-page spread is 3, the information processing device according to the embodiment determines "3×3=9" images as the total number of images to be disposed in the photo book.

When the total number of images to be disposed in the photo book is determined, for example, the information processing device according to the embodiment calculates a reciprocal of the sum of squares of the evaluation values and proportionally allocates the number of images to each page or each double-page spread.

More specifically, for example, as illustrated in FIG. 26, for example, the information processing device according to the embodiment calculates a reciprocal of the sum of squares of the evaluation values and determines the number of images to be disposed in each page or each double-page spread through calculation using the total number of images to be disposed in the photo book and the reciprocal of the sum of squares of the evaluation value. Here, FIG. 26 illustrates an example in which the information processing device according to the embodiment determines the number of images to be disposed in each double-page spread.

For example, as described above, by calculating the reciprocal of the sum of squares of the evaluation values and proportionally allocating the number of images to each page or each double-page spread, the information processing device according to the embodiment can reduce the number of images as the page or the double-page spread has a larger total sum of evaluation values.

For example, the information processing device according to the embodiment determines the number of pages (or the number of double-page spreads) and the number of images to be disposed in each page (or each double-page spread) by performing the process of the foregoing (2-1) (the process related to the determination of the number of pages) and the process of the foregoing (2-2) (the process related to the determination of the number of images).

The process of (2) (the page allocation process) according to the embodiment is not limited to the foregoing example. For example, when the minimum or maximum value of the number of images to be disposed in each page or each double-page spread is set in the parameter related to the layout according to the embodiment, the information processing device according to the embodiment may adjust the number of pages (or the number of double-page spreads) and the number of images to be disposed in each page (or each double-page spread) so that the minimum or maximum value is satisfied.

For example, the information processing device according to the embodiment can realize, for example, the third example (rest) of the photo book with high quality described above and the sixth example (layout) of the photo book with high quality described above by determining the number of pages (or the number of double-page spreads) and the number of images to be disposed in each page (or each double-page spread), as described above.

(3) Image Selection Process

For example, the information processing device according to the embodiment selects images from the candidate images based on the parameters related to the layout according to the embodiment and the evaluation values calculated in the process of the foregoing (1) (the evaluation value calculation process). The information processing device according to the embodiment selects images from the candidate images for each group when the candidate images are grouped in the process of the foregoing (1) (the evaluation value calculation process).

More specifically, the information processing device according to the embodiment classifies the candidate images, for example, based on a comparison result between the calculated evaluation values and a predetermined threshold value. Then, for example, the information processing device according to the embodiment selects images for each group of the classified candidate images.

Here, examples of the classification of the candidate images include the candidate images which are candidates for the rest image according to the embodiment and the candidate images which are not candidates for the rest image according to the embodiment. Hereinafter, the image selected from the candidate images which are the candidates for the rest image according to the embodiment is referred to as "the rest image according to the embodiment" or "a rest" in some cases. Hereinafter, the image selected from the candidate images which are not the candidates for the rest image according to the embodiment are referred to as "work images according to the embodiment" or "work" in some cases.

An example of the predetermined threshold value according to the embodiment includes a median value of the evaluation values of the candidate images. The predetermined threshold value according to the embodiment is not limited to the foregoing value. For example, the predetermined threshold value according to the embodiment may be a fixed value set in advance or may be a variable value set based on a user's operation or the like.

Figure 27:
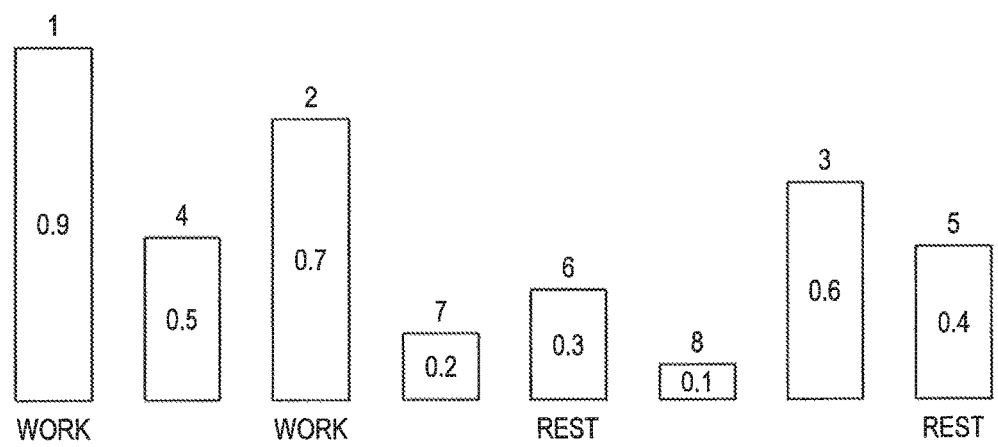
FIG. 27 is an explanatory diagram illustrating an example of a process related to the information processing method according to the embodiment.

FIG. 27 is an explanatory diagram illustrating an example of the process related to the information processing method according to the embodiment and illustrates examples of the images selected in the process of (3) (the image selection process). Here, FIG. 27 illustrates an example in which the predetermined threshold value is the median value of the evaluation values of the candidate images. In FIG. 27, the evaluation value is indicated in the form of a bar graph. Numbers "1" to "8" illustrated in FIG. 27 indicate an order from the largest evaluation value. In FIG. 27, the selected images are indicated by "work" and "rest."

For example, the information processing device according to the embodiment distributes the number of images determined in the process of the foregoing (2) (the page allocation process) into a first image number by which the work images according to the embodiment are selected and a second image number by which the rest images according to the embodiment are selected. Here, for example, the distribution into the first image number and the second image number may be set in advance or may be set in the parameters related to the layout according to the embodiment. For example, the distribution of the first image number and the second image number may be set through a user's operation or the like.

For example, the information processing device according to embodiment selects the first image number of candidate images as the work images according to the embodiment in order from the largest evaluation value among the candidate images with a value equal to or greater than the predetermined threshold value (or the candidate images with the value greater than the predetermined threshold value; the same applies below). For example, FIG. 27 illustrates an example in which the information processing device according to the embodiment selects the candidate images denoted by the numbers "1" and "2" as the work images according to the embodiment. Here, the images selected in order from the largest evaluation value among the candidate images with the value equal to or greater than the predetermined threshold value corresponding to the work images according to the embodiment.

For example, the information processing device according to the embodiment selects the second image number of candidate images as the rest images according to the embodiment in order from the largest evaluation value among the candidate images with a value less than the predetermined threshold value (or the candidate images with the value equal to or less than the predetermined threshold value; the same applies below). For example, FIG. 27 illustrates an example in which the information processing device according to the embodiment selects the candidate images denoted by the numbers "5" and "6" as the rest images according to the embodiment. Here, the images selected in order from the largest evaluation value among the candidate images with the value less than the predetermined threshold value correspond to the rest images according to the embodiment.

For example, as described above, the information processing device according to the embodiment selects the work images according to the embodiment and the rest images according to the embodiment by selecting the images for each group of the classified candidate images. For example, the information processing device according to the embodiment can realize the third example (rest) of the photo book with high quality described above by selecting the work images according to the embodiment and the rest images according to the embodiment, as described above.

The process of (3) (the image selection process) according to the embodiment is not limited to the foregoing process. For example, the information processing device according to the embodiment may determine the directivity of images in the candidate images for each group of the classified candidate images and select the images based on the further determined directivity of the images.

Figure 28:
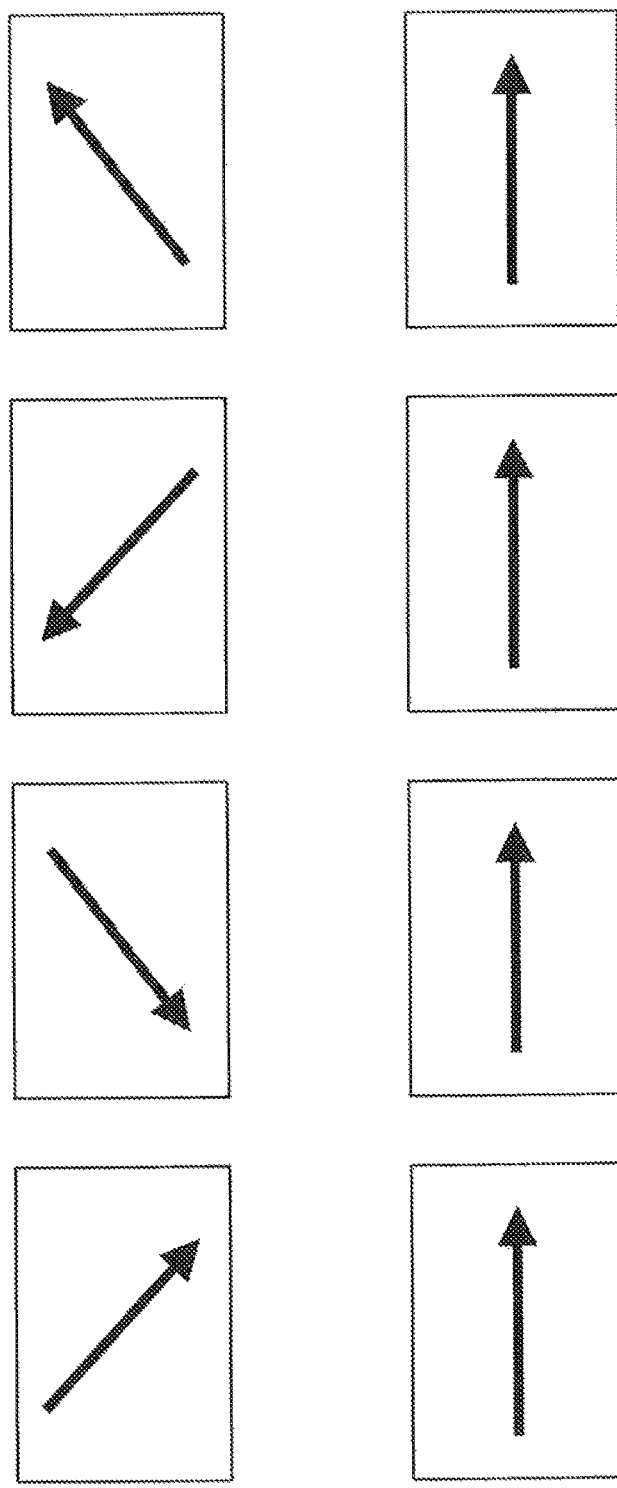
FIG. 28 is an explanatory diagram illustrating an example of a process related to the information processing method according to the embodiment.

FIG. 28 is an explanatory diagram illustrating an example of the process related to the information processing method according to the embodiment and illustrates an example of the process related to the selection of the images based on the directivity of the images. A illustrated in FIG. 28 shows examples (that is, examples of OK cases) of the directivity of the images selected by the information processing device according to the embodiment. B illustrated in FIG. 28 shows examples (that is, examples of NG cases) of the directivity of the images not selected by the information processing device according to the embodiment.

As described in the fourth example (directivity of image) of the photo book with high quality described above, an example of the method of further improving the quality of the photo book includes varying the directivity of each of the disposed images. Accordingly, for example, when the information processing device according to the embodiment selects the images, selection of the images of which the direction of the image is constant, as shown in B of FIG. 28, is avoided.

More specifically, for example, when the information processing device according to the embodiment selects the images in order from the largest evaluation value among the candidate images with the value equal to or greater than the predetermined threshold value or in order from the largest evaluation value among the candidate images with the value less than the predetermined threshold value, the information processing device according to the embodiment does not select the image (or the image of which the directivity is substantially the same) of which the directivity is the same as the immediately previous image even if the selected image is the image of which the evaluation value is high.

For example, as described above, by skipping the image to be selected based on the directivity of the image, it is possible to realize variation in the directivity of each of the disposed images, for example, as shown in A of FIG. 28. When the information processing device according to the embodiment selects the images in order from the largest evaluation value among the candidate images with the value equal to or greater than the predetermined threshold value or in order from the largest evaluation value among the candidate images with the value less than the predetermined threshold value and when the directivity of all of the candidate images is the same (or substantially the same), the information processing device according to the embodiment selects the images, for example, without using the directivity of the images.

For example, the information processing device according to the embodiment can realize the fourth example (directivity of image) of the photo book with high quality described above, for example, by selecting the images based on the directivity of the images determined as described above.

(4) Layout Generation Process

The information processing device according to the embodiment generates the layout for each page based on the parameters related to the layout according to the embodiment and the evaluation values corresponding to the images selected in the process of the foregoing (3) (the image selection process). When the candidate images are grouped in the process of the foregoing (1) (the evaluation value calculation process), the information processing device according to the embodiment generates the layout for each group.

More specifically, the information processing device according to the embodiment generates the layout, for example, by disposing the regions in which the images are disposed in the pages based on the number of images disposed in the pages determined in the process of the foregoing (2) (the page allocation process the determined number of images disposed in the pages and the evaluation values corresponding to the images selected in the process of the foregoing (3) (the image selection process). Here, an example of the pages in which the regions in which the images according to the embodiment are disposed are disposed includes each page of the photo book, but the pages in which the regions in which the images according to the embodiment are disposed are disposed are not limited to the foregoing pages. For example, the pages in which the regions in which the images according to the embodiment are disposed are disposed may be double-page spread pages including two pages.

For example, the information processing device according to the embodiment may generate the layout based on the parameters related to the layout according to the embodiment and/or the information regarding the images corresponding to the selected images.

Here, examples of the process related to the generation of the layout based on the parameters related to the layout according to the embodiment include a region disposition process using an aspect ratio of the page (which is an example of the parameter related to the layout according to the embodiment), as will be described below, and a blank region disposition process using the parameter related to the blank in the page according to the embodiment (which is an example of the parameter related to the layout according to the embodiment), as will be described below. An example of the process related to the generation of the layout based on the information regarding the images corresponding to the selected images according to the embodiment includes a region disposition process using an aspect ratio (information regarding the image according to the embodiment) of the image, as will be described below.

Figure 29:
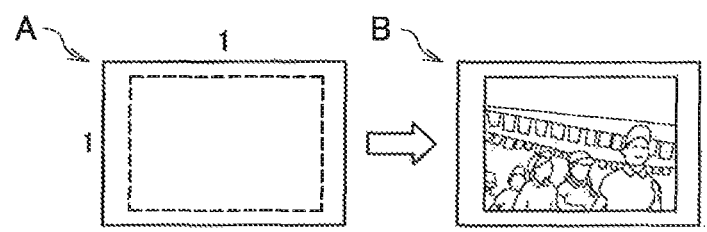
FIG. 29 is an explanatory diagram illustrating an example of a process related to the information processing method according to the embodiment.
Figure 30:
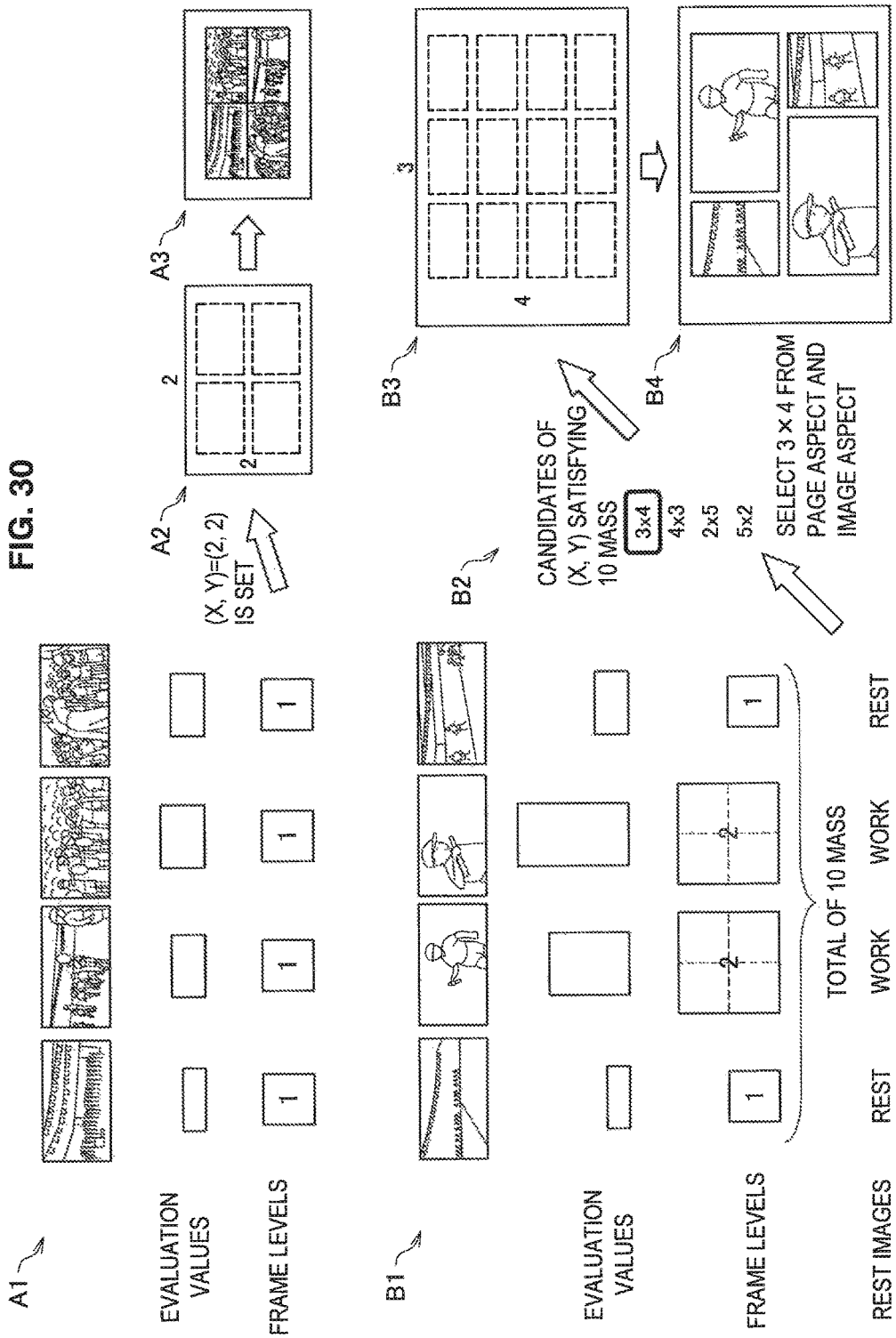
FIG. 30 is an explanatory diagram illustrating an example of a process related to the information processing method according to the embodiment.

FIGS. 29 and 30 are explanatory diagrams illustrating an example of the process related to the information processing method according to the embodiment and illustrate an example of the process of (4) (the layout generation process). A illustrated in FIG. 29 shows an example of a layout generated when a region in which one image is disposed is disposed in a page. B illustrated in FIG. 29 shows an example of a page in which the region in which the image selected in the process of the foregoing (3) (the image selection process) is disposed is disposed in the generated layout. A1, A2, and B1 to B3 illustrated in FIG. 30 show examples of the layouts generated when the regions in which four images are disposed are disposed in a page. A3 and B4 illustrated in FIG. 30 show examples of the pages in which the regions in which the images selected in the process of the foregoing (3) (the image selection process) are disposed are disposed in the generated layouts.

When a region in which one image is disposed is disposed in a page, the information processing device according to the embodiment disposes a region with the number of grids "(X, Y)=(1, 1)" in the page as the region in which the image is disposed, for example, as shown in A of FIG. 29.

When a region in which two or more images are disposed is disposed in a page, the information processing device according to the embodiment determines a level (hereinafter referred to as a "frame level" in some cases) of the size of the selected images in the generated layout based on the evaluation values of the selected images, for example, as shown in A1 and B1 of FIG. 30 (frame level determination process). Here, the level of the size of the generated layout of the selected images according to the embodiment is an index that indicates how many grids the selected images occupy; for example, when the region in which the images are disposed is indicated by the grids.

Then, for example, as shown in A2, B2, and B3 of FIG. 30, the information processing device according to the embodiment disposes the region in which the images are disposed and generates the layout (region disposition process).

(4-1) Frame Level Determination Process

Figure 31:
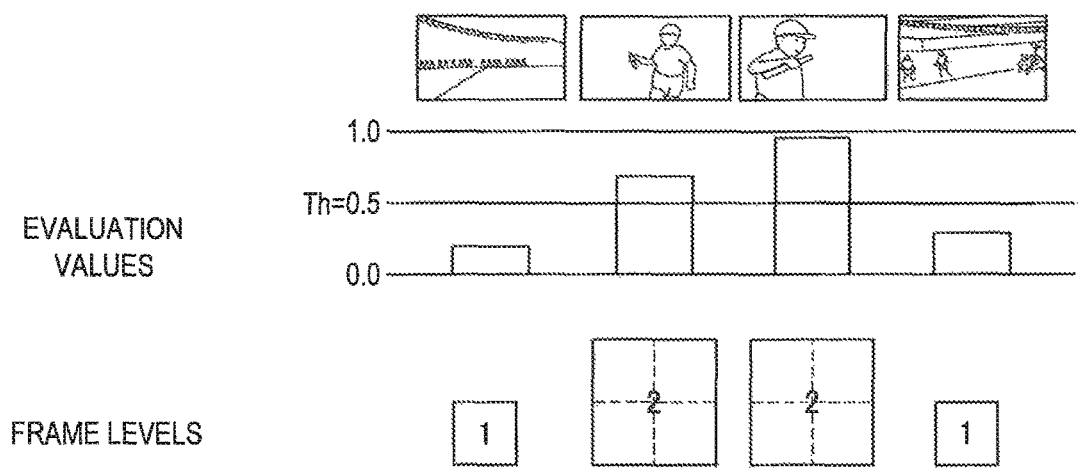
FIG. 31 is an explanatory diagram illustrating an example of a process related to the information processing method according to the embodiment.

FIG. 31 is an explanatory diagram illustrating an example of the process related to the info, illation processing method according to the embodiment and illustrates an example of the frame level determination process according to the embodiment. Here, FIG. 31 illustrates an example of the frame level determination process according to the embodiment when the information processing device according to the embodiment classifies the images selected in the process of the foregoing (3) (the image selection process) into two levels, frame level 1 (for example, a level indicating that one grid is occupied when a region in which an image is disposed is indicated by a grid) and frame level 2 (for example, a level indicating that four grids are occupied when a region in which an image is disposed is indicated by the grid).

The information processing device according to the embodiment determines the frame level of each image, for example, by performing a threshold value process using a predetermined threshold value (Th illustrated in FIG. 31) and the evaluation values of the selected images.

FIG. 31 illustrates an example in which "Th=0.5" is set as the predetermined threshold value, but the threshold value used in the frame level determination process according to the embodiment is not limited to the foregoing threshold value. For example, the information processing device according to the embodiment may perform the frame level determination process according to the embodiment using a threshold value set in advance other than 0.5 or a threshold value set based on a user's operation or the like.

FIG. 31 illustrates an example in which the information processing device according to the embodiment determines the frame level of each image by classifying the images selected in the process of the foregoing (3) (the image selection process) into two frame levels, frame level 1 and frame level 2. However, the frame levels determined by the information processing device according to the embodiment are not limited to the foregoing frame levels. For example, the information processing device according to the embodiment may determine the frame level of each image by classifying the images into three or more frame levels, such as three frame levels, "frame level 1, frame level 2, and frame level 3 (for example, a level indicating that nine grids are occupied when a region in which an image is disposed is indicated by the grid)." When the selected images are each classified into three or more frame levels, the frame level of each image is determined through a threshold value process using a plurality of predetermined threshold values (which are examples of predetermined threshold values when the images are classified into three frame levels), e.g., Th1=0.33, Th2=0.67, and the like.

The information processing device according to the embodiment can realize, for example, the third example (rest) of the photo book with high quality described above, for example, by determining the frame levels, as described above.

(4-2) Region Disposition Process

Figure 32:
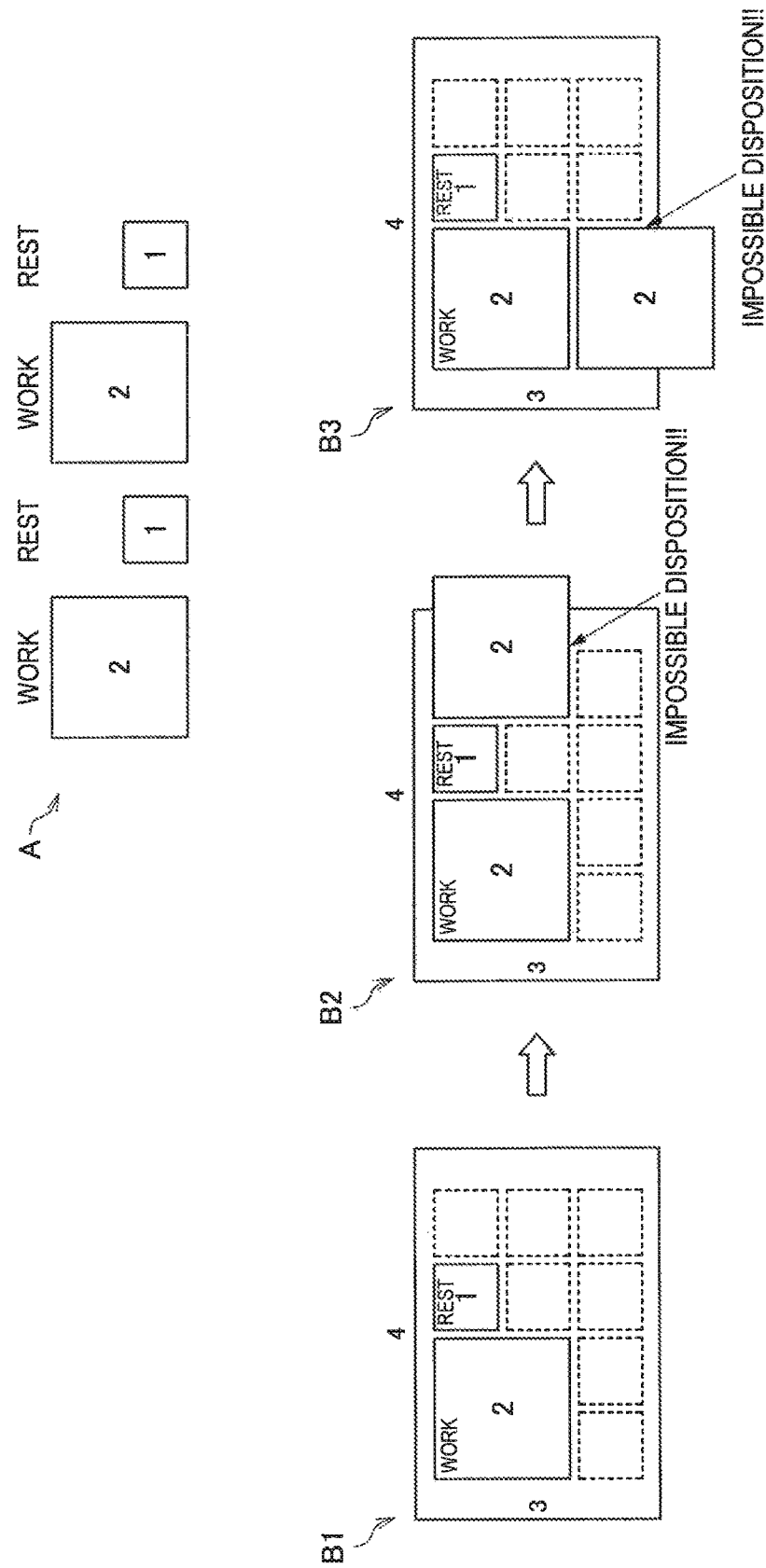
FIG. 32 is an explanatory diagram illustrating an example of a process related to the information processing method according to the embodiment.
Figure 33:
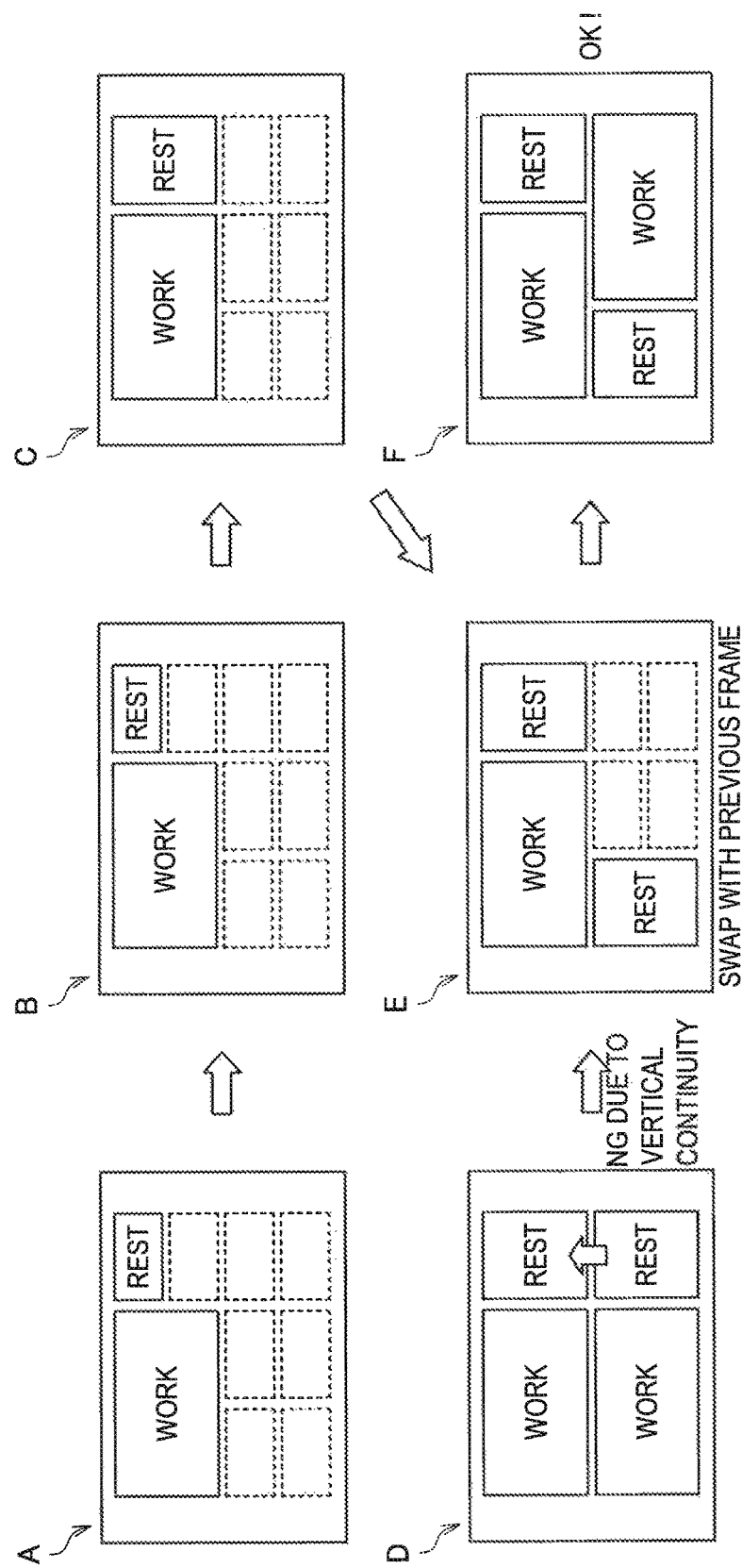
FIG. 33 is an explanatory diagram illustrating an example of a process related to the information processing method according to the embodiment.

FIGS. 32 and 33 are explanatory diagrams illustrating an example of the process related to the information processing method according to the embodiment and illustrate an example of the region disposition process according to the embodiment. Here, FIG. 32 illustrates an overview of the region disposition process according to the embodiment and FIG. 33 illustrates examples of the regions which are disposed through the region disposition process according to the embodiment and in which the images are disposed. Hereinafter, an example of the region disposition process according to the embodiment will be described exemplifying a case in which the frame levels of the images selected in the process of the foregoing (3) (the image selection process) are frame level 1 which two images (for example, corresponding to the rest images according to the embodiment) have and frame level 2 which two images (for example, corresponding to the work images according to the embodiment) have, for example, as shown in A of FIG. 32.

For example, the information processing device according to the embodiment disposes regions in which the images are disposed so that the rest images according to the embodiment are not continuously disposed. For example, as described above, the third example (rest) of the photo book with high quality according to the above-described embodiment is realized, for example, by disposing the regions in which the images are disposed so that the rest images according to the embodiment are not continuously disposed.

For example, the information processing device according to the embodiment expresses the regions in which the images are disposed in the page using the grids and disposes the regions in which the selected images are disposed from the top left side to the bottom right side of the page, for example, as shown in B1 to B3 of FIG. 32.

Here, for example, as illustrated in FIG. 32, when the regions in which the images are disposed in the page are expressed by the regions of the number of grids "(X, Y)=(4, 3)," as shown in B2 and B3 of FIG. 32, it is difficult to dispose the regions in which all of the images shown in A of FIG. 32 are disposed. Accordingly, the information processing device according to the embodiment determines that it is difficult to the regions in which the images are disposed in the page as the regions of the number of grids "(X, Y)=(4, 3)."

When the information processing device according to the embodiment determines that it is difficult to express the regions in which the images are disposed in the page as the region of one grid (X, Y), as described above, the information processing device according to the embodiment expresses the regions in which the images are disposed in the page as the regions of another number of grids (X, Y) and disposes the regions in which the selected images are disposed from the top left side to the bottom right side of the page again, for example, as illustrated in FIG. 33. Here, FIG. 33 illustrates a case in which the information processing device according to the embodiment expresses the regions in which the images are disposed in the page as the regions of the number of grids "(X, Y)=(3, 4)."

For example, as shown in F of FIG. 33, when the regions in which all of the images shown in A of FIG. 32 are disposed can be disposed, the information processing device according to the embodiment generates the regions in which the images, in the case in which the regions in which all of the images are disposed are disposed, are disposed in the page.

Here, as shown in B and C of FIG. 33, for example, the information processing device according to the embodiment may enlarge the region in which an image is disposed more than the region corresponding to the frame level of the image. For example, the information processing device according to the embodiment enlarges the region in which an image is disposed more than the region corresponding to the frame level of the image based on the degree of blank indicated by a parameter related to the blank of the page according to the embodiment (which is an example of the parameter related to the layout according to the embodiment).

As shown in D of FIG. 33, when the regions in which the selected images are disposed are disposed and the rest images according to the embodiment are continuously disposed, as shown in E of FIG. 33, a region in which the previously disposed selected image is disposed may be swapped with the region in which the rest image according to the embodiment is disposed. For example, when regions corresponding to blanks are continuously disposed as in the rest images according to the embodiment shown in D of FIG. 33, the information processing device according to the embodiment can also swap a region in which the previously disposed selected image is disposed with the region corresponding to the blank, as in the swapping of the region in which the rest image according to the embodiment is disposed, as shown in E of FIG. 33. For example, when the region corresponding to the blank and the rest image according to the embodiment are continuously disposed as in the rest images according to the embodiment, as shown in D of FIG. 33, the information processing device according to the embodiment may also swap the region in which the previously disposed selected image is disposed with the region corresponding to the blank or the region in which the rest image according to the embodiment is disposed, as in the swapping of the regions in which the rest images according to the embodiment, as shown in E of FIG. 33.

The information processing device according to the embodiment can realize, for example, the third example (rest) of the photo book with high quality described above and the sixth example (layout) of the photo book with high quality described above, for example, by disposing the regions in which the images are disposed, as described above.

The information processing device according to the embodiment performs, for example, the process of the foregoing (4-1) (the frame level determination process) and the process of the foregoing (4-2) (the region disposition process) as the process of (4) (the layout generation process). The information processing device according to the embodiment can realize, for example, the third example (rest) of the photo book with high quality described above and the sixth example (layout) of the photo book with high quality described above by performing, for example, the process of the foregoing (4-1) (the frame level determination process) and the process of the foregoing (4-2) (the region disposition process) as the process of (4) (the layout generation process).

The process of (4) (the layout generation process) in the information processing device according to the embodiment is not limited to the foregoing process. For example, the information processing device according to the embodiment can also perform a blank region disposition process using the parameter related to the blank in the page according to the embodiment (which is an example of the parameter of the layout according to the embodiment).

(4-3) Blank Region Disposition Process

Figure 34:
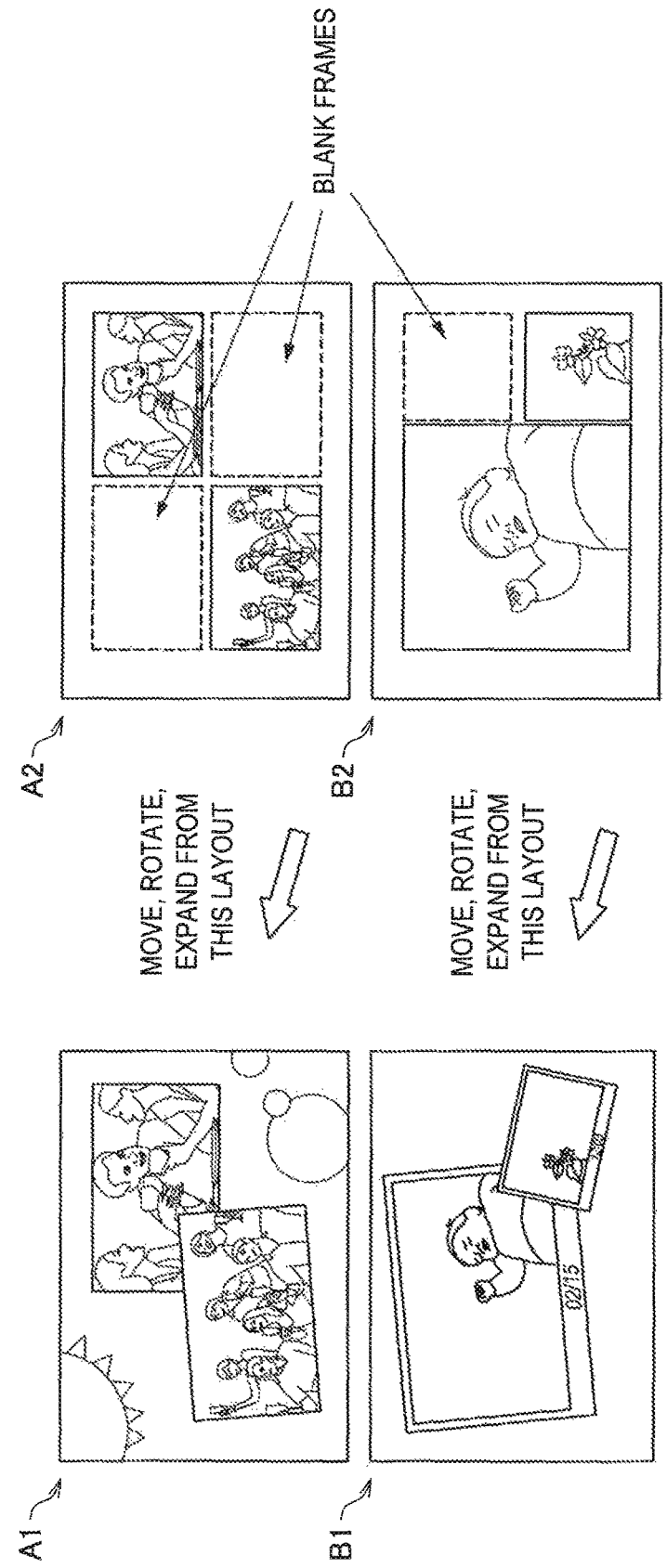
FIG. 34 is an explanatory diagram illustrating an example of a process related to the information processing method according to the embodiment.
Figure 35:
FIG. 35 is an explanatory diagram illustrating an example of a process related to the information processing method according to the embodiment.
Figure 36:
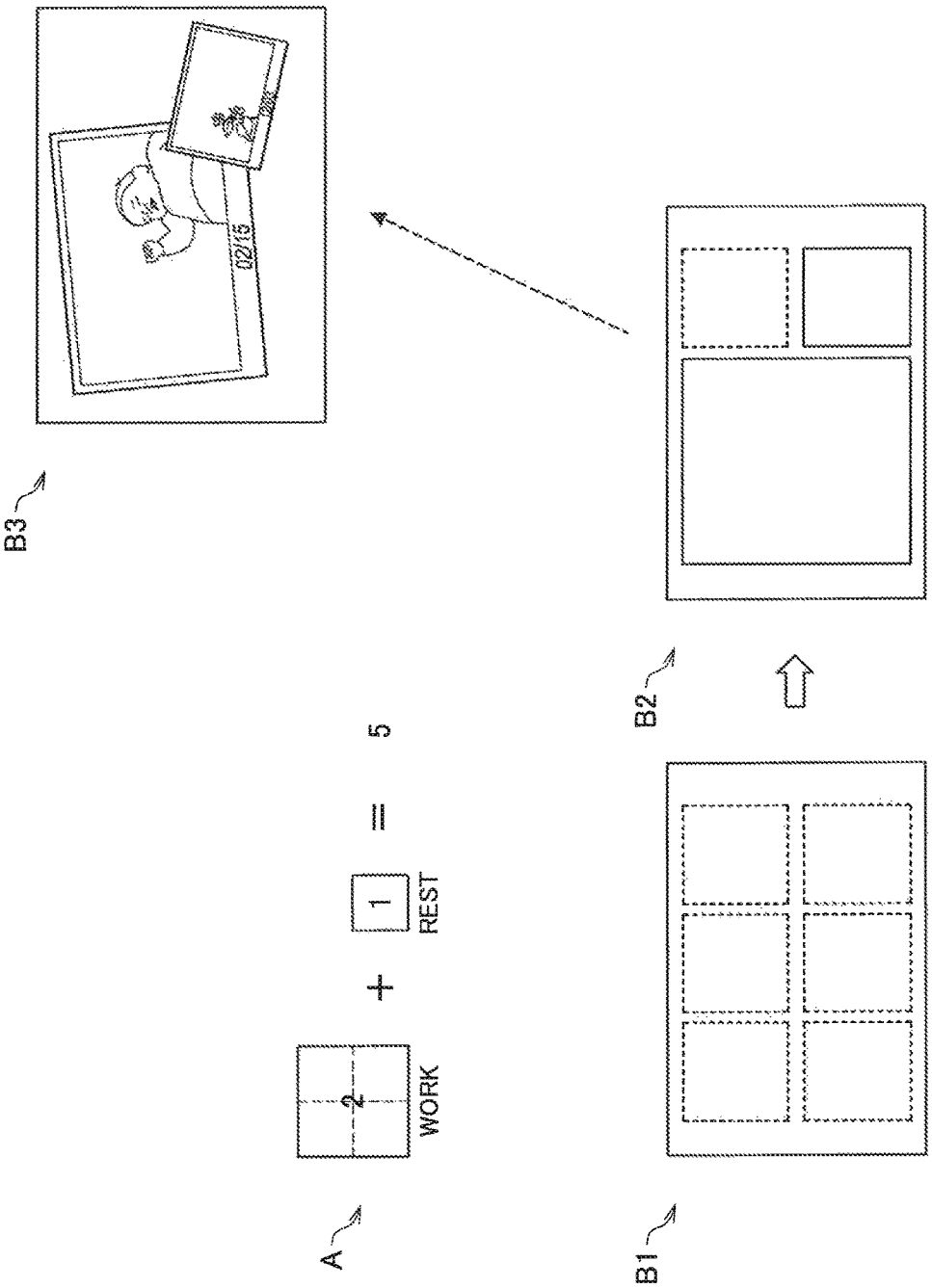
FIG. 36 is an explanatory diagram illustrating an example of a process related to the information processing method according to the embodiment.

FIGS. 34 to 36 are explanatory diagrams illustrating an example of the process related to the information processing method according to the embodiment and illustrate an example of a blank region disposition process according to the embodiment. Here. FIG. 34 illustrates an overview of the blank region disposition process according to the embodiment and FIGS. 35 and 36 illustrate an example of the blank region disposition process according to the embodiment.

As described in the third example (rest) of the photo book with high quality according to the embodiment, a method of disposing a region corresponding to a blank (hereinafter, for example, referred to as a "blank frame" or "blank" in some cases) can be exemplified as one method of realizing the photo book with high quality, for example, as shown in A1 and B1 of FIG. 34. Accordingly, the information processing device according to the embodiment disposes the regions corresponding to the blanks, for example, as shown in A2 and B2 of FIG. 34, to realize the pages, for example, as shown in A1 and B1 of FIG. 34.

More specifically, when the regions in which the images are disposed in the page are indicated by the grids, the information processing device according to the embodiment first determines a total number of grids (corresponding to a total area of the regions occupied by the blank frames in the page) of the regions occupied by the blank frames in the page. For example, when the regions in which the images are disposed in the page are indicated by the grids, the information processing device according to the embodiment determines the total number of grids of the regions occupied by the blank frames in the page based on the number of grids occupied by the images selected in the process of the foregoing (3) (the image selection process) and the parameter related to the blank in the page according to the embodiment (which is an example of the parameter related to the layout according to the embodiment). Here, the pages in which the blank frames according to the embodiment are disposed may be, for example, a double-page spread pages including two pages.

For example, as illustrated in FIG. 35, when the number of grids occupied by the selected images is eight and a blank ratio (which is an example of the parameter related to the blank in the page according to the embodiment) in the page is 50 [%], 8 is determined as the total number of grids of the regions occupied by the blank frames in the page, for example, through calculation of "8×50/(100−50)=8."

For example, as described above, when the total number of grids of the regions occupied by the blank frame in the page is determined, the information processing device according to the embodiment determines the number of blank frames and a level (hereinafter referred to as a "frame level of a blank frame" in some cases) of the size of the blank frame in the disposed layout.

Here, an example of the method of determining the number of blank frames and the frame levels of the blank frames includes a method of determining the number of blank frames and the frame levels of the blank frames so that the following conditions are satisfied. Further, it is needless to say that the conditions related to the determination of the number of blank frames and the frame levels of the blank frames are not limited to the following conditions.

The number of blank frames is equal to or less than the number of image frames.

The maximum frame level of the blank frame is less than the maximum frame level of the image frame.

The blank flames of the frame level which is as small as possible are included.

More specifically, for example, the information processing device according to the embodiment creates the blank frames using only the blank frames which are blank frames with the frame level of 1. The total number of grids of the regions occupied by the blank frames in the page is 8. Therefore, when the blank frames are created using only the blank frames which are the blank frames with the frame level of 1, eight blank frames with the frame level of 1 are created.

Here, as described above, when the blank frames are created using only the blank frames which are the blank frames with the frame level of 1, the foregoing conditions are not satisfied because "8 (number of blank frames)>2 (number of image frames)." Accordingly, the information processing device according to the embodiment determines 2, which is the maximum number satisfying the foregoing conditions, as the number of blank frames and determines 1 as the frame level of the blank frames. That is, for example, the information processing device according to the embodiment omits six blank frames among the eight created blank frames to satisfy the foregoing conditions.

Examples of the process related to the determination of the number of blank frames and the frame levels of the blank frames in the information processing device according to the embodiment are not limited to the foregoing process. For example, when the information processing device creates the blank frames using only the blank frames which are the blank frames with the frame level of 1 and determines that the foregoing conditions are not satisfied, the information processing device according to the embodiment may create the blank frames including blank frames which are blank frames with a frame level of 2 and determine whether the foregoing conditions are satisfied.

Here, a specific example of the blank region disposition process according to the embodiment will be given.

For example, as shown in A of FIG. 36, when the number of grids occupied by the selected images is 5 and a blank ratio (which is an example of the parameter related to the blank in the page according to the embodiment) is 20 [%], 1 is determined as the total number of grids of the regions occupied by the blank frames in the page, for example, through calculation of "5×20/(100−20)=1.25."

As shown in B1 of FIG. 36, when the regions in which the images are disposed in the page are determined as the number of grids "(X, Y)=(3, 2)," for example, as shown in B2 of FIG. 36, the regions in which the images are disposed are disposed in the page through the process of the foregoing (4-2) (the region disposition process). Then, the information processing device according to the embodiment generates, for example, the pages of a photo book shown in B of FIG. 36, for example, by performing the process of the foregoing (5) (the layout adjustment process) and the process of the foregoing (6) (the image processing). For example, as shown in B2 of FIG. 36, when the region corresponding to the blank and the rest image according to the embodiment are continuously disposed, the information processing device according to the embodiment may swap the region in which the previously disposed selected image is disposed with the region corresponding to the blank or the region in which the rest image according to the embodiment is disposed, as in the swapping of the regions in which the rest images according to the embodiment are disposed, for example, as shown in E of FIG. 33. As described above, for example, when the regions corresponding to the blanks are continuously disposed, as in the rest images according to the embodiment shown in D of FIG. 33, the information processing device according to the embodiment can also swap the region in which the previously disposed selected image is disposed with the region corresponding to the blank, as in the swapping of the regions in which the rest images according to the embodiment are disposed, as shown in E of FIG. 33.

The information processing device according to the embodiment can realize, for example, the third example (rest) of the photo book with high quality described above, the fifth example (balance of areas occupied by images) of the photo book with high quality described above, and the eighth example (frame division) of the photo book with high quality described above by further performing, for example, the process of the foregoing (4-3) (the blank region disposition process) as the process of (4) (the layout generation process).

(5) Layout Adjustment Process

The information processing device according to the embodiment adjusts the layouts generated in the process of the foregoing (4) (the layout generation process). More specifically, the information processing device according to the embodiment performs one process or two or more processes among, for example, processes of (5-1) to (5-5) to be described below.

(5-1) Process Related to Margin Adjustment

When the layouts generated in the process of the foregoing (4) (the layout generation process) include a layout in which one image is disposed in one page, the information processing device according to the embodiment adjusts a margin in the page in which one image is disposed.

FIG. 37 is an explanatory diagram illustrating an example of the process related to the information processing method according to the embodiment and illustrates an example of the process related to the margin adjustment according to the embodiment. Here, A1 and A2 illustrated in FIG. 37 illustrate an example of the layout generated in the process of the foregoing (4) (the layout generation process). B1 to B3 illustrated in FIG. 37 illustrate an example of the layout adjusted through the process related to the margin adjustment according to the embodiment.

The information processing device according to the embodiment adjusts the layout generated in the process of the foregoing (4) (the layout generation process), for example, based on the parameters related to the margin (the parameters related to the layout according to the embodiment) such as "TOP margin OUTSIDE margin=BOTTOM margin=INSIDE margin=x (where x is a positive real number)" or "a parameter indicating ON/OFF of margin."

The information processing device according to the embodiment can realize, for example, the first example (margin) of the photo book with high quality described above and the sixth example (layout) of the photo book with high quality described above by performing the process of (5-1) (the process related to the margin adjustment) as the process of (5) (the layout adjustment process).

(5-2) Clipping Process

The information processing device according to the embodiment clips a region in which a selected image is disposed based on the selected image disposed in the layout generated in the process of the foregoing (4) (the layout generation process).

Figure 38:
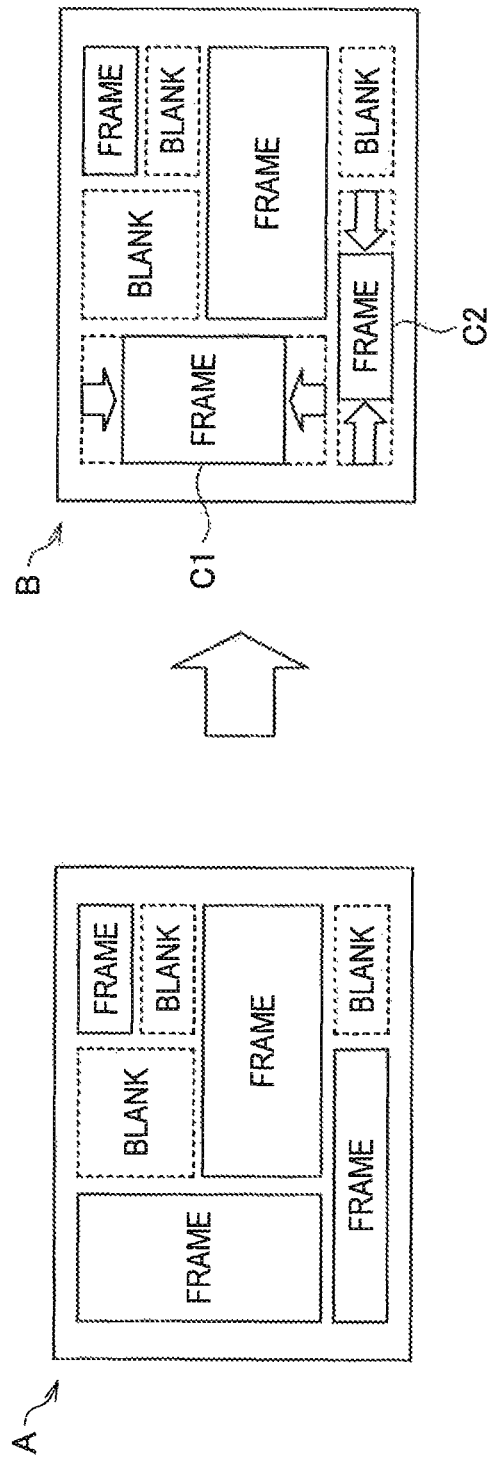
FIG. 38 is an explanatory diagram illustrating an example of a process related to the information processing method according to the embodiment.
Figure 39:
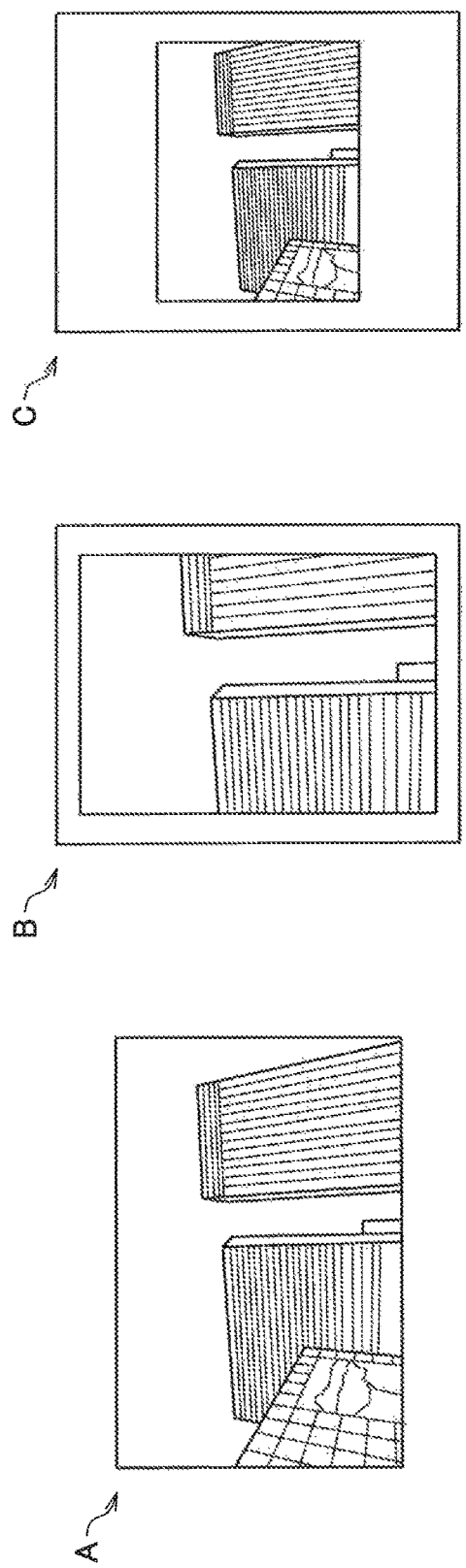
FIG. 39 is an explanatory diagram illustrating an example of a process related to the information processing method according to the embodiment.

FIGS. 38 and 39 are explanatory diagrams illustrating an example of the process related to the information processing method according to the embodiment and illustrate an example of the clipping process according to the embodiment. Here, A illustrated in FIG. 38 shows an example of a layout generated before the clipping process is performed and B illustrated in FIG. 38 shows an example of the layout adjusted after the clipping process is performed. C1 and C2 shown in B of FIG. 38 show regions in which the clipped selected images are disposed. A illustrated in FIG. 39 shows an example of the image selected in the process of the foregoing (3) (the image selection process). B and C illustrated in FIG. 39 show examples of the images disposed in the layouts clipped to be adjusted through the process of the foregoing (6) (the image processing) when one image is disposed in one page.

For example, the information processing device according to the embodiment clips a frame (a region in which a selected image is disposed) out of an aspect restriction indicated by a parameter indicating restriction of an aspect ratio (which is an example of the parameter related to the layout according to the embodiment). As described above, by clipping the frame out of the aspect restriction, for example, it is possible to suppress a frame which is vertically long or horizontally long.

Here, an example of the clipping process according to the embodiment includes a process of clipping a frame in priority of an aspect ratio of a selected image disposed in a frame to be clipped based on information regarding an image corresponding to the selected image disposed in the frame to be clipped. More specifically, for example, as shown in A of FIG. 39, when the aspect ratio of the selected image disposed in the frame to be clipped (which is an example of the information regarding the image according to the embodiment) indicates that the selected image is a horizontally long image, the information processing device according to the embodiment clips the frame (the region in which the selected image is disposed) in priority of the disposition of the image shown in C of FIG. 39 rather than B of FIG. 39.

For example, the information processing device according to the embodiment can realize, for example, the seventh example (the image processing) of the photo book with high quality described above and the eighth example (the frame division) of the photo book with high quality described above by clipping the region in which the selected image is disposed, as described above.

(5-3) Rotation Process

The information processing device according to the embodiment rotates the region in which the selected image disposed in the layout generated in the process of the foregoing (4) (the layout generation process) is disposed.

(5-3-1) First Example of Rotation Process

For example, the information processing device according to the embodiment rotates the region in which the selected image is disposed based on the parameter related to the layout according to the embodiment, such as a parameter indicating the maximum value of a rotation angle $\theta$.

More specifically, for example, the information processing device according to the embodiment sets the rotation angle $\theta$ and a rotation direction with respect to a reference direction such as the horizontal direction of a page at random in regard to each region which is disposed in the page (or the double-page spread page) and in which the selected image is disposed. For example, a restriction is imposed on the rotation angle $\theta$ by a parameter indicating the maximum value of the rotation angle $\theta$. The information processing device according to the embodiment can perform the rotation process according to the embodiment even when the restriction based on the parameter related to the layout according to the embodiment is not imposed on the rotation angle $\theta$.

The information processing device according to the embodiment calculates an average $\mu$ of the rotation angle $\theta$ of the region in which the selected image is disposed by the following expression 1 and calculates a dispersion of the rotation angle $\theta$ of the region in which the selected image is disposed by the following expression 2. Here, "N" in expressions 1 and 2 indicates the number of regions which are disposed in a page (or a double-page spread page) and in which the selected images are disposed.

[Math 1]
$$\mu = \frac{\sum \partial_i}{N} \quad \text{(expression 1)}$$

[Math 2]
$$\sigma = \frac{\sum (\partial_i - \mu)^2}{N} \quad \text{(expression 2)}$$

Then, for example, based on the calculated average $\mu$ of the rotation angle and the calculated dispersion $\sigma$ of the rotation angle, the information processing device according to the embodiment determines whether the rotation direction and the rotation angle $\theta$ set in each region which is disposed in the page and in which the selected image is disposed are well-balanced.

More specifically, the information processing device according to the embodiment determines that the set rotation direction and rotation angle $\theta$ are well-balanced, for example, when a comparison result of the calculated average $\mu$ of the rotation angle and a threshold value T1 related to the average of the rotation angle and a comparison result of the calculated dispersion $\sigma$ of the rotation angle and a threshold value T2 related to the dispersion of the rotation angle satisfy predetermined conditions (for example, "$|\sigma|<T1$ and $\mu>T2$"). Here, each of the threshold values T1 and T2 may be a fixed value which is set in advance or may be a variable value which can be changed through a user's operation or the like.

When the information processing device determines that the set rotation direction and rotation angle $\theta$ are well-balanced, the information processing device according to the embodiment rotates the region in which the selected image is disposed based on the set rotation direction and rotation angle $\theta$. Conversely, when the information processing device determines that the set rotation direction and rotation angle $\theta$ are not well-balanced, the information processing device according to the embodiment sets the rotation direction and the rotation angle $\theta$ again and determines whether the reset rotation direction and rotation angle $\theta$ are well-balanced.

The information processing device according to the embodiment can realize, for example, the ninth example (rotation of frame) of the photo book with high quality described above, for example, by rotating the region in which the selected image is disposed, as described above.

(5-3-2) Second Example of Rotation Process

The information processing device according to the embodiment rotates the region in which the selected image is disposed, for example, based on a size in the generated layout of the selected image disposed in the layout generated in the process of the foregoing (4) (the layout generation process).

Here, examples of the size in the generated layout according to the embodiment include the frame level according to the embodiment and an area occupied by the region in which the selected image is disposed in the page or the double-page spread (the same applies hereinafter).

Figure 40:
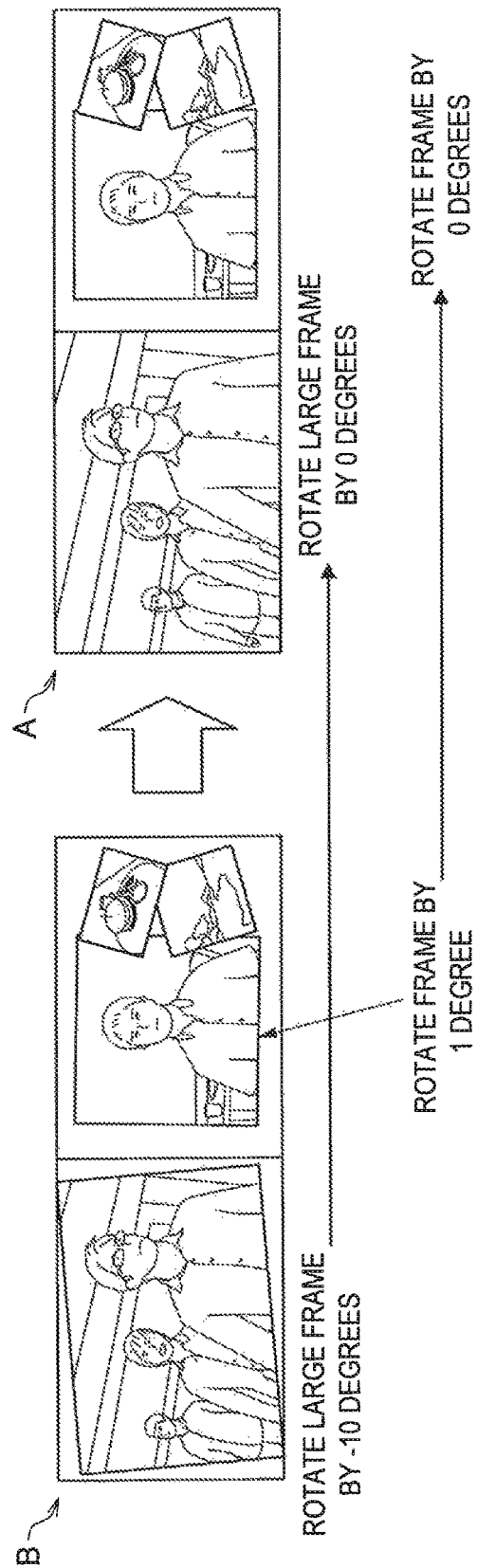
FIG. 40 is an explanatory diagram illustrating an example of a process related to the information processing method according to the embodiment.

FIG. 40 is an explanatory diagram illustrating an example of the process related to the information processing method according to the embodiment and illustrates a second example of the rotation process according to the embodiment. Here, A illustrated in FIG. 40 shows examples of the images disposed through the process of (6) (the image processing) as the result obtained by performing the rotation process according to the embodiment on the second example. B illustrated in FIG. 40 shows a comparative example to A of FIG. 40 to describe the second example of the rotation process according to the embodiment.

For example, as shown in B of FIG. 40, when a large frame (the region in which the selected image is disposed) is considerably rotated or the frame is slightly rotated, there is a concern of a user perceiving the rotation of the frame to be unnatural. Accordingly, for example, as shown in A of FIG. 40, the information processing device according to the embodiment does not rotate the large frame (or rotates the frame at a smaller rotation angle) or does not perform the slight rotation, so that the user is prevented from perceiving the rotation of the frame to be unnatural.

The information processing device according to the embodiment can realize, for example, the ninth example (rotation of frame) of the photo book with high quality described above, for example, by rotating the region in which the selected image is disposed, as described above.

The rotation process according to the embodiment is not limited to the process related to the foregoing first example and the process related to the foregoing second example. For example, the information processing device according to the embodiment may further perform a process related to a third example to be described below in addition to the process related to the foregoing first example and the process related to the foregoing second example.

(5-3-3) Third Example of Rotation Process

For example, the information processing device according to the embodiment may adjust a margin through contraction and/or parallel translation of the region in which the selected image after the rotation is disposed.

Figure 41:
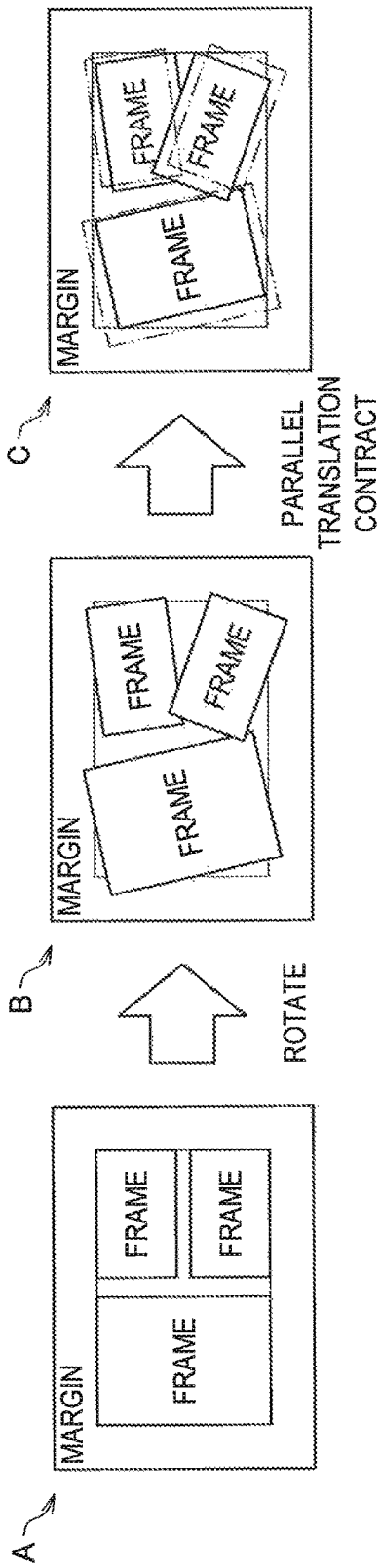
FIG. 41 is an explanatory diagram illustrating an example of a process related to the information processing method according to the embodiment.

FIG. 41 is an explanatory diagram illustrating an example of the process related to the information processing method according to the embodiment and illustrates an example of the adjustment of a margin in the third example of the rotation process according to the embodiment.

For example, as illustrated in FIG. 41, the information processing device according to the embodiment performs contraction and parallel translation of the region in which the selected image after the rotation is disposed so that the region in which the selected image after the rotation is disposed does not protrude toward the disposed margin. FIG. 41 illustrates an example of the contraction and the parallel translation of the region in which the selected image after the rotation is disposed, as shown in C of FIG. 41. However, an example of the method of adjusting the margin in the third example of the rotation process according to the embodiment is not limited to the example illustrated in FIG. 41. For example, the information processing device according to the embodiment may adjust a margin through contraction or parallel translation of the region in which the selected image after the rotation is disposed.

The information processing device according to the embodiment can realize, for example, the first example (margin) of the photo book with high quality described above, for example, by adjusting the margin, as described above.

(5-4) Blank Adjustment Process

For example, the information processing device according to the embodiment adjusts a blank in a generated layout through expansion and/or parallel translation of the region in which the selected image disposed in the generated layout is disposed.

Figure 42:
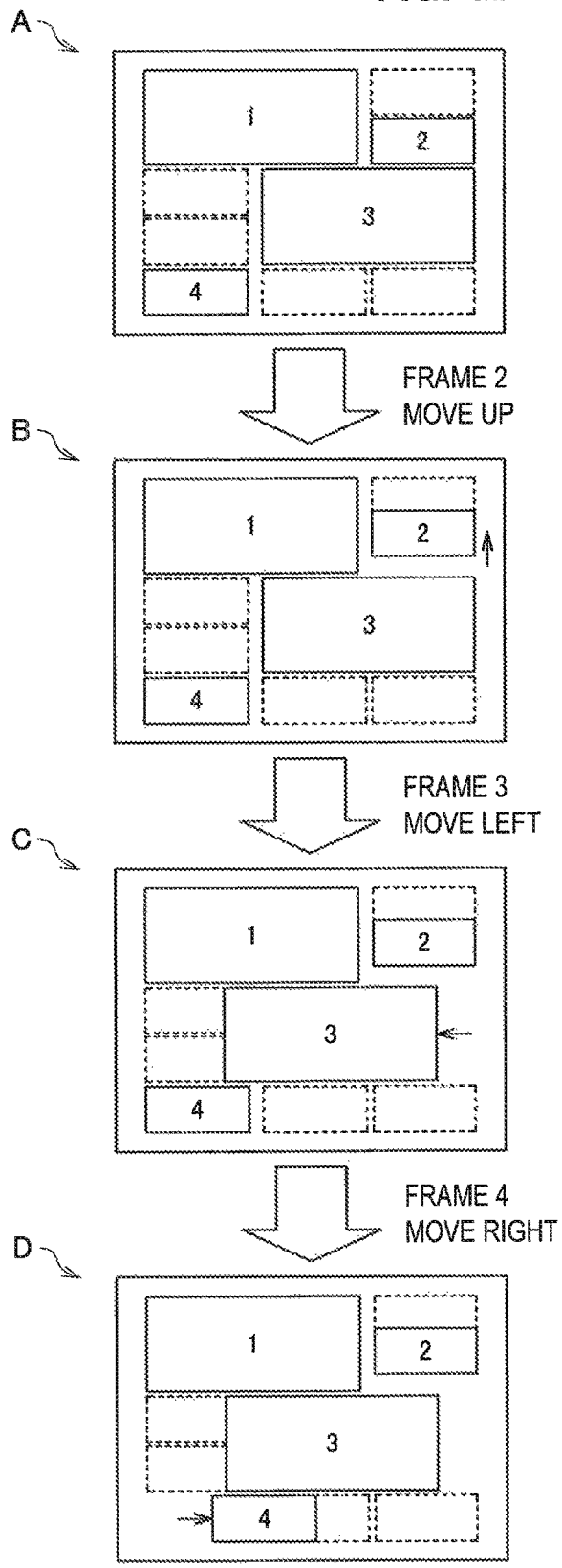
FIG. 42 is an explanatory diagram illustrating an example of a process related to the information processing method according to the embodiment.
Figure 43:
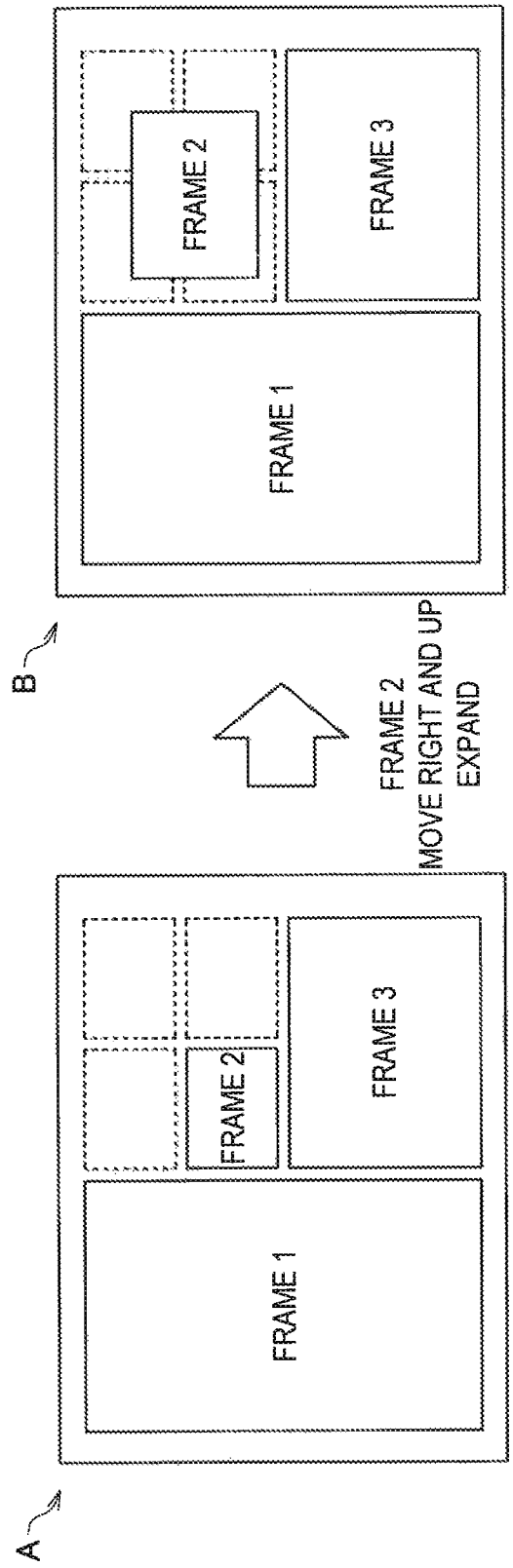
FIG. 43 is an explanatory diagram illustrating an example of a process related to the information processing method according to the embodiment.

FIGS. 42 and 43 are explanatory diagrams illustrating an example of the process related to the information processing method according to the embodiment and illustrate an example of the blank adjustment process according to the embodiment.

For example, as shown in A to D of FIG. 42, the information processing device according to the embodiment moves frames (the regions in which the selected images are disposed) in directions in which blanks are present. Here, for example, the information processing device according to the embodiment determines a movable direction and a movable distance for each frame. For example, the information processing device according to the embodiment moves the frames in a direction in which the movable distance is larger in order from the frames having fewer candidates for the movable direction. For example, the information processing device according to the embodiment sets a movement amount of the frame to be larger as the movable distance is larger, i.e., as the size of the blank is larger.

For example, as illustrated in FIG. 43, when blanks are present in the periphery of the frames (the regions in which the selected images are disposed), the information processing device according to the embodiment expands the frames for which the blanks are present in the periphery of the frames. For example, as illustrated in FIG. 43, when the blanks are present in two directions, the information processing device according to the embodiment may obliquely perform the parallel translation of the frames for which the blanks are present in the periphery of the frames.

FIG. 43 illustrates an example in which the information processing device according to the embodiment performs parallel translation and expansion of "Frame 2" (which is an example of the region in which the selected image is disposed). However, an example of the method of adjusting the blank in the blank adjustment process according to the embodiment is not limited to the example illustrated in FIG. 43. For example, the information processing device according to the embodiment may adjust the blank by merely expanding "Frame 2" (which is an example of the region in which the selected image is disposed).

The information processing device according to the embodiment can realize, for example, the eighth example (frame division) of the photo book with high quality described above, for example, by adjusting the blank in the generated layout, as described above.

(5-5) Overlapping Adjustment Process

For example, the information processing device according to the embodiment adjusts a way of overlapping the regions in which the selected images are disposed based on sizes in the generated layouts of the selected images disposed in the generated layouts.

Figure 44:
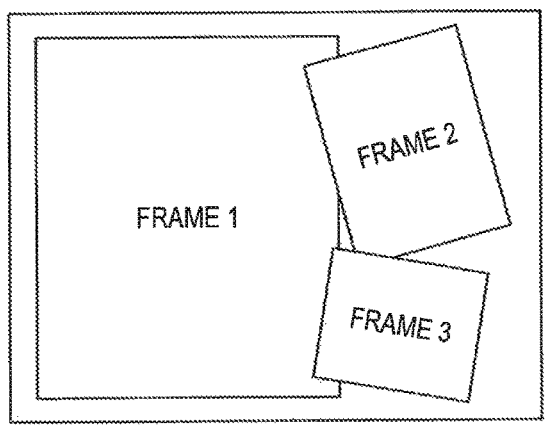
FIG. 44 is an explanatory diagram illustrating an example of a process related to the information processing method according to the embodiment.

FIG. 44 is an explanatory diagram illustrating an example of the process related to the information processing method according to the embodiment and illustrates an example of the overlapping adjustment process according to the embodiment. Here, FIG. 44 illustrates an example of the overlapping adjustment process according to the embodiment. In FIG. 44, a size in the generated layout according to the embodiment is referred to as an "area."

For example, the information processing device according to the embodiment rearranges the frames (the regions in which the selected images disposed in the generated layouts are disposed) in order of the sizes in the generated layouts. Then, for example, as illustrated in FIG. 44, the information processing device according to the embodiment sets depth values Depth in the regions so that the frame with a smaller size overlaps the frames with a larger size in the generated layout. It is needless to say that the depth values Depth can be set in the regions so that the frames with a larger size in the generated layout overlap the frame with a smaller size.

The information processing device according to the embodiment can realize, for example, the tenth example (overlapping of frames) of the photo books with high quality described above, for example, by adjusting the way of overlapping the regions in which the selected images are disposed, as described above.

The overlapping adjustment process according to the embodiment is not limited to the foregoing overlapping adjustment process. For example, the information processing device according to the embodiment may adjust the overlapping of the regions in which the selected images are disposed, for example, by determining the overlapping of the regions in which the selected images disposed in the generated layouts are disposed and performing parallel translation of the regions in which the selected images are disposed based on the overlapping determination result.

FIGS. 45 and 46 are explanatory diagrams illustrating an example of the process related to the information processing method according to the embodiment and illustrate another example of the overlapping adjustment process according to the embodiment. Here, A illustrated in FIG. 45 shows examples of the regions in which the selected images are disposed before a process related to the other example of the overlapping adjustment process related to the fifth example of the embodiment is performed. B illustrated in FIG. 45 shows the examples of the regions in which the selected images are disposed after the process related to the other example of the overlapping adjustment process according to the embodiment is performed.

As described in the tenth example (overlapping of frames) of the photo books with high quality, by avoiding a subtle overlap state or contact state of mutual frames (for example, when frames subtly overlap one another or frames very slightly overlap one another), for example, as shown in A of FIG. 45, it is possible to realize a photo book with higher quality.

Accordingly, the information processing device according to the embodiment determines the overlapping of the mutual regions in which the selected images after the rotation are disposed. Then, the information processing device according to the embodiment adjusts the overlapping of the regions in which the selected images are disposed by performing the parallel translation of the regions in which the selected images are disposed based on the determination result.

More specifically, for example, as illustrated in FIG. 46, the information processing device according to the embodiment determines the degree of overlapping (which is an example of the foregoing determination result) based on two determination results of whether the frames (the regions in which the selected images are disposed) overlap and whether the frames overlap at the time of expansion/contraction of the frames. Here, by determining the degree of overlapping based on the two determination result, as described above, it is possible to determine the subtle overlap state or contact state of the mutual frames.

For example, as illustrated in FIG. 46, the information processing device according to the embodiment performs the parallel translation of the regions in which the selected images are disposed according to the determined degree of overlapping. Here, the information processing device according to the embodiment performs the parallel translation of the regions in which the selected images are disposed according to the determined degree of overlapping, for example, by referring to a table or the like in which the degree of overlapping corresponds to content of the process.

For example, the information processing device according the embodiment can realize, for example, the tenth example (overlapping of frames) of the photo books with high quality described above, by adjusting the overlapping of the regions in which the selected images are disposed, as described above.

(6) Image Processing

The information processing device according to the embodiment disposes the images selected in the process of the foregoing (3) (the image selection process) in the layouts generated in the process of the foregoing (4) (the layout generation process) or the layouts adjusted in the process of the foregoing (5) (the layout adjustment process).

Here, the information processing device according to the embodiment disposes the images selected in the process of the foregoing (3) (the image selection process) in the generated layouts or the adjusted layouts, but the process of (6) (the image processing) according to the embodiment is not limited to the foregoing process. For example, the information processing device according to the embodiment may dispose the processed images in the generated layouts or the adjusted layouts by performing one process or two or more processes among processes of (6-1) to (6-3) to be described below.

(6-1) First Example of Image Processing: Process Related to Change in Composition For example, the information processing device according to the embodiment detects a subject from the selected image disposed in the generated layout or the adjusted layout. Then, when the information processing device detects the subject, the information processing device according to the embodiment changes the composition of the selected image based on the subject included in the selected image and disposes the image of which the composition is changed.

Examples of the subjected detected from the selected image by the information processing device according to the embodiment include the face of a person and an object such as a car. The information processing device according to the embodiment detects a subject from the selected image, for example, by performing any face detection process or any object detection process.

Figure 47:
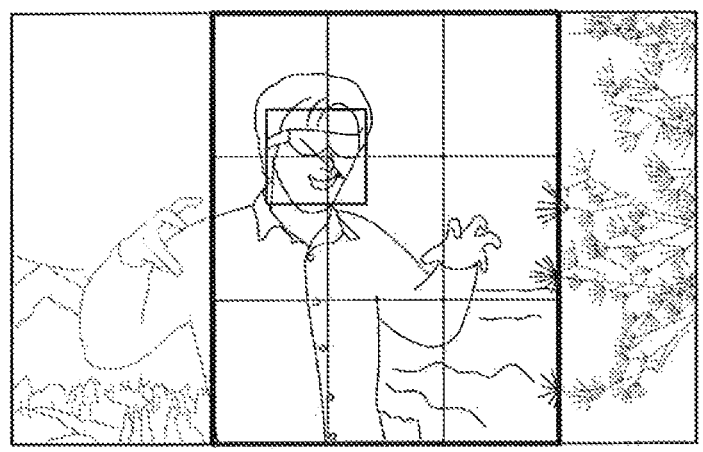
FIG. 47 is an explanatory diagram illustrating an example of a process related to the information processing method according to the embodiment.

FIG. 47 is an explanatory diagram illustrating an example of the process related to the information processing method according to the embodiment and illustrates an example of image processing related in a first example according to the embodiment. Here, FIG. 47 illustrates an example in which the information processing device according to the embodiment detects the face of a person from a selected image as a subject and changes the selected image into an image with a 3-division composition.

For example, the information processing device according to the embodiment detects the subject such as the face of a person from the selected image. Then, when the information processing device detects the subject, the information processing device according to the embodiment changes the composition of the selected image by performing framing so that the detected subject is taken on 3-division points, for example, as illustrated in FIG. 47. Here, for example, the information processing device according to the embodiment sets the 3-division points in consideration of the direction of the face.

For example, as illustrated in FIG. 47, by changing the selected image into the image with the 3-division composition, for example, it is possible to change an image captured with a composition resembling the flag of Japan to an image with a better composition. For example, by changing the composition into the better composition, the information processing device according to the embodiment can realize, for example, the second example (sparseness and denseness) of the photo book with high quality and the seventh example (image processing) of the photo book with high quality described above.

The composition changed in the image processing related to the first example of the embodiment is not limited to the 3-division composition. For example, the information processing device according to the embodiment can also change the composition of the selected image into another composition of the image, such as an oblique 2-division composition.

(6-2) Second Example of Image Processing: Process Related to Selective Framing

For example, the information processing device according to the embodiment selectively detects a predetermined subject from the selected image based on the size of the selected image disposed in the generated layout or the adjusted layout, in the generated (or adjusted) layout. Then, when the information processing device detects the predetermined subject, the information processing device according to the embodiment disposes an image in which the predetermined subject included in the selected image is expanded.

Here, an example of the predetermined subject detected from the selected image by the information processing device according to the embodiment includes the face of a person. The information processing device according to the embodiment detects the predetermined subject from the selected image, for example, by performing any face detection process. For example, the information processing device according to the embodiment does not detect scenery, an object, or the like as the predetermined subject. This is because, for example, when scenery, an object, or the like is detected as the predetermined subject, there is a concern of the entire image being hardly visible as a result of expanding the predetermined subject.

For example, the information processing device according to the embodiment selectively detects the predetermined subject from a frame in which the size is equal to or less than a predetermined threshold value (or a frame in which the size is less than the predetermined threshold) in the generated layout of the frame (the region in which the selected image is disposed). Here, examples of the predetermined threshold value in the image processing related to the second example include a threshold value related to the frame level and a threshold value related to the area occupied by the frame in the page or the double-page spread page. The predetermined threshold value in the image processing related to the second example may be a fixed value which is set in advance or a variable value which can be changed through a user's operation or the like.

Figure 48:
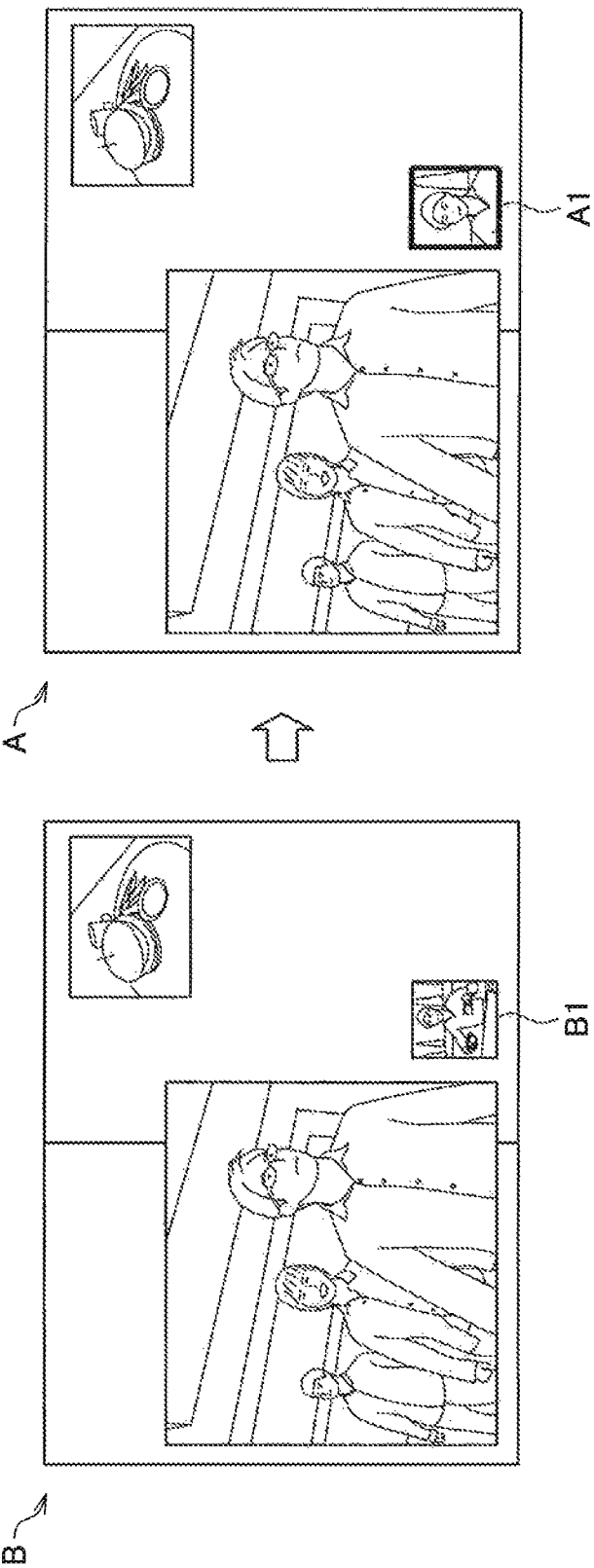
FIG. 48 is an explanatory diagram illustrating an example of a process related to the information processing method according to the embodiment.

FIG. 48 is an explanatory diagram illustrating an example of the process related to the information processing method according to the embodiment and illustrates an example of the image processing related to the second example according to the embodiment Here, A illustrated in FIG. 48 illustrates an example of an image disposed as the result obtained by performing the second example of the image processing according to the embodiment. B illustrated in FIG. 48 shows a comparative example to A of FIG. 48 to describe the second example of the image processing according to the embodiment.

For example, as in B1 shown in B of FIG. 48, when the image disposed in the frame (the region in which the selected image is disposed) with a small size includes a person, there is a concern of the face of the person being hardly recognizable to a user since the face of the person is too small. Accordingly, for example, as in A1 shown in A of FIG. 48, when the image disposed in the frame (the region in which the selected image is disposed) with a small size includes a person, the information processing device according to the embodiment disposes the image in which the face of the person is expanded.

For example, as shown in A of FIG. 48, the information processing device according to the embodiment can prevent the face of the person from being hardly recognizable to the user viewing the photo book by disposing the image in which the face included in the image disposed in the frame (the region in which the selected image is disposed) with the small size is expanded. The information processing device according to the embodiment can realize, for example, the seventh example (image processing) of the photo book with high quality described above, for example, by disposing the image in which the face included in the image disposed in the frame (the region in which the selected image is disposed) with the small size is expanded.

(6-3) Third Example of Image Processing: Process Related to Page Extending

For example, when an image disposed to extend over a plurality of pages is present among the selected images disposed in the generated layouts or the adjusted layouts, the information processing device according to the embodiment detects a predetermined subject from the image disposed to extend over the plurality of pages. For example, the information processing device according to the embodiment processes the image disposed to expand over the plurality of pages so that the detected predetermined subject is not located in the boundary line of the plurality of pages.

Examples of the subjected detected from the selected image by the information processing device according to the embodiment include the face of a person and an object such as a car. The information processing device according to the embodiment detects a subject from the selected image, for example, by performing any face detection process or any object detection process.

Examples of the process performed so that the detected predetermined subject is not located in the boundary of the plurality of pages in the image processing of the third example according to the embodiment include a process of changing the composition of the selected image as in the image processing related to the foregoing first example and a process of performing the parallel translation of the region framed from the selected image.

Figure 49:
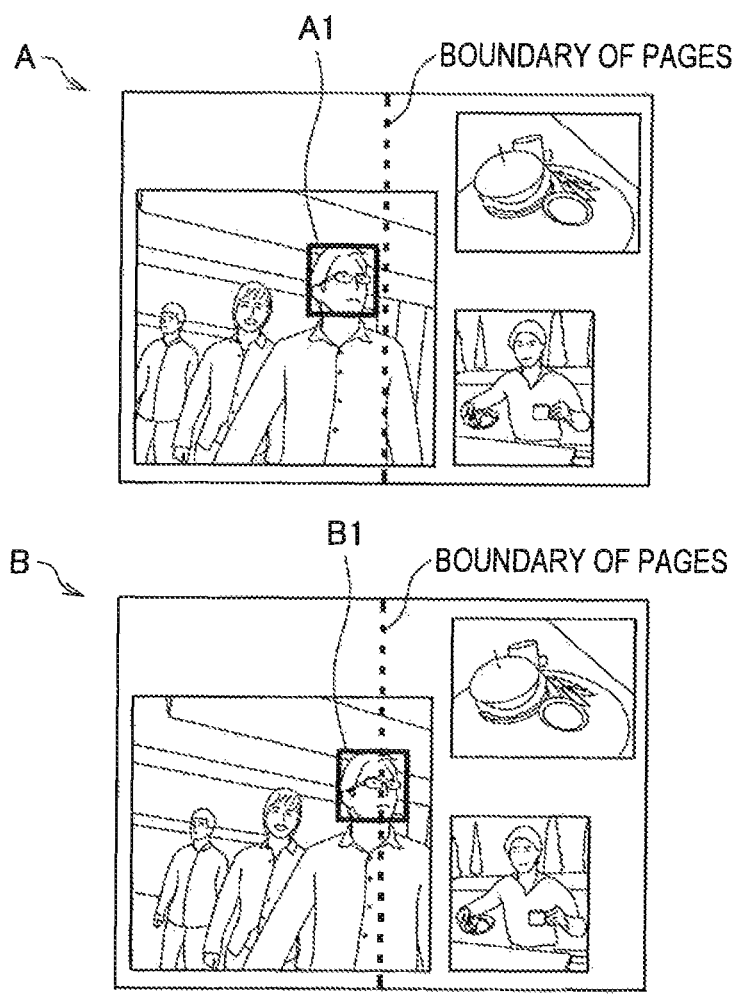
FIG. 49 is an explanatory diagram illustrating an example of a process related to the information processing method according to the embodiment.

FIG. 49 is an explanatory diagram illustrating an example of the process related to the information processing method according to the embodiment and illustrates an example of the image processing related to the third example according to the embodiment. Here, A illustrated in FIG. 49 illustrates an example of an image disposed as the result obtained by performing the third example of the image processing according to the embodiment. B illustrated in FIG. 49 shows a comparative example to A of FIG. 49 to describe the third example of the image processing according to the embodiment.

For example, as in B1 shown in B of FIG. 49, when the face of a person included in the disposed selected image is located in the boundary line of the pages, there is a concern of the face of the person being hardly recognizable to the user. Accordingly, for example, as in A1 shown in A of FIG. 49, the information processing device according to the embodiment processes the disposed selected image so that the face of the person included in the disposed selected image is not located in the boundary line of the pages, and then disposes the processed image.

For example, as shown in A of FIG. 49, by preventing the face of the person (which is an example of the predetermined subject) included in the disposed selected image from being located in the boundary line of the pages, the information processing device according to the embodiment can prevent the face of the person from being hardly recognizable to the user viewing the photo book. For example, by preventing the face of the person (which is an example of the predetermined subject) included in the disposed selected image from being located in the boundary line of the pages, the information processing device according to the embodiment can realize, for example, the seventh example (image processing) of the photo book with high quality described above.

As the processes related to the information processing method according to the embodiment, the information processing device according to the embodiment performs, for example, "the process of the foregoing (1) (the evaluation value calculation process) to the process of the foregoing (4) (the layout generation process)," "the process of the foregoing (1) (the evaluation value calculation process) to the process of the foregoing (5) (the layout adjustment process)," "the process of the foregoing (1) (the evaluation value calculation process) to the process of the foregoing (4) (the layout generation process) and the process of the foregoing (6) (the image processing)," or "the process of the foregoing (1) (the evaluation value calculation process) to the process of the foregoing (6) (the image processing)."

Here, for example, when the information processing device groups the candidate images in the process of the foregoing (1) (the evaluation value calculation process) and performs a process on the rear stage, the information processing device according to the embodiment can realize, for example, a photo book in which images are arranged chronologically. Accordingly, the user viewing the photo book realized through the process related to the information processing method according to the embodiment can read and understand the images disposed in the photo book as a chronological story. For example, when the information processing device groups the candidate images in the process of the foregoing (1) (the evaluation value calculation process) and performs a process on the rear stage, the information processing device according to the embodiment can also prevent similar images from being disposed.

In the process of the foregoing (3) (the image selection process), the information processing device according to the embodiment selects the images among the candidate images based on the parameters related to the layout according to the embodiment and the evaluation values calculated in the process of the foregoing (1) (the evaluation value calculation process). Accordingly, even when a plurality of candidate images are present, the information processing device according to the embodiment can automatically select better images (images realizing the photo book with higher quality).

In the process of the foregoing (4) (the layout generation process), the information processing device according to the embodiment generates the layouts based on the parameters related to the layouts according to the embodiment and the evaluation values corresponding to the images selected in the process of the foregoing (3) (the image selection process). Accordingly, the information processing device according to the embodiment can automatically generate the layout with good quality. The process is performed based on the parameters related to the layouts according to the embodiment. Therefore, when the process related to the information processing method according to the embodiment is used, variations of the layouts with various design themes can be generated more easily.

In the process of the foregoing (5) (the layout adjustment process), the information processing device according to the embodiment adjusts the layouts generated in the process of the foregoing (4) (the layout generation process). In the process of the foregoing (6) (the image processing), the information processing device according to the embodiment disposes the images selected in the process of the foregoing (3) (the image selection process) or the processed images such as the images of which the composition is changed in the generated layouts or the adjusted layouts. Accordingly, the information processing device according to the embodiment can realize, for example, a photo book with higher quality.

The processes related to the information processing method according to the embodiment are not limited to the processes described in the process of the foregoing (1) (the evaluation value calculation process) to the process of the foregoing (6) (the image processing).

(7) Evaluation Process

For example, the information processing device according to the embodiment may further perform an evaluation process of evaluating the generated layouts (including the adjusted layouts). More specifically, for example, the information processing device according to the embodiment evaluates the generated layouts by scoring the generated layouts.

When the generated layouts are scored, the information processing device according to the embodiment can generate the layouts of all of the pages or some of the pages again, for example, by performing the process related to the information processing method according to the embodiment again, for example, when the calculated scores are low. Accordingly, the information processing device according to the embodiment can generate the layouts to generate a photo book with higher quality by further performing the evaluation process according to the embodiment.

For example, the information processing device according to the embodiment can also select the layout of the best score in the candidate images by generating the layouts for the candidate images based on various settings and evaluating the generated layouts. Here, in the embodiment, for example, various settings are performed through setting of changing the parameters related to the layout according to the embodiment, changing the number of candidate images, and substituting the candidate images.

Here, for example, when the calculated score is equal to or less than the set threshold value (or the calculated score is less than the set threshold value), the information processing device according to the embodiment determines that the calculated score is low. The threshold value related to the determination of the score may be a fixed value which is set in advance or may be a variable value which can be changed by a user or the like.

When the information processing device determines that the calculated score is low, the information processing device according to the embodiment performs the processes related to the information processing method according to the embodiment from the first process (from the process of the foregoing (1) (the evaluation value calculation process)). However, the process performed when it is determined that the calculated score is low is not limited to the foregoing process. For example, the information processing device according to the embodiment may perform only some of the processes, such as the process of the foregoing (5) (the layout adjustment process) and the process of the foregoing (6) (the image processing) again.

The information processing device according to the embodiment calculates the scores of the generated layouts through, for example, a subtraction scheme of subtracting a point from a set criterion point and calculating a score. The criterion point related to the calculation of the score may be a value which is set in advance or may be a value which can be changed by a user or the like. It is needless to say that the process related to the scoring of the generated layouts in the information processing device according to the embodiment is not limited to the process of calculating the scores through the subtraction scheme.

FIG. 50 is an explanatory diagram illustrating an example of the process related to the information processing method according to the embodiment and illustrates an example of the process related to the scoring of the generated layouts in the evaluation process according to the embodiment. Here, A illustrated in FIG. 50 shows an example of a subtraction target layout in the process related to the scoring of the generated layout and B illustrated in FIG. 50 shows an example of the method of calculating a subtraction score.

For example, when the generated layout corresponds to a subtraction target shown in B of FIG. 50, the information processing device according to the embodiment calculates the subtraction score. Then, the information processing device according to the embodiment calculates the score of the generated layout by subtracting the calculated subtraction score from the set criterion point.

(8) Learning Process

The information processing device according to the embodiment may further perform, for example, a learning process of learning a preference of the user for the parameters related to the layout according to the embodiment. The information processing device according to the embodiment learns the preference of the user for the parameters related to the layout according to the embodiment, for example, based on the number of times the parameters related to the layout are used, or the number of times the parameters related to the layout are used and whether the generated layout is confirmed.

For example, the information processing device according to the embodiment can generate the layout more suitable for the preference of the user without using the parameters related to the layout according to the embodiment which the user dislikes by further performing the learning process. For example, the information processing device according to the embodiment can also recommend the parameters related to the layout according to the embodiment which the user further favors by further performing the learning process. It is needless to say that the process according to the embodiment using the result of the learning process according to the embodiment is not limited to the foregoing process.

More specifically, for example, when the number of times the parameters related to the layout are used is equal to or less than a first number of times (or the number of times the parameters related to the layout are used is less than the first number of times; the same applies below) within a set period, the information processing device according to the embodiment stores the parameters of the layout as the parameters which the user dislikes. Here, for example, the first number of times in the learning process according to the embodiment may be a fixed value which is set in advance or may be a variable value which can be changed by the user or the like.

For example, when the number of times the parameters related to the layout are used exceeds a second number of times (or the number of times the parameters related to the layout are used is equal to or greater than the second number of times; the same applies below), the information processing device according to the embodiment determines whether the generated layout is used without change or the generated layout is recreated. Here, for example, the second number of times in the learning process according to the embodiment may be a fixed value which is set in advance or may be a variable value which can be changed by the user or the like.

For example, the information processing device according to the embodiment records the parameters related to the layout according to the embodiment as learning data indicating a learning result in a storage unit (to be described below), an external recording medium, or a recording medium such as recording medium included in an external device. However, the learning data recorded in the learning process according to the embodiment is not limited to the foregoing data. For example, the information processing device according to the embodiment may record the data indicating the parameters related to the layout according to the embodiment as the learning data in the storage unit (to be described below).

For example, when the score calculated in the process of the foregoing (7) (the evaluation process) is low or an operation signal indicating the recreation of the layout based on the user's operation is detected, the information processing device according to the embodiment determines that the generated layout is recreated. For example, when the score calculated in the process of the foregoing (7) (the evaluation process) not low or an operation signal indicating that the layout based on the user's operation is confirmed is detected, the information processing device according to the embodiment determines that the generated layout is not used without change.

Even when it is determined in the foregoing determination that the generated layout is used without changed, the information processing device according to the embodiment records the parameters related to the layout and corresponding to the generated layout as the parameters which the user favors in the storage unit (to be described below) or the like. When it is determined in the foregoing determination that the generated layout is recreated, the information processing device according to the embodiment records the parameters related to the layout and corresponding to the generated layout as the parameters which the user dislikes in the storage unit (to be described below) or the like.

Figure 51:
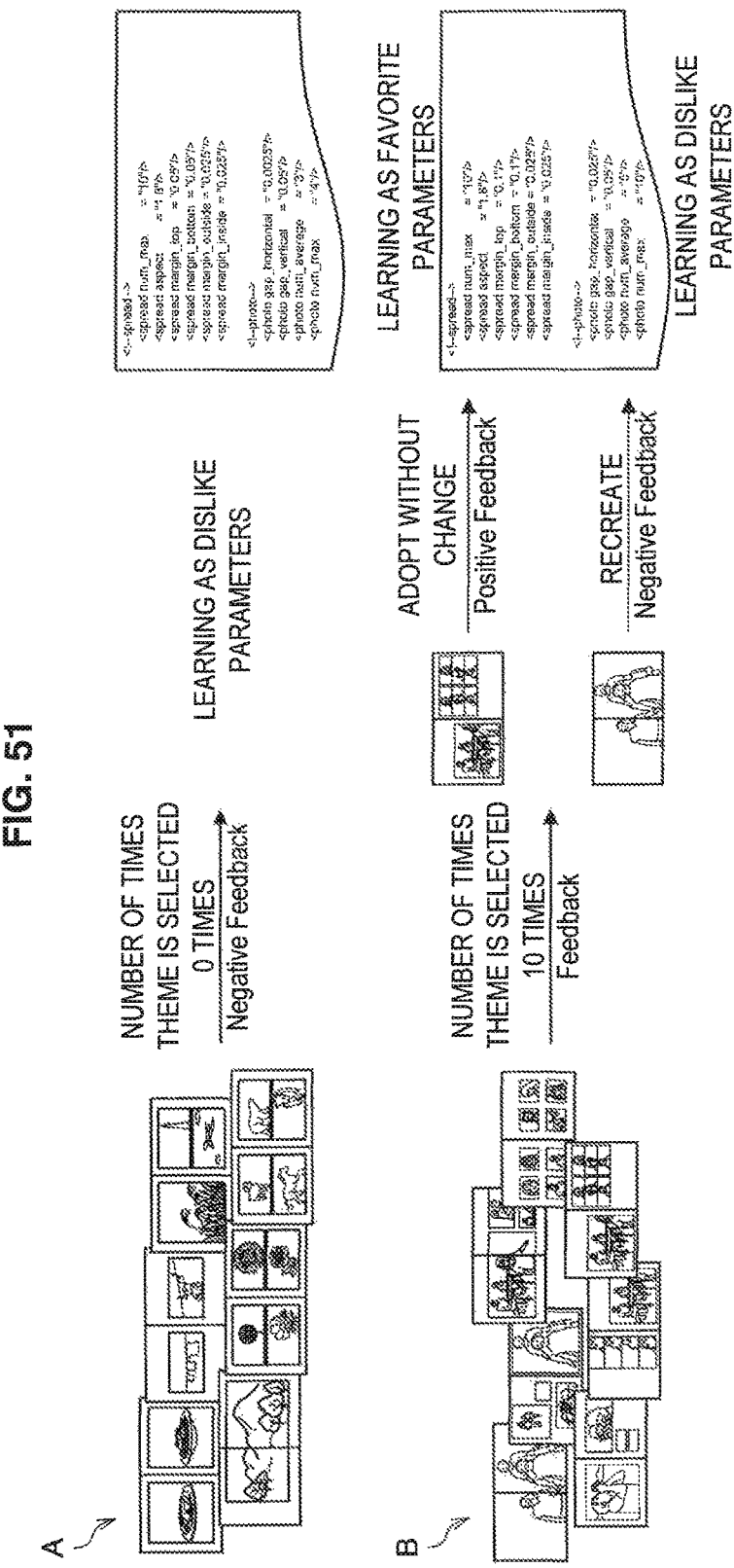
FIG. 51 is an explanatory diagram illustrating an example of a process related to the information processing method according to the embodiment.

FIG. 51 is an explanatory diagram illustrating an example of the process related to the information processing method according to the embodiment and illustrates an example of the learning process according to the embodiment. FIG. 51 illustrates an example in which the parameters related to the layout according to the embodiment correspond to "themes" and the learning process according to the embodiment is performed when the user selects the "theme" and the process related to the information processing method according to the embodiment is performed.

For example, as shown in A of FIG. 51, when the number of times the "theme" is selected is zero times (which is an example when the number of times the parameters related to the layout are used is equal to or less than the first number of times) within the set period, the information processing device according to the embodiment records the parameters related to the layout corresponding to the "theme" as the parameters which the user dislikes in the storage unit (to be described below).

For example, as shown in B of FIG. 51, when the number of times the parameters related to the layout are used is 10 times (which is an example when the number of times the parameters related to the layout are used exceeds the second number of times), the information processing device according to the embodiment determines whether the generated layout is used without change or the generated layout is recreated. When the information processing device determines that the generated layout is used without changed, the information processing device according to the embodiment records the parameters related to the layout and corresponding to the generated layout as the parameters which the user favors in the storage unit (to be described below), for example, as shown in B of FIG. 51. Conversely, when the information processing device determines that the generated layout is recreated, the information processing device according to the embodiment records the parameters related to the layout and corresponding to the generated layout as the parameters which the user dislikes in the storage unit (to be described below), for example, as shown in B of FIG. 51.
(Information Processing Device According to Embodiment)

Next, an example of the configuration of the information processing device according to the embodiment which is capable of performing the processes related to the information processing method according to the embodiment described above will be described.

Figure 52:
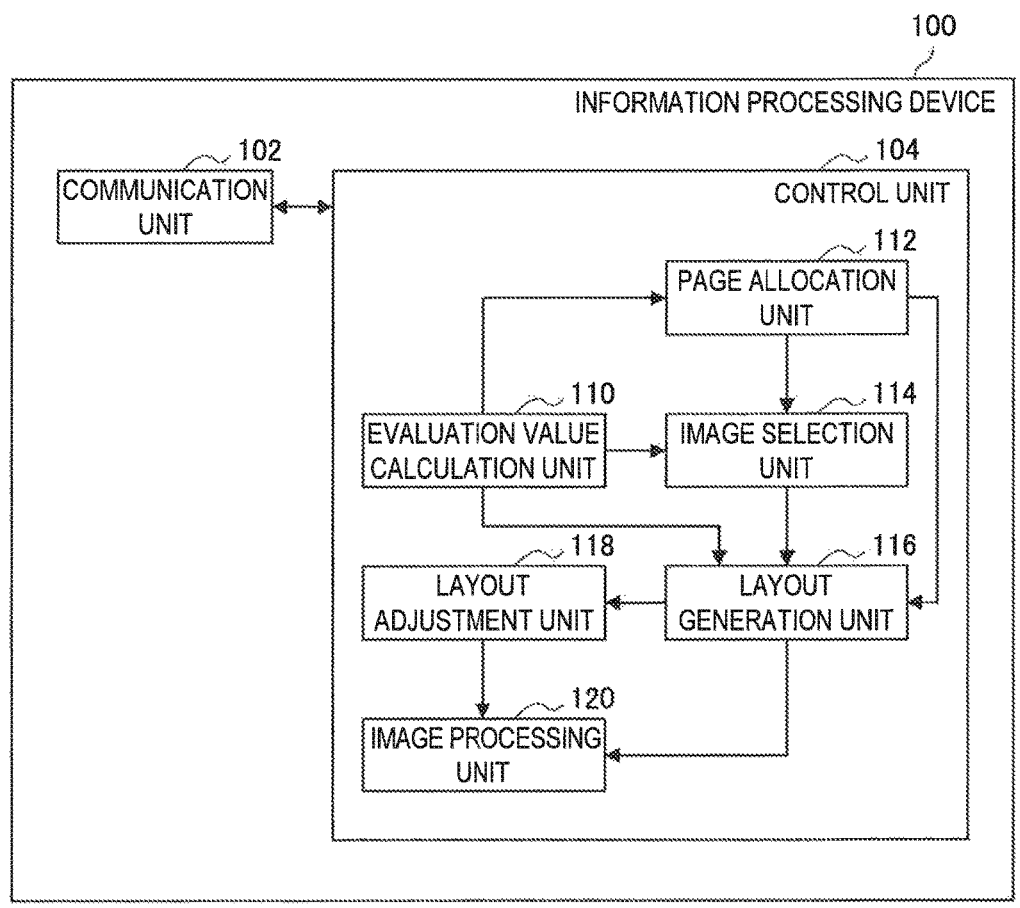
FIG. 52 is a block diagram illustrating an example of the configuration of an information processing device according to the embodiment.

FIG. 52 is a block diagram illustrating an example of the configuration of an information processing device 100 according to the embodiment will be described. The information processing device 100 includes, for example, a communication unit 102 and a control unit 104.

The information processing device 100 may include, for example, a read-only memory (ROM; not illustrated), a random access memory (RAM; not illustrated), a storage unit (not illustrated), an operation unit (not illustrated) which a user can operate, and a display unit (not illustrated) which displays various screens on a display screen. In the information processing device 100, for example, the foregoing constituent elements are connected by a bus serving as a data transmission path.

Here, the ROM (not illustrated) stores a program used by the control unit 104 or control data such as arithmetic parameters. The RAM (not illustrated) temporarily stores a program executed by the control unit 104.

The storage unit (not illustrated) is a storage unit included in the information processing device 100 and stores, for example, various kinds of data such as "image data," "data indicating the parameters related to the layout according to the embodiment," "learning data according to the embodiment," and "applications." Here, examples of the storage unit (not illustrated) include a magnetic recording medium such as a hard disk and a non-volatile memory such as a flash memory. The storage unit (not illustrated) may be detachably mounted on the information processing device 100.

An example of the operation unit (not illustrated) includes an operation input device to be described below and an example of the display unit (not illustrated) includes a display device to be described below.
[Example of Hardware Configuration of Information Processing Device 100]

Figure 53:
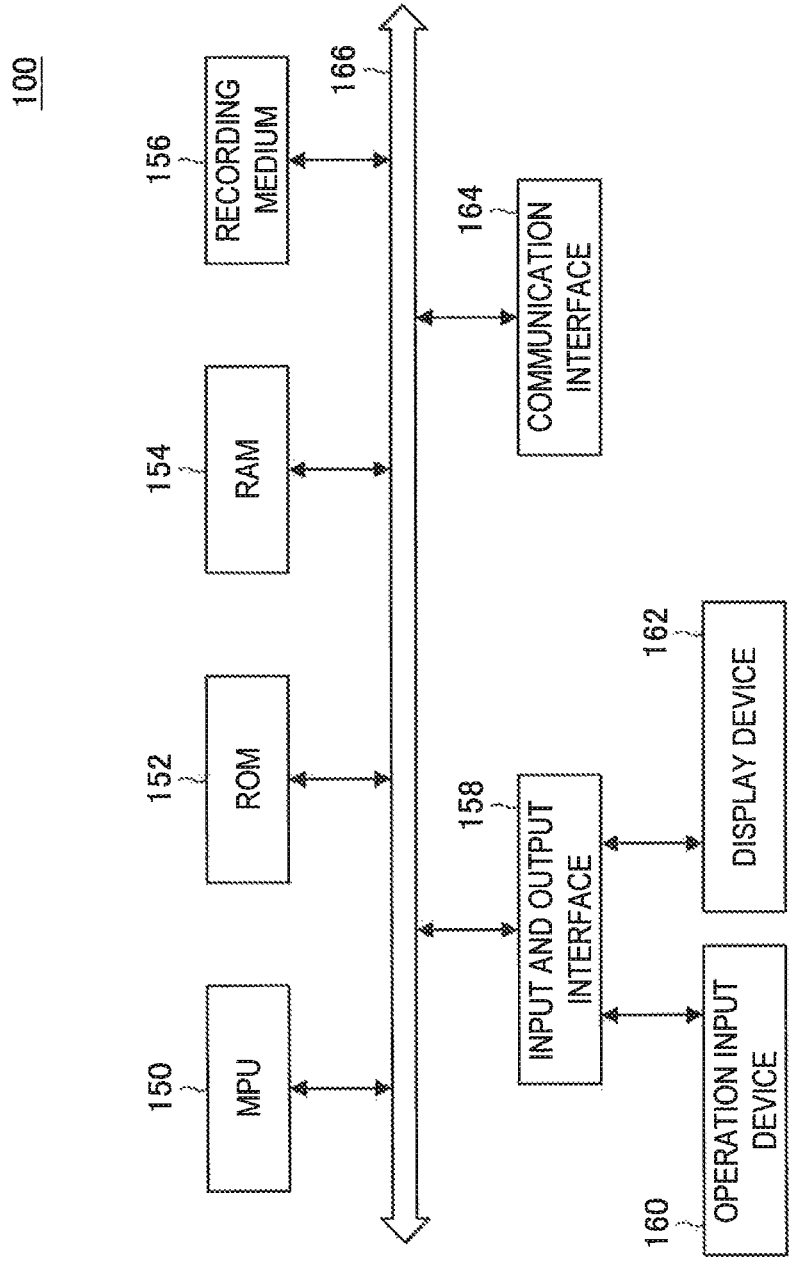
FIG. 53 is an explanatory diagram illustrating an example of a hardware configuration of the information processing device according to the embodiment.

FIG. 53 is an explanatory diagram illustrating an example of a hardware configuration of the information processing device 100 according to the embodiment. The information processing device 100 includes, for example, an MPU 150, a ROM 152, a RAM 154, a recording medium 156, an input and output interface 158, an operation input device 160, a display device 162, and a communication interface 164. In the information processing device 100, for example, the constituent elements are connected by a bus 166 serving as a data transmission path.

The MPU 150 includes, for example, a micro processing unit (MPU) and various processing circuits and functions as the control unit 104 that controls the entire information processing device 100. In the information processing device 100, the MPU 150 serves as, for example, an evaluation value calculation unit 110, a page allocation unit 112, an image selection unit 114, a layout generation unit 116, a layout adjustment unit 118, and an image processing unit 120 to be described below.

The ROM 152 stores control data such as calculation parameters and a program used by the MPU 150. The RAM 154 temporarily stores, for example, a program executed by the MPU 150.

The recording medium 156 functions as the storage unit (not illustrated) and stores, for example, various kinds of data such as "the image data" and "the data indicating the parameters related to the layout according to the embodiment." Here, examples of the recording medium 156 include a magnetic recording medium such as a hard disk or a non-volatile memory such as a flash memory. The recording medium 156 may be detachably mounted on the information processing device 100.

The input and output interface 158 connects, for example, the operation input device 160 or the display device 162. The operation input device 160 functions as an operation unit (not illustrated) and the display device 162 functions a display unit (not illustrated). Here, examples of the input and output interface 158 include a Universal Serial Bus (USB) terminal, a Digital Visual Interface (DVI) terminal, a High-Definition Multimedia Interface (HDMI) (registered trademark) terminal, and various processing circuits. For example, the operation input device 160 is included in the information processing device 100 and is connected to the input and output interface 158 in the information processing device 100. Examples of the operation input device 160 include a button, a direction key, a rotation type selector such as a jog dial, and a combination thereof. For example, the display device 162 is included in the information processing device 100 and is connected to the input and output interface 158 in the information processing device 100. Examples of the display device 162 include a liquid crystal display (LCD) and an organic electroluminescence (EL) display (also called an organic light emitting diode (OLED) display).

It is needless to say that the input and output interface 158 can be connected to an external device such as an operation input device (for example, a keyboard or a mouse), a display device, or the like serving as an external device of the information processing device 100. Examples of the display device 162 may be a device through which display and a user's operation are possible, such as a touch screen.

The communication interface 164 is a communication unit included in the information processing device 100 and functions as the communication unit 102 that performs wireless/wired communication with an external device such as a server via a network (or directly). Here, examples of the communication interface 164 include a communication antenna and a radio frequency (RF) circuit (wireless communication), an IEEE 802.15.1 port and a transmission and reception circuit (wireless communication), an IEEE 802.11b port and a transmission and reception circuit (wireless communication), and a local area network (LAN) terminal and a transmission and reception circuit (wired communication).

The information processing device 100 includes, for example, the configuration illustrated in FIG. 53 and performs the process related to the information processing method according to the embodiment. The hardware configuration of the information processing device 100 according to the embodiment is not limited to the configuration illustrated in FIG. 53. For example, the information processing device 100 may include an imaging device that serves as an imaging unit (not illustrated) that captures a still image or a moving image. When the information processing device 100 includes the imaging device, for example, the information processing device 100 can process captured images generated through imaging by the imaging device as the candidate images.

Here, examples of the imaging device according to the embodiment include a lens and imaging element and a signal processing circuit. The lens and imaging element includes, for example, a lens of an optical system and an image sensor using a plurality of imaging elements such as complementary metal oxide semiconductors (CMOS). The signal processing circuit includes, for example, an automatic gain control (AGC) circuit and an analog-to-digital converter (ADC), converts an analog signal generated by the imaging element into a digital signal (image data), and performs various signal processes. Examples of the signal processing performed by the signal processing circuit include a white balance correction process, a tone correction process, a gamma correction process, a YCbCr conversion process, and an edge enhancement process.

For example, when the information processing device 100 is configured as a stand-alone device to perform a process, the information processing device 100 may not include the communication device 164. The information processing device 100 can also be configured not to include the operation device 160 or the display device 162.

Referring back to FIG. 52, an example of the configuration of the information processing device 100 will be described. The communication unit 102 is a communication unit included in the information processing device 100 and performs wired and wireless communication with an external device such as a server via a network (or directly). The communication of the communication unit 102 is controlled by, for example, the control unit 104. Here, examples of the communication unit 102 include a communication antenna and an RF circuit, and a LAN terminal and a transmission and reception circuit. The configuration of the communication unit 102 is not limited to the foregoing configuration. For example, the communication unit 102 can have a configuration corresponding to any standard capable of performing communication, such as a USB terminal and a transmission and reception circuit or any configuration capable of communicating with an external device via a network.

The control unit 104 includes, for example, an MPU and serves to control the entire information processing device 100. The control unit 104 includes, for example, the evaluation value calculation unit 110, the page allocation unit 112, the image selection unit 114, the layout generation unit 116, the layout adjustment unit 118, and the image processing unit 120 and serves to lead the process related to the information processing method according to the embodiment.

The evaluation value calculation unit 110 serves to lead the process of the foregoing (1) (the evaluation value calculation process). For example, the evaluation value calculation unit 110 calculates the evaluation value of each candidate image based on the information regarding the image corresponding to each candidate image. For example, the evaluation value calculation unit 110 may also group the candidate images based on the information regarding the image corresponding to each candidate image and calculate the evaluation value for each group.

The page allocation unit 112 serves to lead the process of the foregoing (2) (the page allocation process). For example, the page allocation unit 112 determines the number of pages based on the parameters related to the layout according to the embodiment and determines the number of images to be disposed in each page based on the parameters related to the layout and the evaluation values calculated in the evaluation value calculation unit 110.

The image selection unit 114 serves to lead the process of the foregoing (3) (the image selection process), For example, the image selection unit 114 selects the images from the candidate images based on the parameters related to the layout according to the embodiment and the evaluation values calculated in the evaluation value calculation unit 110. Here, for example, when the evaluation value calculation unit 110 groups the candidate images, the image selection unit 114 selects the images for each group.

The layout generation unit 116 serves to lead the process of the foregoing (4) (the layout generation process). For example, the layout generation unit 116 generates the layout for each page based on the parameters related to the layout according to the embodiment and the evaluation values corresponding to the images selected by the image selection unit 114. Here, for example, when the evaluation value calculation unit 110 groups the candidate images, the layout generation unit 116 generates the layout for each group.

The layout adjustment unit 118 serves to lead the process of the foregoing (5) (the layout adjustment process) to adjust the layout generated in the layout generation unit 116. More specifically, for example, the layout adjustment unit 118 adjusts the layout generated in the layout generation unit 116 by performing one process or two or more processes among the process of the foregoing (5-1) to the process of the foregoing (5-5).

The image processing unit 120 serves to lead the process of the foregoing (6) (the image processing) and disposes the images selected in the image selection unit 114 in the layout generated in the layout generation unit 116 or the layout adjusted in the layout adjustment unit 118. For example, the image processing unit 120 may dispose the processed images in the generated layout or the adjusted layout by performing one process or two or more processes among the process of the foregoing (6-1) to the process of the foregoing (6-3).

The control unit 104 includes, for example, the evaluation value calculation unit 110, the page allocation unit 112, the image selection unit 114, the layout generation unit 116, the layout adjustment unit 118, and the image processing unit 120, so that the control unit 104 leads the processes (for example, "the process of the foregoing (1) (the evaluation value calculation process) to the process of the foregoing (4) (the layout generation process)," "the process of the foregoing (1) (the evaluation value calculation process) to the process of the foregoing (5) (the layout adjustment process)," "the process of the foregoing (1) (the evaluation value calculation process) to the process of the foregoing (4) (the layout generation process) and the process of the foregoing (6) (the image processing)," or "the process of the foregoing (1) (the evaluation value calculation process) to the process of the foregoing (6) (the image processing)") related to the information processing method according to the embodiment.

The configuration of the control unit according to the embodiment is not limited to the configuration illustrated in FIG. 52.

For example, the control unit according to the embodiment may not include the layout adjustment unit 118 and/or the image processing unit 120. Even when the control unit according to the embodiment does not include the layout adjustment unit 118 and/or the image processing unit 120, the information processing device according to the embodiment can perform the process of the foregoing (1) (the evaluation value calculation process) to the process of the foregoing (4) (the layout generation process). Accordingly, for example, even when the control unit according to the embodiment does not include the layout adjustment unit 118 and/or the image processing unit 120, the information processing device according to the embodiment can automatically generate the layouts to generate a photo book with high quality.

The control unit according to the embodiment may include an evaluation unit (not illustrated) that performs the process of the foregoing (7) (the evaluation process). When the control unit includes the evaluation unit (not illustrated), the control unit according to the embodiment can generate the layouts to generate a photo book with high quality by performing the process of the foregoing (7) (the evaluation process) and can also select the layout with the best score in the candidate images.

The control unit according to the embodiment may include a learning unit (not illustrated) that performs the process of the foregoing (8) (the learning process). When the control unit includes the learning unit (not illustrated), the control unit according to the embodiment can learn the preference of a user for the parameters related to the layout according to the embodiment by performing the process of the foregoing (8) (the learning process). Accordingly, when the control unit includes the learning unit (not illustrated), for example, the control unit according to the embodiment can generate the layout more suitable for the preference of the user or realize recommendation or the like of the parameters more preferred by the user and related to the layout according to the embodiment.

The information processing device 100 has, for example, the configuration illustrated in FIG. 52, so that the information processing device 100 performs the processes (for example, "the process of the foregoing (1) (the evaluation value calculation process) to the process of the foregoing (4) (the layout generation process)," "the process of the foregoing (1) (the evaluation value calculation process) to the process of the foregoing (5) (the layout adjustment process)," "the process of the foregoing (1) (the evaluation value calculation process) to the process of the foregoing (4) (the layout generation process) and the process of the foregoing (6) (the image processing)," or "the process of the foregoing (1) (the evaluation value calculation process) to the process of the foregoing (6) (the image processing)") related to the information processing method according to the embodiment. Accordingly, the information processing device 100 has, for example, the configuration illustrated in FIG. 52, so that the information processing device 100 can automatically generate the layouts to generate a photo book with high quality.

The configuration of the information processing device according to the embodiment is not limited to the configuration illustrated in FIG. 52.

For example, the information processing device according to the embodiment can individually include the evaluation value calculation unit 110, the page allocation unit 112, the image selection unit 114, the layout generation unit 116, the layout adjustment unit 118, and the image processing unit 120 (thr example, which are each realized by separate processing circuits) illustrated in FIG. 52.

For example, the information processing device according to the embodiment can also be configured not to include the layout adjustment unit 118 and/or the image processing unit 120. Even when the information processing device according to the embodiment does not include the layout adjustment unit 118 and/or the image processing unit 120, the information processing device according to the embodiment can perform the process of the foregoing (1) (the evaluation value calculation process) to the process of the foregoing (4) (the layout generation process). Accordingly, for example, even when the information processing device according to the embodiment does not include the layout adjustment unit 118 and/or the image processing unit 120, the information processing device according to the embodiment can automatically generate the layouts to generate a photo book with high quality.

The information processing device according to the embodiment may include an evaluation unit (not illustrated) that performs the process of the foregoing (7) (the evaluation process). When the information processing device includes the evaluation unit (not illustrated), the information processing device according to the embodiment can generate the layouts to generate a photo book with high quality by performing the process of the foregoing (7) (the evaluation process) and can also select the layout with the best score in the candidate images.

The information processing device according to the embodiment may include a learning unit (not illustrated) that performs the process of the foregoing (8) (the learning process). When the information processing device includes the learning unit (not illustrated), the information processing device according to the embodiment can learn the preference of a user for the parameters related to the layout according to the embodiment by performing the process of the foregoing (8) (the learning process). Accordingly, when the information processing device includes the learning unit (not illustrated), for example, the information processing device according to the embodiment can generate the layout more suitable for the preference of the user or realize recommendation or the like of the parameters more preferred by the user and related to the layout according to the embodiment.

The information processing device according to the embodiment may include, for example, an imaging unit (not illustrated). When the information processing device includes the imaging unit (not illustrated), the information processing device according to the embodiment can process captured images generated through imaging by the imaging unit (not illustrated) as the candidate images. An example of the imaging unit (not illustrated) includes the above described imaging device according to the embodiment.

For example, when the information processing device according to the embodiment is configured as a stand-alone device to perform a process, the information processing device may not include the communication unit 102.

As described above, the information processing device according to the embodiment performs processes including, for example, the process of the foregoing (1) (the evaluation value calculation process) to the process of the foregoing (4) (the layout generation process), as the processes related to the information processing method according to the embodiment. By performing the process of the foregoing (1) (the evaluation value calculation process) to the process of the foregoing (4) (the layout generation process), for example, one example or two or more examples are realized among the first example (margin), the second example (sparseness and denseness), the third example (rest), the fourth example (directivity of image), the fifth example (balance of areas occupied by images), the sixth example (layout), and the eighth example (frame division) of the photo books with high quality described above.

The information processing device according to the embodiment performs the process of the foregoing (3) (the image selection process) and the process of the foregoing (4) (the layout generation process) based on the parameters related to the layout according to the embodiment. Accordingly, the information processing device according to the embodiment can automatically generate the layout of a dynamic photo book by performing a process based on the parameters related to the layout set by a user's operation or the like.

Accordingly, the information processing device according to the embodiment can automatically generate the layouts to generate a photo book with high quality.

The information processing device according to the embodiment can realize, for examples, photo books with higher quality to be described below by performing the processes related to the information processing method according to the above-described embodiment:
  a photo book in which the times and the similar groups of the candidate images are realized;
  a photo book in which better images are selected from the candidate images;
  a photo book in which the layouts with good quality are realized; and
  a photo book in which variations of design can be increased more easily.

The information processing device has been exemplified above in the embodiment, but the embodiment is not limited thereto. The embodiment can be applied to, for example, various devices such as communication devices such as mobile phones or smartphones, computers such as personal computers (PC) or servers, tablet devices, video or music reproducing devices (or video or music recording and reproducing devices), game devices, and imaging devices such as digital still cameras or digital video cameras. The embodiment can also be applied to, for example, processing ICs which can be embedded in the foregoing devices.

The processes related to the information processing method according to the embodiment may be realized by, for example, an information processing system including a plurality of devices assumed to be connected to a network (or through communication between devices), as in cloud computing. More specifically, for example, when the plurality of devices included in the information processing system perform processes in cooperation with each other through communication, the processes related to the information processing method according to the embodiment are realized.

(Program According to Embodiment)

The layouts can be automatically generated to generate a photo book with high quality by causing a computer to execute a program which is a program (for example, a program capable of executing the processes related to the information processing method according to the embodiment, such as the process of the foregoing (1) (the evaluation value calculation process) to the process of the foregoing (4) (the layout generation process)," "the process of the foregoing (1) (the evaluation value calculation process) to the process of the foregoing (5) (the layout adjustment process)," "the process of the foregoing (1) (the evaluation value calculation process) to the process of the foregoing (4) (the layout generation process) and the process of the foregoing (6) (the image processing)," or "the process of the foregoing (1) (the evaluation value calculation process) to the process of the foregoing (6) (the image processing) and the process of the foregoing (7) (the evaluation process) and/or the process of the foregoing (8) (the learning process)") causing a computer to function as the information processing device according to the embodiment.

The advantages can be realized by performing the processes related to the information processing method according to the embodiment by the program causing a computer to function as the information processing device according to the above-described embodiment.

The preferred embodiments of the present invention have been described above with reference to the accompanying drawings, whilst the present invention is not limited to the above examples, of course. A person skilled in the art may find various alterations and modifications within the scope of the appended claims, and it should be understood that they will naturally come under the technical scope of the present invention.

For example, the program (computer program) causing the computer to function as the information processing device according to the embodiment has been provided above. However, the embodiment can also provide a recording medium storing the foregoing program.

The above-described configuration is an example of the embodiment and, of course, pertains to the technical scope of an embodiment of the present disclosure.

The present disclosure may also be configured as below.

(1)

An information processing device including:
  an evaluation value calculation unit configured to calculate an evaluation value of each of candidate images which are candidates for an image to be selected based on information regarding an image corresponding to each of the candidate images;
  a page allocation unit configured to determine the number of pages based on a parameter regarding a layout and determine the number of images disposed in each page based on the parameter regarding the layout and the calculated evaluation value;
  an image selection unit configured to select the image among the candidate images based on the parameter regarding the layout and the calculated evaluation value; and
  a layout generation unit configured to generate the layout in which the selected image is disposed for each page based on the parameter regarding the layout and the evaluation value corresponding to the selected image.

(2)

The information processing device according to (1), further including:

a layout adjustment unit configured to adjust the generated layout.

(3)

The information processing device according to (2), wherein, when the generated layout includes a layout in which one image is disposed in one page, the layout adjustment unit adjusts a margin which is a peripheral portion in which the selected image is not disposed in the page in which the one image is disposed.

(4)

The information processing device according to (2) or (3), wherein the layout adjustment unit clips a region in which the selected image is disposed based on the selected image disposed in the generated layout.

(5)

The information processing device according to any one of (2) to (4), wherein the layout adjustment unit rotates a region in which the selected image disposed in the generated layout is disposed.

(6)

The information processing device according to (5), wherein the layout adjustment unit rotates the region in which the selected image is disposed based on the parameter regarding the layout.

(7)

The information processing device described in (5), wherein the layout adjustment unit rotates the region in which the selected image is disposed based on a size in the generated layout of the selected image disposed in the generated layout.

(8)

The information processing device described in any one of (5) to (7), wherein the layout adjustment unit adjusts a margin which is a peripheral portion in which the selected image is not disposed in the page in which the selected image is disposed, through contraction and/or parallel translation of the region in which the selected image after the rotation is disposed.

(9)

The information processing device according to any one of (2) to (4), wherein the layout adjustment unit adjusts a blank other than a peripheral portion in the generated layout through expansion and/or parallel translation of a region in which the selected image disposed in the generated layout is disposed, the blank being a portion in which the selected image is not disposed.

(10)

The information processing device according to any one of (2) to (8), wherein the layout adjustment unit adjusts a way of overlapping regions in which the selected image is disposed based on a size in the generated layout of the selected image disposed in the generated layout.

(11)

The information processing device described in (10), wherein the layout adjustment unit determines overlapping of the regions in which the selected images disposed in the generated layouts are disposed, performs parallel translation of the regions in which the selected images are disposed based on a determination result, and adjusts the overlapping of the regions in which the selected images are disposed.

(12)

The information processing device according to any one of (1) to (11), further including:

an image processing unit configured to dispose the selected image in the generated layout or a layout adjusted from the generated layout.

(13)

The information processing device described in (12), wherein the image processing unit may detect a subject from the selected image disposed in the layout, and wherein, when the image processing unit detects the subject, the image processing unit changes a composition of the selected image based on the subject included in the selected image and disposes the image of which the composition is changed.

(14)

The information processing device described in (12), wherein the image processing unit selectively detects a predetermined subject from the selected image based on the size in the layout of the selected image disposed in the layout, and wherein, when the image processing unit detects the predetermined subject, the image processing unit disposes an image in which the predetermined subject included in the selected image is expanded.

(15)

The information processing device described in (12), wherein, when an image disposed to extend over a plurality of pages is present among the selected images disposed in the layout, the image processing unit detects a predetermined subject from the image disposed to extend over the plurality of pages and processes the image disposed to extend over the plurality of pages so that the detected predetermined subject is not located in a boundary line of the plurality of pages.

(16)

The information processing device according to any one of (1) to (15), wherein the evaluation value calculation unit calculates the evaluation value for each group by grouping the candidate images based on information regarding the image corresponding to each of the candidate images, wherein the image selection unit selects the image for each group, and wherein the layout generation unit generates the layout for each group.

(17)

The information processing device according to any one of (1) to (16), wherein the image selection unit classifies the candidate images based on a comparison result of the calculated evaluation value and a predetermined threshold value and selects the image for each group of the classified candidate images.

(18)

The information processing device described in (17), wherein the image selection unit determines directivity of the image in each of the candidate images for each group of the classified candidate images and selects the image based on the further determined directivity of the image.

(19)

The information processing device according to any one of (1) to (18), wherein the layout generation unit generates the layout by disposing a region in which the image is disposed in the page based on the number of images disposed in the determined page, or the number of images disposed in the determined page and the evaluation value corresponding to the selected image.

(20)

The information processing device according to (19), wherein the layout generation unit generates the layout further based on the parameter regarding the layout and/or information regarding an image corresponding to the selected image.

(21) The information processing device according to any one of (1) (20), further including an evaluation unit configured to evaluate the generated layout.

(22) The information processing device according to any one of (1) to (21), further including:
a learning unit configured to learn a preference of a user for the parameter regarding the layout based on the number of times the parameter regarding the layout is used, or the number of times the parameter regarding the layout is used and whether the generated layout is confirmed.

(23) The information processing device according to any one of (1) to (22), wherein the parameter regarding the layout includes a parameter corresponding to a kind of display device displaying the image disposed in the generated layout.

(24) The information processing device according to any one of (1) to (22), wherein the parameter regarding the layout includes a parameter corresponding to a kind of print setting for printing the image disposed in the generated layout.

(25) An information processing method including:
a step of calculating an evaluation value of each of candidate images which are candidates for an image to be selected based on information regarding an image corresponding to each of the candidate images;
a step of determining the number of pages based on a parameter regarding a layout and determining the number of images disposed in each page based on the parameter regarding the layout and the calculated evaluation value;
a step of selecting the image among the candidate images based on the parameter regarding the layout and the calculated evaluation value; and
a step of generating the layout in which the selected image is disposed for each page based on the parameter regarding the layout and the evaluation value corresponding to the selected image.

(26) A program causing a computer to execute:
a step of calculating an evaluation value of each of candidate images which are candidates for an image to be selected based on information regarding an image corresponding to each of the candidate images;
a step of determining the number of pages based on a parameter regarding a layout and determining the number of images disposed in each page based on the parameter regarding the layout and the calculated evaluation value;
a step of selecting the image among the candidate images based on the parameter regarding the layout and the calculated evaluation value; and
a step of generating the layout in which the selected image is disposed for each page based on the parameter regarding the layout and the evaluation value corresponding to the selected image.

(27) An information processing system including:
an evaluation value calculation device configured to calculate an evaluation value of each of candidate images which are candidates for an image to be selected based on information regarding an image corresponding to each of the candidate images;
a page allocation device configured to determine the number of pages based on a parameter regarding a layout and determine the number of images disposed in each page based on the parameter regarding the layout and the calculated evaluation value;
an image selection device configured to select the image among the candidate images based on the parameter regarding the layout and the calculated evaluation value; and
a layout generation device configured to generate the layout in which the selected image is disposed for each page based on the parameter regarding the layout and the evaluation value corresponding to the selected image.

REFERENCE SIGNS LIST

100 information processing device
102 communication unit
104 control unit
110 evaluation value calculation unit
112 page allocation unit
114 image selection unit
116 layout generation unit
118 layout adjustment unit
120 image processing unit

The invention claimed is:

1. An information processing device comprising:
circuitry configured to
calculate an evaluation value of each image of a plurality of candidate images which are candidates for images to be selected based on information corresponding to each image of the plurality of candidate images;
determine a number of pages based on a learned parameter regarding a layout and determine a number of images disposed in each page based on the learned parameter regarding the layout and the calculated evaluation value;
select the images from among the candidate images for each page based on the learned parameter regarding the layout and the calculated evaluation value; and
automatically generate the layout in which the selected images are disposed for each page based on the learned parameter regarding the layout and the evaluation value corresponding to each selected image,
wherein the learned parameter regarding the layout is determined by learning a preference of a user based on a combination of a number of times the learned parameter regarding the layout has been used by the user and a number of times the generated layout based on the learned parameter has been confirmed by the user,
wherein the number of times the learned parameter regarding the layout has been used by the user is greater than one, and
wherein the number of times the generated layout based on the learned parameter has been confirmed by the user is greater than one.

2. The information processing device according to claim 1, wherein the circuitry is further configured to adjust the automatically generated layout.

3. The information processing device according to claim 2, wherein, when the automatically generated layout includes a layout in which one image is disposed in one page, the circuitry is further configured to adjust a margin which is a peripheral portion in which the selected image is not disposed in the page in which the one image is disposed.

4. The information processing device according to claim 2, wherein the circuitry is further configured to clip a region in which the selected image is disposed based on the selected image disposed in the automatically generated layout.

5. The information processing device according to claim 2, wherein the circuitry is further configured to rotate a region in which the selected image disposed in the automatically generated layout is disposed.

6. The information processing device according to claim 5, wherein the circuitry is further configured to rotate the region in which the selected image is disposed based on the learned parameter regarding the layout.

7. The information processing device according to claim 2, wherein the circuitry is further configured to adjust a blank space other than a peripheral portion in the automatically generated layout through at least one of expansion and parallel translation of a region in which the selected image disposed in the automatically generated layout is disposed, the blank space being a portion of a page in which the selected image is not disposed.

8. The information processing device according to claim 2, wherein the circuitry is further configured to adjust a way of overlapping regions in which the selected image is disposed based on a size in the automatically generated layout of the selected image disposed in the automatically generated layout.

9. The information processing device according to claim 1, wherein the circuitry is further configured to dispose the selected image in the automatically generated layout or a layout adjusted from the automatically generated layout.

10. The information processing device according to claim 1, wherein the circuitry is further configured to calculate the evaluation value for each group by grouping images of the plurality of candidate images based on the information regarding each image corresponding to each of the grouped candidate images,
    wherein the circuitry is further configured to select the candidate images for each group, and
    wherein the circuitry is further configured to automatically generate the layout of the selected candidate images for each group.

11. The information processing device according to claim 1, wherein the circuitry is further configured to classify the candidate images based on a comparison result of the calculated evaluation value and a predetermined threshold value and selects the image for each group of the classified candidate images.

12. The information processing device according to claim 1, wherein the circuitry is further configured to automatically generate the layout by disposing a region in which the selected image is disposed in the page based on the number of images disposed in the determined page, or the number of images disposed in the determined page and the evaluation value corresponding to the selected image.

13. The information processing device according to claim 12, wherein the circuitry is further configured to automatically generate the layout further based on the information regarding the image corresponding to the selected image.

14. The information processing device according to claim 1, wherein the circuitry is further configured to evaluate the automatically generated layout.

15. The information processing device according to claim 1, wherein the learned parameter regarding the layout includes a parameter corresponding to a kind of display device displaying the image disposed in the automatically generated layout.

16. The information processing device according to claim 1, wherein the learned parameter regarding the layout includes a parameter corresponding to a kind of print setting for printing the image disposed in the automatically generated layout.

17. The information processing device according to claim 1, wherein the learned parameter regarding the layout is further determined to be a dislike parameter or a favorite parameter based on the combination of the number of times the learned parameter regarding the layout has been used by the user and the number of times the generated layout based on the learned parameter has been confirmed by the user.

18. An information processing method, implemented via at least one processor, the method comprising:
    calculating an evaluation value of each image of a plurality of candidate images which are candidates for images to be selected based on information corresponding to each image of the plurality of candidate images;
    determining a number of pages based on a learned parameter regarding a layout and determining a number of images disposed in each page based on the learned parameter regarding the layout and the calculated evaluation value;
    selecting the images from among the candidate images based on the learned parameter regarding the layout and the calculated evaluation value; and
    automatically generating the layout in which the selected images are disposed for each page based on the learned parameter regarding the layout and the evaluation value corresponding to each selected image,
    wherein the learned parameter regarding the layout is determined by learning a preference of a user based on a combination of a number of times the learned parameter regarding the layout has been used by the user and a number of times the generated layout based on the learned parameter has been confirmed by the user,
    wherein the number of times the learned parameter regarding the layout has been used by the user is greater than one, and
    wherein the number of times the generated layout based on the learned parameter has been confirmed by the user is greater than one.

19. A non-transitory computer readable medium having embodied thereon a program, which when executed by a computer, causes the computer to execute a method, the method comprising:
    calculating an evaluation value of each image of a plurality of candidate images which are candidates for images to be selected based on information corresponding to each image of the plurality of candidate images;
    determining a number of pages based on a learned parameter regarding a layout and determining a number of images disposed in each page based on the learned parameter regarding the layout and the calculated evaluation value;
    selecting the images from among the candidate images based on the learned parameter regarding the layout and the calculated evaluation value; and
    automatically generating the layout in which the selected images are disposed for each page based on the learned parameter regarding the layout and the evaluation value corresponding to each selected image,
    wherein the learned parameter regarding the layout is determined by learning a preference of a user based on a combination of a number of times the learned parameter regarding the layout has been used by the user and a number of times the generated layout based on the learned parameter has been confirmed by the user, wherein the number of times the learned parameter regarding the layout has been used by the user is greater than one, and wherein the number of times the generated layout based on the learned parameter has been confirmed by the user is greater than one.

* * * * *